US012801209B2

(12) United States Patent
Tokutake

(10) Patent No.: US 12,801,209 B2
(45) Date of Patent: Nov. 17, 2026

(54) INFORMATION PROCESSING DEVICE, INFORMATION PROCESSING SYSTEM, AND INFORMATION PROCESSING METHOD

(71) Applicant: Sony Group Corporation, Tokyo (JP)

(72) Inventor: Kenji Tokutake, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 316 days.

(21) Appl. No.: 18/726,132

(22) PCT Filed: Nov. 22, 2022

(86) PCT No.: PCT/JP2022/043224
§ 371 (c)(1),
(2) Date: Jul. 2, 2024

(87) PCT Pub. No.: WO2023/135941
PCT Pub. Date: Jul. 20, 2023

(65) Prior Publication Data

US 2026/0252163 A1 Aug. 27, 2026

(30) Foreign Application Priority Data

Jan. 17, 2022 (JP) ................................ 2022-005302

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0101* (2013.01); *G02B 27/017* (2013.01);
(Continued)

(58) Field of Classification Search
CPC ......... G06F 3/011; G06F 3/017; G06V 40/10; G06V 40/28; G02B 27/0101; G02B 27/017; G02B 2027/0138; G02B 2027/0178
See application file for complete search history.

(56) References Cited

U.S. PATENT DOCUMENTS

2010/0306716 A1 12/2010 Perez
2016/0093107 A1* 3/2016 Yamamoto ............ A63F 13/212 345/633
(Continued)

FOREIGN PATENT DOCUMENTS

JP 2018-116684 A 7/2018
JP 2021-507355 A 2/2021
(Continued)

OTHER PUBLICATIONS

International Search Report and Written Opinion mailed on Jan. 24, 2023, received for PCT Application PCT/JP2022/043224, filed on Nov. 22, 2022, 8 pages including English Translation.

*Primary Examiner* — Robert J Michaud
(74) *Attorney, Agent, or Firm* — XSENSUS LLP

(57) ABSTRACT

A device and method generate and display a user posture-reflected three-dimensional avatar image with less delay with respect to a user motion are implemented. A user terminal inputs a detection value of a motion sensor attached to a body of a user and a user posture is estimated, and further, the sensor detection value of a part having a fast motion is selected and transmitted to a server. The server generates a user posture-reflected three-dimensional avatar image using the user posture and the sensor detection values and transmits the user posture-reflected three-dimensional avatar image to the user terminal. The user terminal outputs the received user posture-reflected three-dimensional avatar image to a display unit. The server performs, for an avatar
(Continued)

image based on the user posture, image correction of reflecting a user part position estimated based on a newer sensor detection value to generate a user posture-reflected three-dimensional avatar image.

19 Claims, 37 Drawing Sheets

(51) Int. Cl.
*G06T 13/40* (2011.01)
*G06V 40/10* (2022.01)
*G06V 40/20* (2022.01)

(52) U.S. Cl.
CPC .............. *G06F 3/017* (2013.01); *G06T 13/40* (2013.01); *G06V 40/10* (2022.01); *G06V 40/28* (2022.01); *G02B 2027/0138* (2013.01); *G02B 2027/0178* (2013.01)

(56) References Cited

U.S. PATENT DOCUMENTS

| | | | | |
|---|---|---|---|---|
| 2017/0103564 | A1 | 4/2017 | Hayashida | |
| 2019/0392627 | A1 | 12/2019 | Grant | |
| 2021/0209825 | A1 | 7/2021 | Assouline | |
| 2022/0083197 | A1* | 3/2022 | Rockel | G06F 3/011 |

FOREIGN PATENT DOCUMENTS

| | | | |
|---|---|---|---|
| JP | 2021-060627 | A | 4/2021 |
| JP | 2021-135776 | A | 9/2021 |
| JP | 2021-185500 | A | 12/2021 |

* cited by examiner (a) TRANSMISSIVE MR GLASSES DISPLAY IMAGE (a) TRANSMISSIVE MR GLASSES DISPLAY IMAGE (a) MR GLASSES DISPLAY IMAGE

INFORMATION PROCESSING DEVICE, INFORMATION PROCESSING SYSTEM, AND INFORMATION PROCESSING METHOD

CROSS-REFERENCE TO RELATED APPLICATIONS

This application is a national stage application, pursuant to 35 U.S.C. § 371, of International Patent Application No. PCT/JP2022/043224, filed Nov. 22, 2022, which claims priority to Japanese Patent Application No. 2022-005302, filed Jan. 17, 2022, the entire contents of each are incorporated herein by reference.

TECHNICAL FIELD

The present disclosure relates to an information processing device, an information processing system, and an information processing method. More specifically, the present disclosure relates to an information processing device, an information processing system, and an information processing method for detecting a motion of a user by a sensor attached to each part such as an arm or a foot of the user's body, and generating and displaying an avatar image that is a virtual self character of the user reflecting the motion of the user.

BACKGROUND ART

An image obtained by superimposing a virtual object image that does not actually exist on a real object image in a real space is referred to as a mixed reality (MR) image.

As an example of the MR image, for example, there is an image obtained by superimposing an avatar image that is a virtual character on a background image including a real object.

Specifically, for example, an MR image in which an avatar that is a self character of the user is superimposed and displayed as a CG image on a background image of a real town or the like and the avatar is moved in accordance with the motion of the user is often used.

The MR image is also used in a game in which an avatar a that is a self character of a user A and an avatar b that is a self character of a user B are fighting in the MR image, for example.

A plurality of motion sensors is attached to the head, arm, foot, and the like of each of the two users A and B, and the avatars a and b are displayed as CG images reflecting the motions of the users A and B using detection information of these sensors.

By performing such processing, the avatars a and b in the MR image move similarly to the users A and B, and the users A and B at distant positions can obtain a feeling that they are actually fighting in one place.

Note that, for example, Patent Document 1 (Japanese Patent Application Laid-Open No. 2021-060627) and Patent Document 2 (Japanese Patent Application Laid-Open No. 2021-185500) are conventional techniques that disclose a configuration for performing motion control of a virtual object on an image using a sensor detection value.

However, for example, to cause the virtual object such as an avatar to perform the same motion as the user using the detection value of the sensor attached to the user, data processing such as analysis processing of the sensor detection value and avatar image generation processing using an analysis result is required. The data processing requires a predetermined processing time, and the processing time may cause a gap between the user motion and the avatar motion. That is, the motion of the avatar may be delayed from the motion of the user.

The user may perform processing such as determining the next motion by looking at the motion of the avatar that is the self character displayed in the image, and when such a delay occurs, the user may be concerned about the gap between the motion of the user and the motion of the avatar, and may not be able to perform a desired motion.

CITATION LIST

Patent Document

Patent Document 1: Japanese Patent Application Laid-Open No. 2021-060627

Patent Document 2: Japanese Patent Application Laid-Open No. 2021-185500

SUMMARY OF THE INVENTION

Problems to be Solved by the Invention

The present disclosure has been made in view of the above problem, for example, and provides an information processing device, an information processing system, and an information processing method that reduce a delay between a motion of a user and a motion of a virtual character such as an avatar that is a virtual self of the user, and generate an image without discomfort.

Solutions to Problems

The first aspect of the present disclosure is an information processing device including:

a posture estimation unit configured to estimate a user posture by inputting sensor detection values of motion sensors attached to a plurality of parts of a body of a user; and a sensor detection value selection unit configured to selectively acquire a sensor detection value of a part having a motion faster than a prescribed threshold; and outputting the user posture estimated by the posture estimation unit and the sensor detection value selected by the sensor detection value selection unit to an external device or a posture-reflected three-dimensional avatar image generation unit in the information processing device; and outputting, to a display unit, a user posture-reflected three-dimensional avatar image generated by the posture-reflected three-dimensional avatar image generation unit using the user posture and the sensor detection value.

Moreover, the second aspect of the present disclosure is an information processing device including:

a posture-reflected three-dimensional avatar image generation unit configured to generate a user posture-reflected three-dimensional avatar image by using a user posture estimated on the basis of a sensor detection value of a motion sensor attached to a user's body part and the sensor detection value of the motion sensor, in which the posture-reflected three-dimensional avatar image generation unit executes image correction processing of reflecting a user part position estimated on the basis of the sensor detection value for a posture-based avatar image generated on the basis of the user posture to generate the user posture-reflected three-dimensional avatar image.

Moreover, the third aspect of the present disclosure is an information processing device system including: a user terminal and a server, in which the user terminal includes:

a posture estimation unit configured to estimate a user posture by inputting sensor detection values of motion sensors attached to a plurality of parts of a body of a user;

a sensor detection value selection unit configured to selectively acquire a sensor detection value of a part having a motion faster than a prescribed threshold; and a communication unit configured to transmit the user posture estimated by the posture estimation unit and the sensor detection value selected by the sensor detection value selection unit to the server, the server generates a user posture-reflected three-dimensional avatar image by using the user posture and the sensor detection value received from the user terminal, and transmits the generated user posture-reflected three-dimensional avatar image to the user terminal, and the user terminal outputs the user posture-reflected three-dimensional avatar image received from the server to a display unit.

Moreover, the fourth aspect of the present disclosure is an information processing method executed in an information processing device, the information processing method executing:

by a posture estimation unit, a posture estimation step of estimating a user posture by inputting sensor detection values of motion sensors attached to a plurality of parts of a user's body;

by a sensor detection value selection unit, a sensor detection value selection step of selectively acquiring a sensor detection value of a part having a motion faster than a prescribed threshold;

a step of outputting the user posture estimated by the posture estimation unit and the sensor detection value selected by the sensor detection value selection unit to an external device or a posture-reflected three-dimensional avatar image generation unit in the information processing device; and a step of outputting, to a display unit, a user posture-reflected three-dimensional avatar image generated by the posture-reflected three-dimensional avatar image generation unit using the user posture and the sensor detection value.

Moreover, the fifth aspect of the present disclosure is an information processing method executed in an information processing device, the information processing method including:

executing, by a posture-reflected three-dimensional avatar image generation unit, posture-reflected three-dimensional avatar image generation processing of generating a user posture-reflected three-dimensional avatar image by using a user posture estimated on the basis of a sensor detection value of a motion sensor attached to a user's body part and the sensor detection value of the motion sensor; and executing, by the posture-reflected three-dimensional avatar image generation unit, image correction processing of reflecting a user part position estimated on the basis of the sensor detection value for a posture-based avatar image generated on the basis of the user posture to generate the user posture-reflected three-dimensional avatar image.

Other objects, features, and advantages of the present disclosure will become apparent from a more detailed description based on examples of the present disclosure described later and the accompanying drawings. Note that a system in the present description is a logical set configuration of a plurality of devices, and is not limited to a system in which devices with respective configurations are in the same housing.

According to a configuration of an embodiment of the present disclosure, a device and a method for generating and displaying a user posture-reflected three-dimensional avatar image with less delay with respect to a user motion are implemented.

Specifically, for example, a user terminal inputs a detection value of a motion sensor attached to a body of a user and a user posture is estimated, and further, the sensor detection value of a part having a fast motion is selected and transmitted to a server. The server generates a user posture-reflected three-dimensional avatar image using the user posture and the sensor detection values and transmits the user posture-reflected three-dimensional avatar image to the user terminal. The user terminal outputs the received user posture-reflected three-dimensional avatar image to a display unit. The server performs, for an avatar image based on the user posture, image correction of reflecting a user part position estimated on the basis of a newer sensor detection value to generate a user posture-reflected three-dimensional avatar image.

According to the present configuration, a device and a method for generating and displaying a user posture-reflected three-dimensional avatar image with less delay with respect to a user motion are implemented.

Note that the effects described herein are merely examples and are not limited, and additional effects may also be provided.

MODE FOR CARRYING OUT THE INVENTION

Hereinafter, an information processing device, an information processing system, and an information processing method of the present disclosure will be described in detail with reference to the drawings. Note that the description will be made in accordance with the following items.

1. Configuration Example of Information Processing System to Which Processing of Present Disclosure is Applicable and Problems Thereof
2. Specific Example of Processing Executed by Information Processing Device of Present Disclosure
3. Processing Sequence of Processing of Present Disclosure 3-1. (Processing Example 1) Processing sequence of processing in which user terminal selects sensor detection value to be transmitted 3-2. (Processing Example 2) Processing sequence of processing in which server selects sensor detection value to be transmitted 4. Embodiment in Which Sampling Cycle of Sensor Attached to User is Changed According to Moving Speed of Each Part
5. Example of User Posture-Reflected Avatar Image Display Processing by Communication Processing Between User Terminals Without Using Server
6. Control Processing Example of Hand Tracking and Hand Gesture Analysis Processing
7. Other Embodiments
8. Configuration Example of Information Processing Device
9. Hardware Configuration Example of Information Processing Device
10. Summary of Configuration of Present Disclosure

1. Configuration Example of Information Processing System to Which Processing of Present Disclosure is Applicable and Problems Thereof First, a configuration example of an information processing system to which processing of the present disclosure is applicable and problems thereof will be described with reference to FIG. 1 and subsequent drawings.

Figure 1:
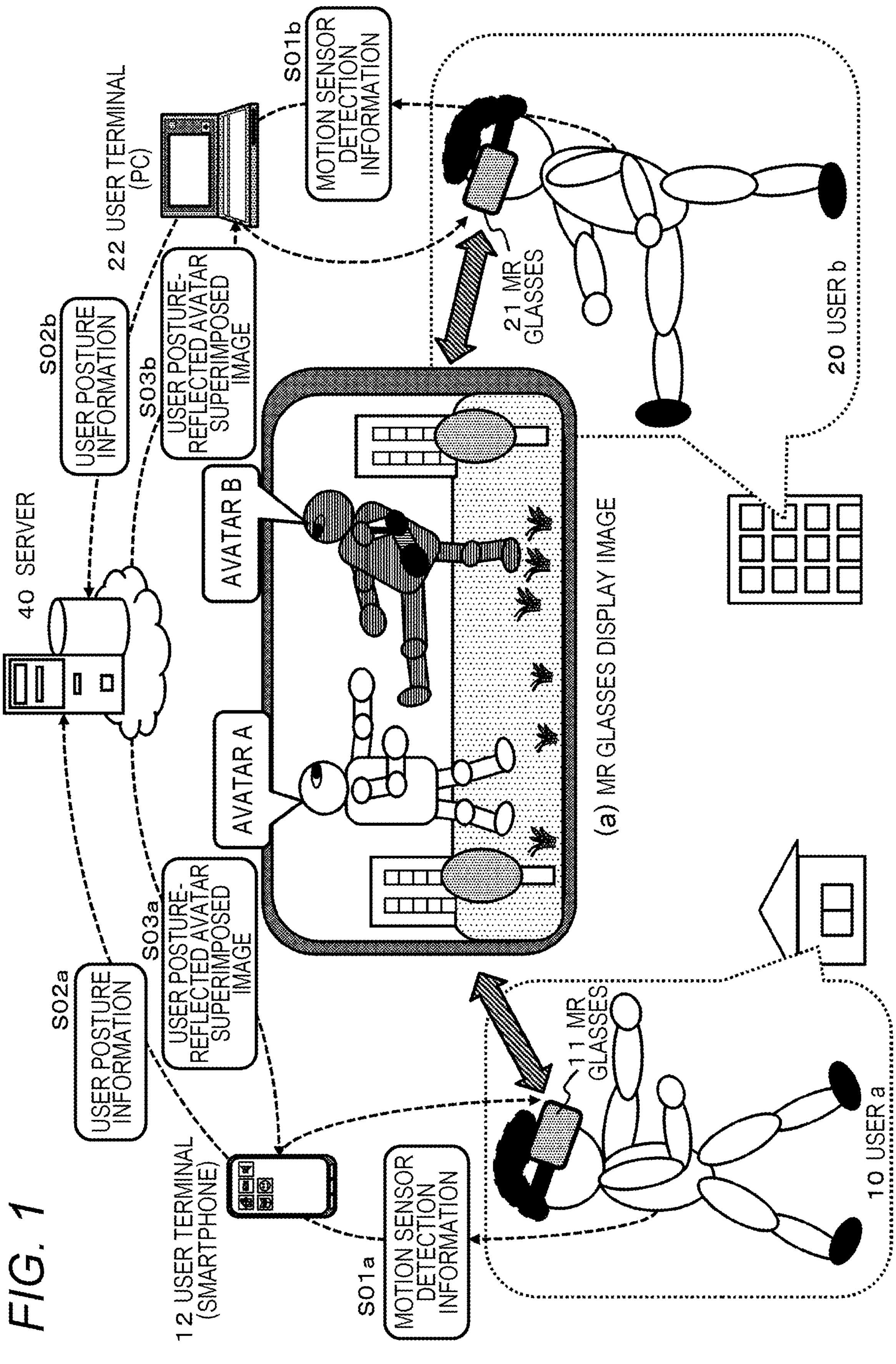
FIG. 1 is a diagram for describing configurations of an information processing system and an information processing device to which processing of the present disclosure is applicable and an outline of the processing.

FIG. 1 is a diagram illustrating a configuration example of an information processing system to which processing of the present disclosure is applicable.

FIG. 1 illustrates a user a, 10 and a user b, 20 at distant places.

The user a, 10 and the user b, 20 wear MR glasses.

The user a, 10 wears MR glasses 11, and the user b, 20 wears MR glasses 21.

The MR glasses 11 and 21 are head mounted displays (HMDs) including a display unit that displays a mixed reality (MR) image obtained by superimposing a virtual object image, which does not actually exist, on a real object image in a real space.

A mixed reality (MR) image as illustrated in the center of FIG. 1 is displayed on the MR glasses 11 and 21 worn by the respective users a and b.

It is an MR image in which an avatar, which is a virtual self character of each user, is superimposed and displayed on a real object image of a real landscape that exists.

An avatar A in the MR image corresponds to the virtual self character of the user a, 10, and an avatar B corresponds to the virtual self character of the user b, 20.

Note that the images displayed on the MR glasses 11 and 21 are three-dimensional images, and both the background image and the avatar image are displayed as three-dimensional images.

The two users a and b have motion sensors attached to a plurality of parts of the bodies such as the heads, arms, and feet, and move the avatars A and B in the MR image similarly to motions of the users a and b, using detection information of these sensors.

Processing steps executed to move the avatars A and B in the MR images similarly to the motions of the users a and b are processing of steps S01*a* and S01*b* to S03*a* and S03*b* illustrated in FIG. 1.

These series of processing will be described.

(Step S01*a* and Step S01*b*)

First, as illustrated in step S01*a* of FIG. 1, sensor detection values of the motion sensors attached to the head, arm, foot, and the like of the user a, 10 are transmitted to a user terminal (smartphone) 12 near the user a, 10.

The user terminal (smartphone) 12 analyzes the sensor detection values of the motion sensors attached to the head, arm, foot, and the like of the user a, 10, and generates three-dimensional posture information of the user a, 10.

Meanwhile, as illustrated in step S01*b* of FIG. 1, sensor detection values of the motion sensors attached to the head, arm, foot, and the like of the user b, 20 are transmitted to a user terminal (PC) 22 near the user b, 20.

The user terminal (PC) 22 analyzes the sensor detection values of the motion sensors attached to the head, arm, foot, and the like of the user b, 20, and generates three-dimensional posture information of the user b, 20.

Note that processing of transmitting the sensor detection value from the sensor to the user terminal (smartphone) 12 or the user terminal (PC) 22 is executed using proximity communication such as Bluetooth (registered trademark) communication.

(Step S02*a* and Step S02*b*)

The three-dimensional posture information of the user a, 10 generated on the basis of the sensor detection value by the user terminal (smartphone) 12 is transmitted from the user terminal (smartphone) 12 to the server 40 in step S02*a*.

Meanwhile, the three-dimensional posture information of the user b, 20 generated on the basis of the sensor detection value by the user terminal (PC) 22 is also transmitted from the user terminal (PC) 22 to the server 40 in step S02*b*.

The server 40 generates a three-dimensional image of the avatar A having a posture similar to the three-dimensional posture of the user a, 10 on the basis of the three-dimensional posture information of the user a, 10 generated on the basis of the sensor detection value by the user terminal (smartphone) 12.

Moreover, the server 40 generates a three-dimensional image of the avatar B having a posture similar to the three-dimensional posture of the user b, 20 on the basis of the three-dimensional posture information of the user b, 20 generated on the basis of the sensor detection value by the user terminal (PC) 22.

(Step S03*a* and Step S03*b*)

In step S03*a*, the server 40 transmits the MR image including the three-dimensional images of the avatars A and B generated by the server 40 to the user terminal (smartphone) 12 on the user a, 10 side.

Similarly, in step S03*b*, the server 40 transmits the MR image including the three-dimensional images of the avatars A and B generated by the server 40 to the user terminal (PC) 22 on the user b, 20 side.

The user terminal (smartphone) 12 on the user a, 10 side transmits the MR image including the three-dimensional images of the avatars A and B received from the server 40 to the MR glasses 11 worn by the user a, 10 for display.

Meanwhile, the user terminal (PC) 22 on the user b, 20 side also transmits the MR image including the three-dimensional images of the avatars A and B received from the server 40 to the MR glasses 21 worn by the user b, 20 for display.

Communication between the user terminals 12 and 22 and the MR glasses 11 and 21 is also executed using proximity communication such as Bluetooth (registered trademark) communication.

Note that the image transmitted from the server 40 to the user terminals 12 and 22 may be an MR image in which a background image is combined with the three-dimensional images of the avatars A and B, or may be only the avatar images not including the background image, and an image generated on the user terminals 12 and 22 side may be used as the background image.

By repeatedly executing the series of processing, it becomes possible to move the avatars A and B in the MR image similarly to the motions of the users a and b, and the users a and b at distant positions can enjoy the feeling as if they were fighting in one and the same place.

Note that the example illustrated in FIG. 1 is a processing example in which two users display and use avatars of the respective users on one MR image. However, it is also possible to perform processing in which one user displays and uses one avatar corresponding to the user on the MR image.

A processing example in which one user displays and uses one avatar of the user on the MR image will be described with reference to FIG. 2.

The user c, 30 wears MR glasses 31.

Figure 2:
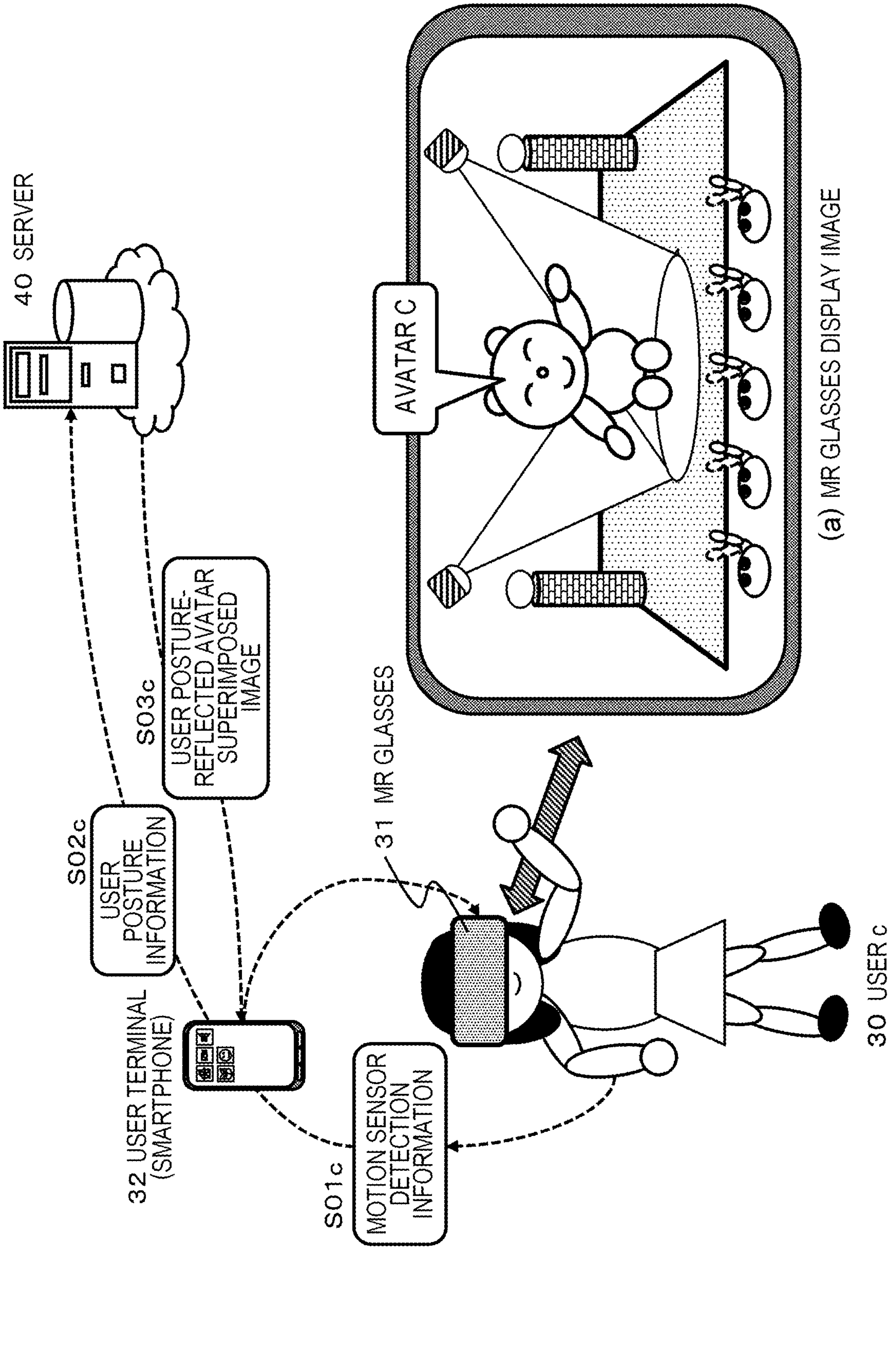
FIG. 2 is a diagram for describing configurations of an information processing system and an information processing device to which processing of the present disclosure is applicable and an outline of the processing.

A mixed reality (MR) image as illustrated in the center of FIG. 2 is displayed on the MR glasses 31 worn by the user c, 30.

It is an MR image in which the avatar C, which is a virtual self character of the user c, 30, is superimposed and displayed on a real object image of a real stage that exists.

The image displayed on the MR glasses 31 is a three-dimensional image, and both the background image and the avatar image are displayed as three-dimensional images.

The user c, 30 has a plurality of motion sensors attached to the head, the arm, the foot, and the like, and the avatar C in the MR image moves similarly to the motion of the user c, 30, using detection information of these sensors.

Processing steps for describing processing executed to move the avatar C in the MR image in accordance with the motion of the user c, 30 are processing of steps S01*c* to S03*c* illustrated in FIG. 2.

These series of processing will be described.

(Step S01*c*)

As illustrated in step S01*c* of FIG. 2, sensor detection values of the motion sensors attached to the head, arm, foot, and the like of the user c, 30 are transmitted to a user terminal (smartphone) 32 near the user c, 30.

The user terminal (smartphone) 32 analyzes the sensor detection values of the motion sensors attached to the head, arm, foot, and the like of the user c, 30, and generates three-dimensional posture information of the user c, 30.

(Step S02*c*)

The three-dimensional posture information of the user c, 30 generated on the basis of the sensor detection value by the user terminal (smartphone) 32 is transmitted to the server 40 in step S02*c*.

The server 40 generates a three-dimensional image of the avatar C having a posture similar to the three-dimensional posture of the user c, 30 on the basis of the three-dimensional posture information of the user c, 30 generated on the basis of the sensor detection value by the user terminal (smartphone) 32.

(Step S03*c*)

In step S03*c*, the server 40 transmits the MR image including the three-dimensional image of the avatar C generated by the server 40 to the user terminal (smartphone) 32 on the user c, 30 side.

The user terminal (smartphone) 32 on the user c, 30 side transmits the MR image including the three-dimensional image of the avatar C received from the server 40 to the MR glasses 31 worn by the user c, 30 for display.

By repeatedly executing the series of processing, it becomes possible to move the avatar C in the MR image similarly to the motion of the user c, and the user c, 30 can enjoy the feeling as if the user c, 30 were dancing or singing on the actual stage.

Note that, in the example described with reference to FIGS. 1 and 2, an example using non-transmissive MR glasses as the MR glasses worn by the user has been described. However, for example, as illustrated in FIG. 3, processing using transmissive MR glasses 33 is also possible.

The transmissive MR glasses 33 are configured to display the three-dimensional image of the avatar C, which is a virtual object, on the real object actually viewed by the user c, 30. By using such dropping-type MR glasses, it is possible to observe an MR image (mixed reality image) in which an avatar exists in an environment where the user is present.

Figure 3:
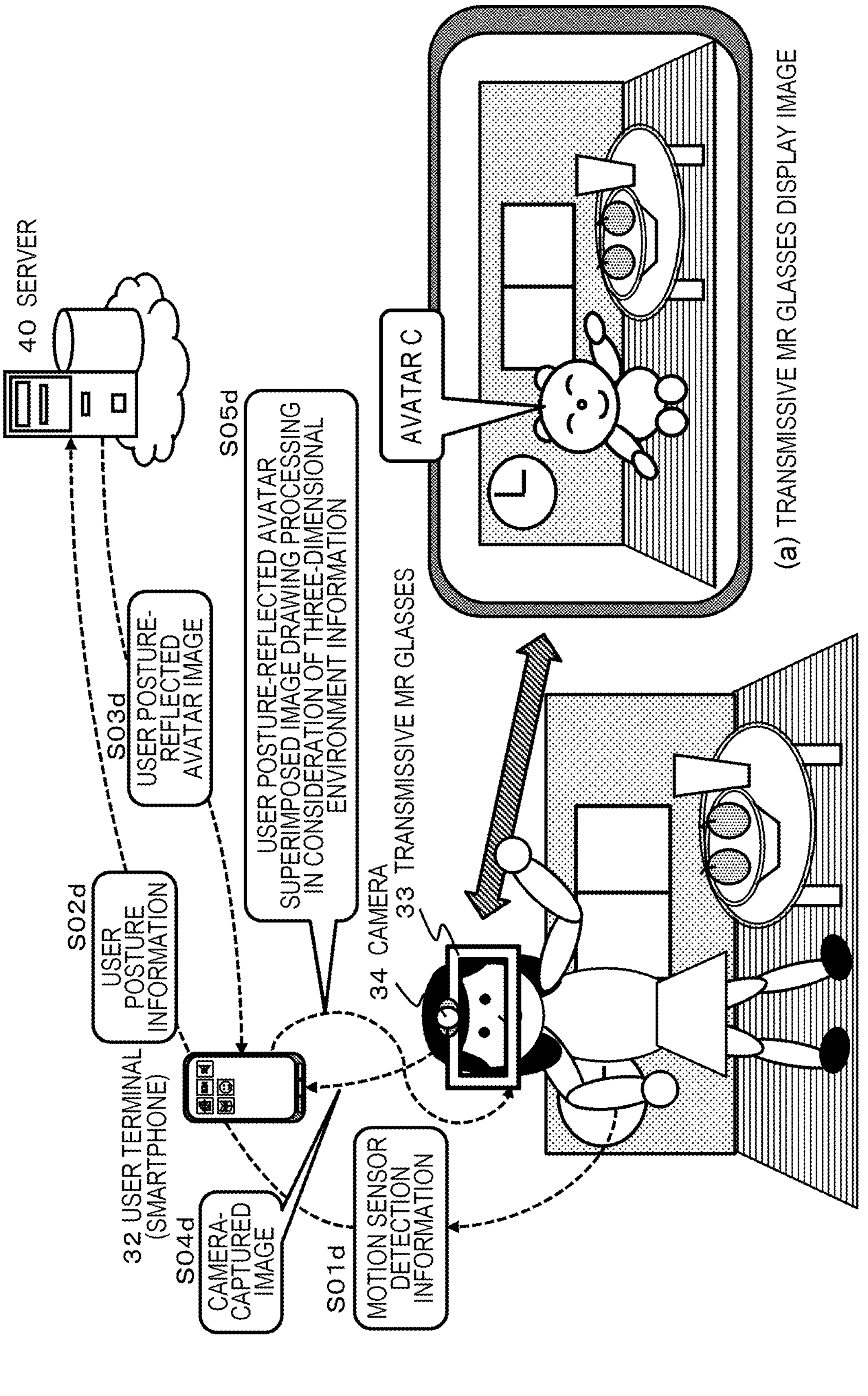
FIG. 3 is a diagram for describing configurations of an information processing system and an information processing device to which processing of the present disclosure is applicable and an outline of the processing.

Note that, in the example illustrated in FIG. 3, the avatar C, which is a virtual self character of the user c, 30, is displayed in the transmissive MR glasses 33 as if the avatar C were present in a room where the user c, 30 is present.

The avatar C displayed on the transmissive MR glasses 33 also move in accordance with the motion of the user c, 30. In this case, for example, a display mode of the avatar C needs to be changed between a case where the avatar C goes in front of a table and a case where the avatar C is behind the table.

In the case where the avatar C is behind the table, the part of the body of the avatar C hidden behind the table needs to be hidden.

To perform such display control, environment information of the room in which the user c, 30 is present, that is, three-dimensional environment information of the room from which the position of the real object and the like can be analyzed is required.

For this processing, a camera 34 attached to the transmissive MR glasses 33 worn by the user c, 30 captures an image of the room in which the user c, 30 is present.

This is the processing of step S04*d* illustrated in FIG. 3.

Note that steps S01*d* to S03*d* illustrated in FIG. 3 are processing similar to steps S01*c* to S03*c* described with reference to FIG. 2.

As illustrated in step S04*d* of FIG. 3, the image captured by the camera 34 is transmitted to the user terminal (smartphone) 32.

For example, the image is transmitted by Bluetooth (registered trademark) communication.

The user terminal (smartphone) 32 analyzes a three-dimensional configuration of the room viewed by the user c, 30, using the image captured by the camera 34, and generates three-dimensional environment information that is three-dimensional configuration information of the room.

Specifically, for example, simultaneous localization and mapping (SLAM) processing of analyzing a moving image continuously captured by the camera 34 and analyzing a three-dimensional configuration of an object included in the captured image is executed to generate the three-dimensional environment information of the room.

Note that the SLAM processing is processing that enables execution of self-position estimation processing (localization) and three-dimensional environmental map creation processing (mapping) in parallel, using the captured image by the camera.

Next, in step S05*d*, the user terminal (smartphone) 32 executes drawing processing of drawing the user posture determination avatar image received from the server 40 on the display unit of the equivalent-type MR glasses 33 in consideration of the three-dimensional environment information of the room generated by the user terminal (smartphone) 32, using the captured image of the camera 34.

That is, for example, in the case where the position of the user c, 30 is behind the table, avatar image drawing processing that does not cause a contradiction between the three-dimensional environment information of the room and the displayed avatar image, such as processing of deleting and displaying the avatar portion hidden behind the table, is executed.

The processing example illustrated in FIG. 3 is a configuration in which the server 40 generates an entire image of the user posture recently captured avatar image, and the user terminal (smartphone) 32 side executes the avatar image drawing processing in consideration of the three-dimensional environment information of the room.

Not limited to such processing, for example, it is also possible to perform processing of transmitting the three-dimensional environment information of the room generated by the user terminal (smartphone) 32 to the server 40, and generating the user posture-reflected avatar image in consideration of the three-dimensional environment information of the room on the server 40 side and transmitting the user posture-reflected avatar image to the user terminal (smartphone) 32.

For example, the server 40 generates the user posture-reflected avatar image in which the avatar portion behind the table has been deleted in advance, and transmits the user posture-reflected avatar image to the user terminal (smartphone) 32.

Figure 4:
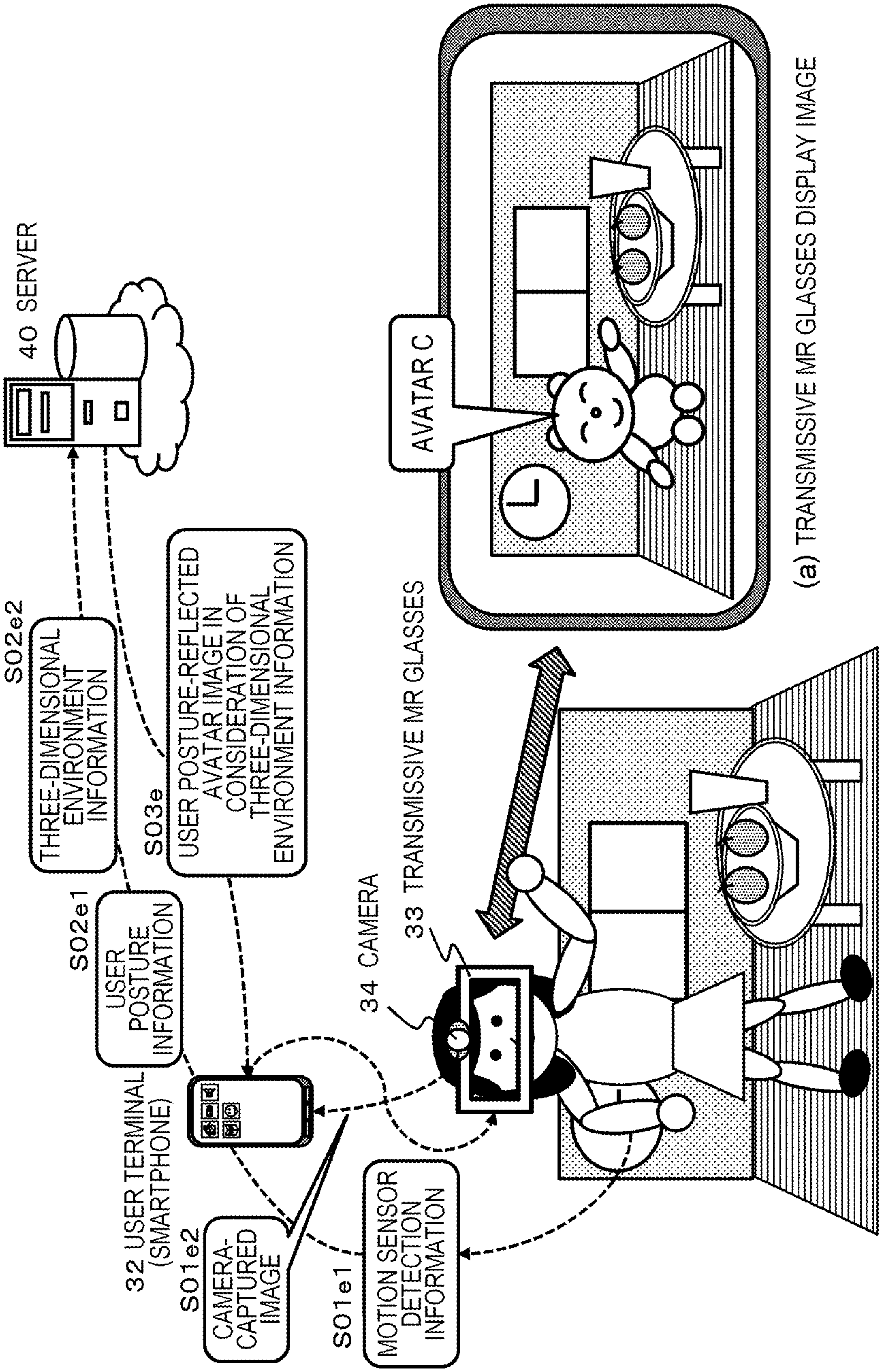
FIG. 4 is a diagram for describing configurations of an information processing system and an information processing device to which processing of the present disclosure is applicable and an outline of the processing.

FIG. 4 is a diagram for describing such a processing example.

The user terminal (smartphone) 32 inputs motion sensor detection information in step **S01*e*1 illustrated in FIG. 4, estimates the user posture, and transmits estimated user posture information to the server 40 in step S02*e*1**.

Moreover, in addition to these pieces of processing, the user terminal (smartphone) 32 inputs the image captured by the camera 34 and executes the above-described SLAM processing and the like to generate the three-dimensional environment information of the room in step **S01*e*2. Moreover, in step S02*e*2, the generated three-dimensional environment information of the room is transmitted to the server 40**.

The server 40 generates the user posture-reflected avatar image in consideration of the three-dimensional environment information of the room by using the user posture information received from the user terminal (smartphone) 32 and the three-dimensional environment information of the room, and transmits the user posture-reflected avatar image to the user terminal (smartphone) 32.

That is, the user posture-reflected avatar image is, for example, the avatar image in which the portion behind the table or the like has been deleted.

The user terminal (smartphone) 32 draws the user posture-reflected avatar image received from the server 40 on the transmissive MR glasses 33.

Such processing can also be performed.

Note that the configurations illustrated in FIGS. 3 and 4 have been described as processing examples using the transmissive MR glasses 33, but similar processing can be performed in a case where the non-transmissive MR glasses 31 are used.

Figure 5:
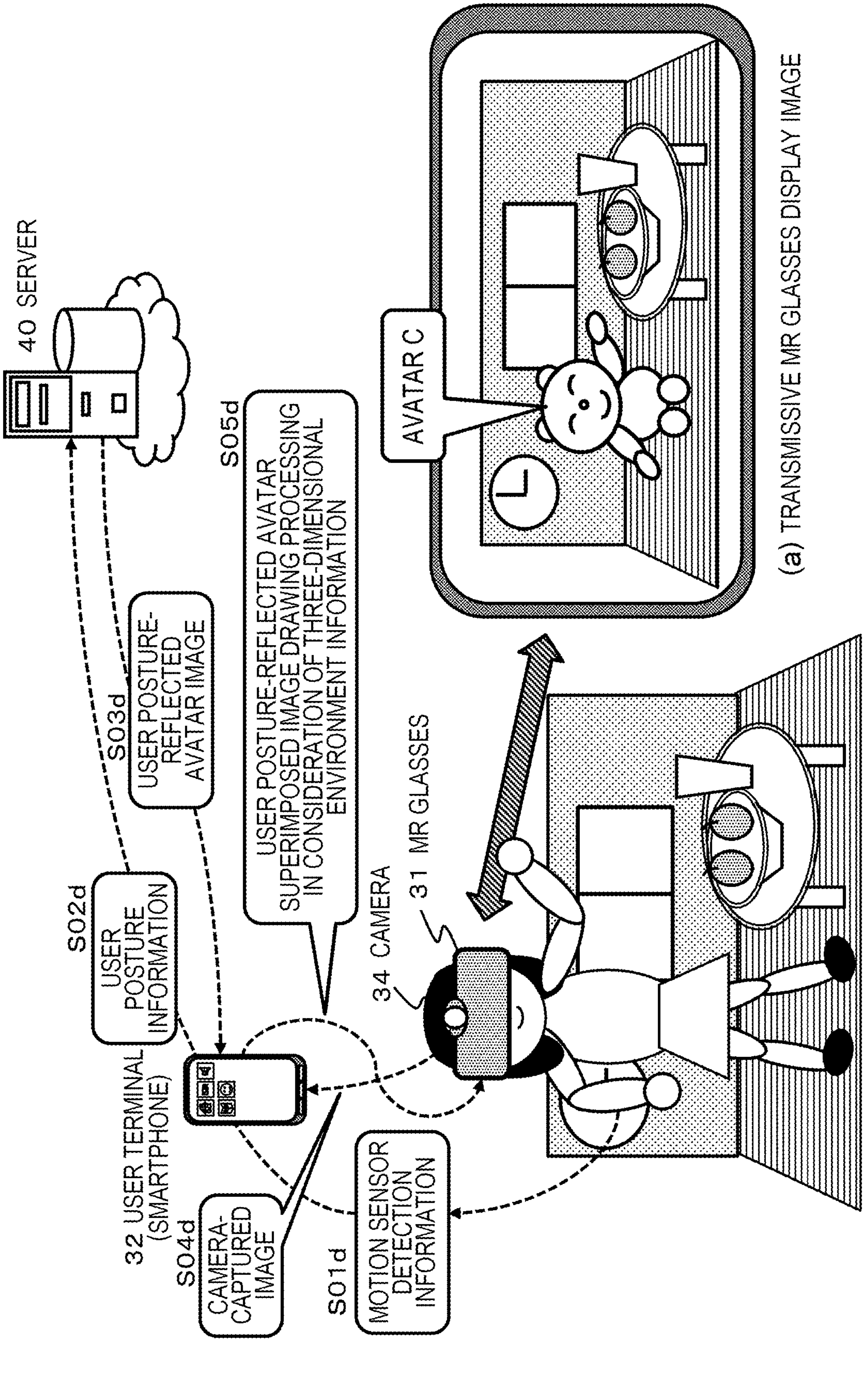
FIG. 5 is a diagram for describing configurations of an information processing system and an information processing device to which processing of the present disclosure is applicable and an outline of the processing.

For example, as illustrated in FIG. 5, processing of using the non-transmissive MR glasses 31, capturing an image of the room with the camera 34 attached to the MR glasses 31, and generating and displaying the MR image combined with the avatar image using the image of the room as a background image is possible.

The processing of the present disclosure enables control of moving the avatar while reducing the delay with respect to the motion of the user in the configuration for performing the avatar image generation and display processing as described with reference to FIGS. 1 to 5 describe above, for example.

Note that the processing of the present disclosure is not limited to the above-described MR image, and can be used in other augmented reality images (AR images), virtual reality images (VR images), and the like.

Next, an example of attaching the sensors (motion sensors) to the user will be described with reference to FIG. 6.

Figure 6:
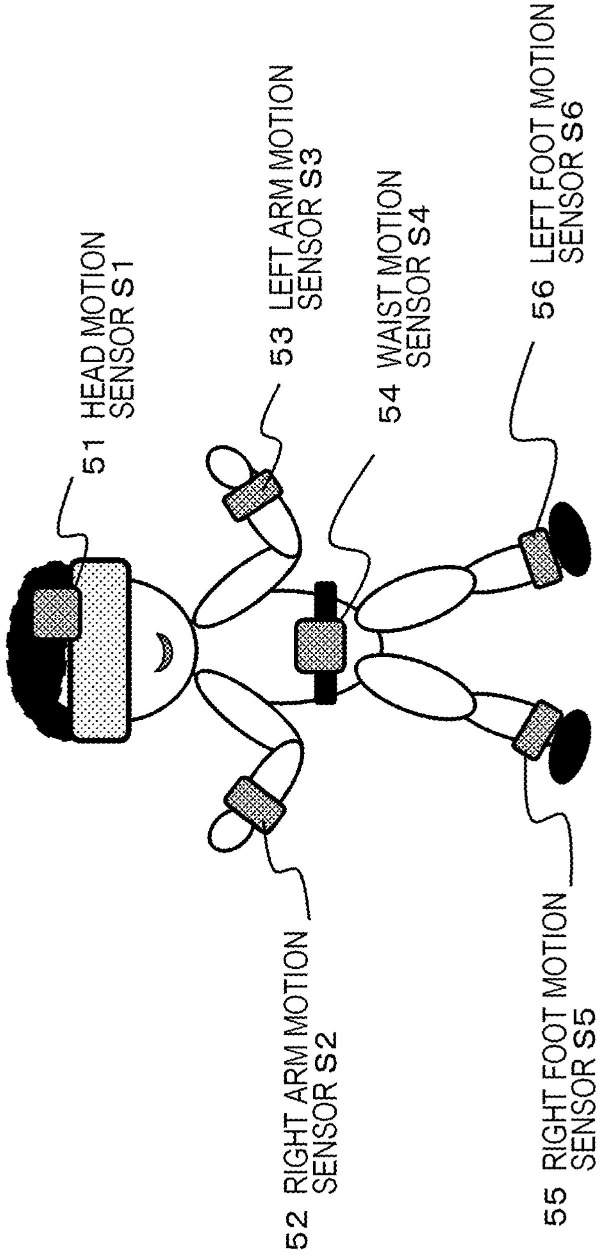
FIG. 6 is a diagram for describing an example of attaching sensors to a user.

In the example illustrated in FIG. 6, the user has the following six motion sensors attached to respective parts of the body:

(a) a head motion sensor S1,51;

(b) a right arm motion sensor S2,52;

(c) a left arm motion sensor S3,53;

(d) a waist motion sensor S4,54;

(e) a right foot motion sensor S5,55; and (f) a left foot motion sensor S6,56.

These six motion sensors individually detect the motions of these six parts of the head, the right arm, the left arm, the waist, the right foot, and the left foot of the user.

Note that, as the motion sensor, for example, an inertial measurement unit (IMU) is used.

The IMU is a motion sensor capable of simultaneously measuring accelerations in xyz three-axis directions, angular velocities around the xyz three axes, and the like.

As illustrated in FIG. 6, the motion sensors (IMUs) attached to the six parts of the head, the right arm, the left arm, the waist, the right foot, and the left foot of the user output the accelerations in the three-axis directions and the angular velocities around the three axes of these six parts of the head, the right arm, the left arm, the waist, the right foot, and the left foot of the user as sensor detection values, respectively.

Note that the example of attaching the sensors illustrated in FIG. 6 is an example of attaching the sensors to the six positions of the user's body.

However, this is an example, and various modes of attaching sensors are available, such as a configuration to attach the sensors to only both hands, a configuration to attach the sensors to only both hands and both feet, and a configuration to attach more sensors to respective parts of the body.

As described with reference to FIGS. 1 to 5 above, the detection values of the sensors attached to the user are transmitted to the user terminal such as the smartphone or the PC of the user.

The user terminal such as the smartphone or the PC of the user analyzes the sensor detection values of the plurality of motion sensors attached to the head, arms, feet, and the like of the user, and generates the three-dimensional posture information of the user.

Three-dimensional posture information generation processing of the user executed in the user terminal such as the smartphone or the PC will be described with reference to FIG. 7 and subsequent drawings.

Figure 7:
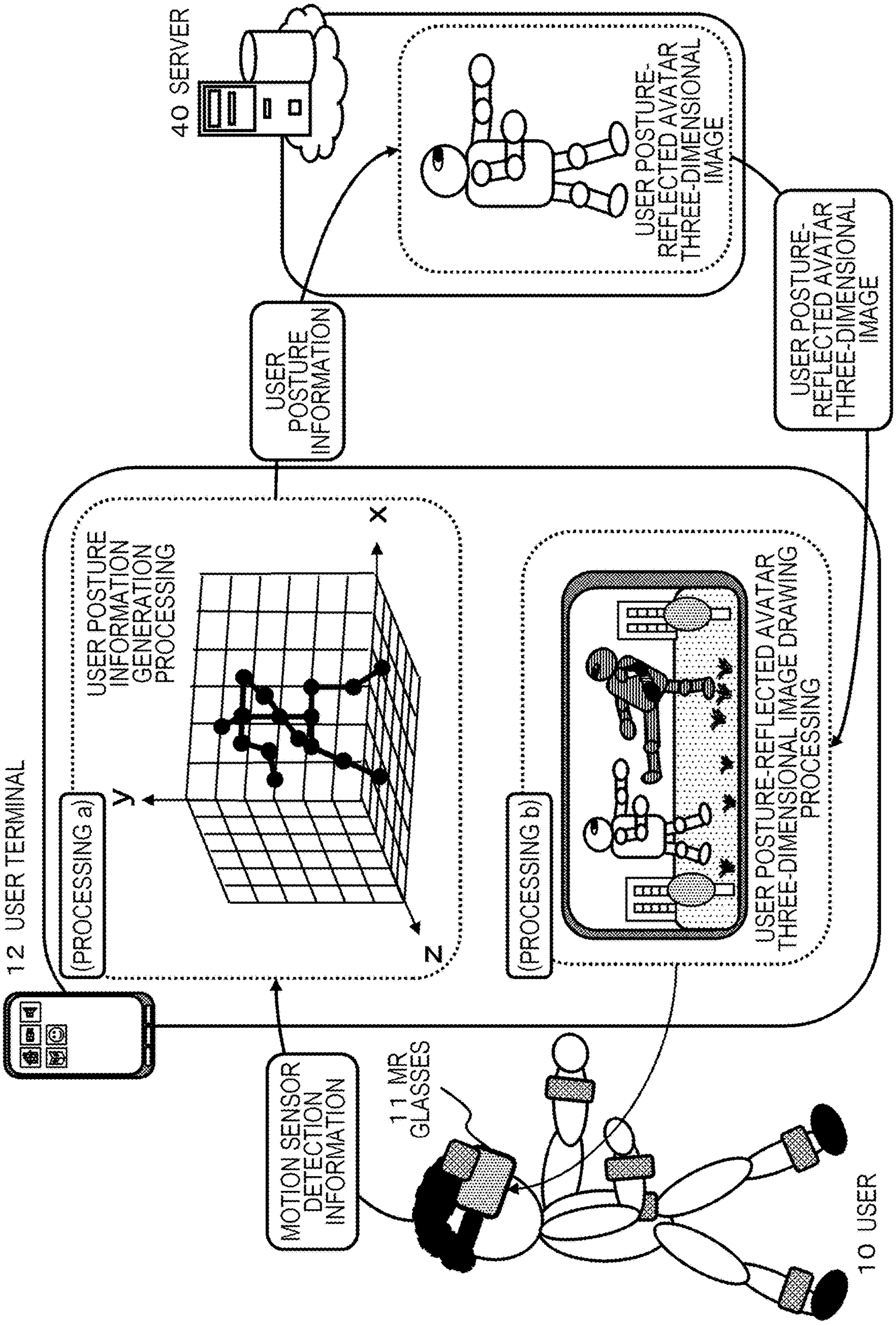
FIG. 7 is a diagram for describing three-dimensional posture information generation processing of a user executed in a user terminal such as a smartphone or a PC.

FIG. 7 is a diagram for describing representative processing executed by the user terminal (smartphone) 12.

Note that the user terminal to which the detection values of the sensors are input is the user terminal (smartphone) 12 or the user terminal (PC) 22 as described with reference to FIG. 1. Hereinafter, a processing example using the user terminal (smartphone) 12 will be described as a representative example of the user terminal.

As illustrated in FIG. 7, the user terminal (smartphone) 12 executes the user posture information generation processing as (processing a).

The user terminal (smartphone) 12 inputs the detection values of the sensors attached to the respective parts of the body of the user 10, and generates the user posture information.

The user posture information is three-dimensional posture information in a three-dimensional space. This user posture information generation processing is executed using, for example, a learning model generated in advance.

Details of this processing will be described below.

As illustrated in FIG. 7, the user posture information generated on the basis of the sensor detection values by the user terminal (smartphone) 12 is transmitted to the server 40.

The server 40 generates the avatar three-dimensional image having the same posture as the user posture information received from the user terminal (smartphone) 12, that is, the user posture-reflected avatar three-dimensional image, and transmits the generated image to the user terminal (smartphone) 12.

As (processing b), the user terminal (smartphone) 12 executes the three-dimensional image drawing processing for displaying the user posture-reflected avatar three-dimensional image received from the server 40 on the display unit of the MR glasses 11 worn by the user 10.

Next, details of (processing a) the user posture information generation processing executed by the user terminal such as the user terminal (smartphone) 12 illustrated in FIG. 7, in other words, the user posture information generation processing based on the sensor detection values will be described with reference to FIG. 8.

Figure 8:
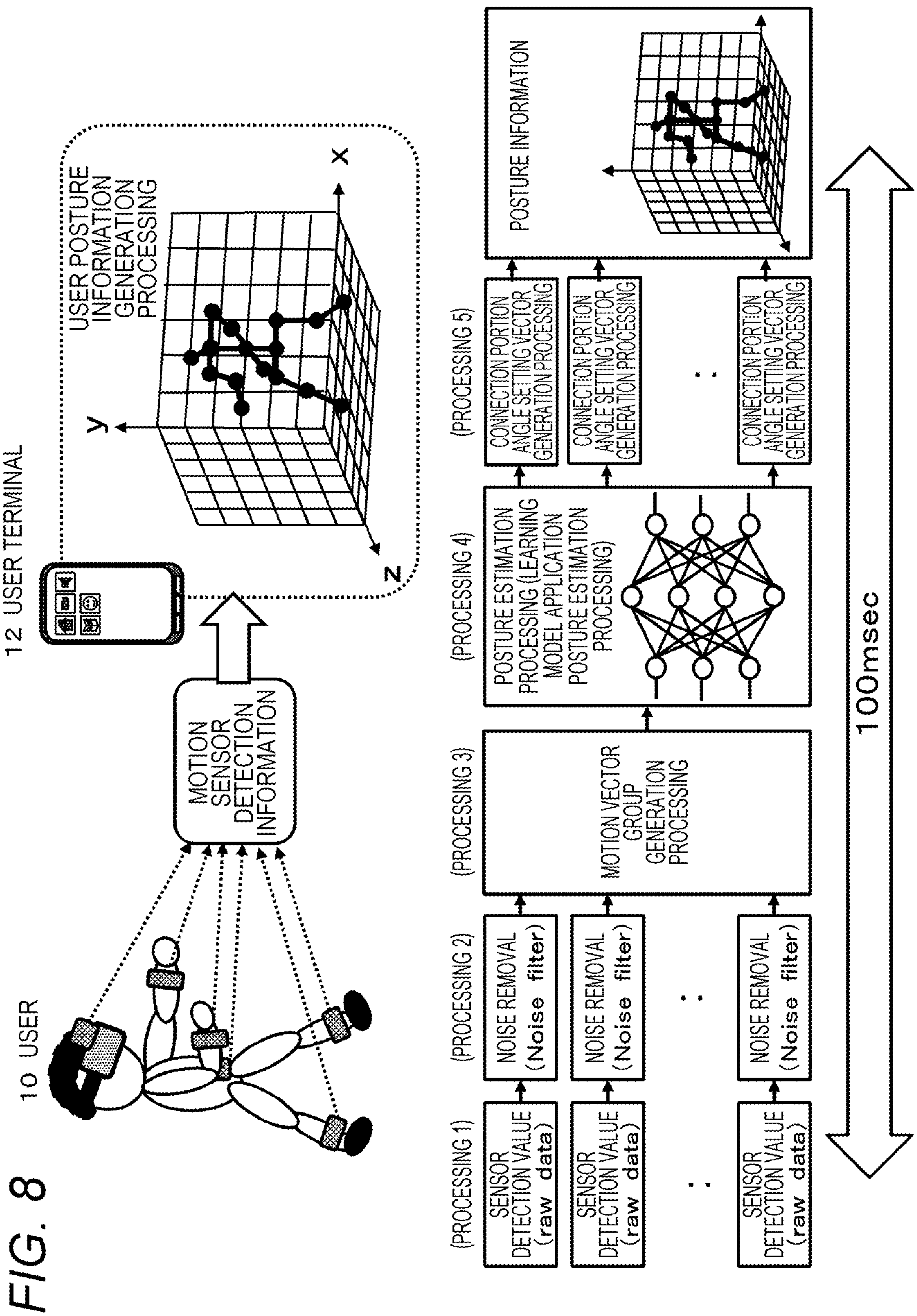
FIG. 8 is a diagram for describing details of user posture information generation processing based on sensor detection values.

The diagram illustrated on the lower side of FIG. 8 is a diagram for describing a detailed sequence example of the user posture information generation processing based on the sensor detection values executed by the user terminal such as the smartphone.

As illustrated in the lower diagram of FIG. 8, the following respective pieces of processing are sequentially executed in the user posture information generation processing based on the sensor detection values.

(Processing 1) Sensor detection value input processing
(Processing 2) Noise removal processing
(Processing 3) Motion vector group generation processing
(Processing 4) Posture estimation processing (learning model application posture estimation processing)
(Processing 5) Connection portion angle setting vector generation processing These respective pieces of processing (Processing 1) to (Processing 5) are sequentially executed to generate "posture information" indicating the three-dimensional posture of the user.

"(Processing 1) Sensor detection value input processing" is processing of inputting the detection values of the sensors attached to the respective parts (the head, right arm, left arm, waist, right foot, left foot, and the like) of the user's body.

Note that, as described above, processing of transmitting the sensor detection values from the sensors to the user terminal (smartphone) 12 is executed using proximity communication such as Bluetooth (registered trademark) communication, for example.

"(Processing 2) Noise removal processing" is processing of removing a noise component from the sensor detection values input to the user terminal (smartphone) 12. For example, the noise component is removed by applying a prescribed noise removal algorithm such as processing of removing a high frequency component of a prescribed frequency or higher.

"(Processing 3) Motion vector group generation processing" is processing of generating a motion vector indicating an individual motion of each part of the user's body to which the sensor is attached on the basis of the sensor detection values from which noise has been removed.

As described above, for example, an inertial measurement unit (IMU) is used as the sensor.

The IMU is a motion sensor capable of simultaneously measuring the accelerations in the xyz three-axis directions, angular velocities around the xyz three axes, and the like, and the user terminal (smartphone) 12 can acquire IMU output values of the six points of the head, the right arm, the left arm, the waist, the right foot, and the left foot of the user.

The user terminal (smartphone) 12 generates a plurality of motion vectors corresponding to the respective parts reflecting motion directions and motion speeds of the respective parts on the basis of the sensor output values of the respective parts (the head, right arm, left arm, waist, right foot, and left foot) of the user's body.

"(Processing 4) Posture estimation processing (learning model application posture estimation processing)" is processing of estimating the three-dimensional posture of the user on the basis of the motion vectors corresponding to the respective parts of the user's body generated in (processing 3).

The three-dimensional posture estimation processing of the user based on the motion vectors is executed using, for example, a learning model generated in advance.

The learning model is a learning model that inputs the motion vector corresponding to each part of the user's body and outputs the user posture.

This learning model is a learning model generated in advance using a large number of sample data, for example, correspondence data between a large number of different motion vector groups and the user postures.

"(Processing 5) Connection portion angle setting vector generation processing" is processing of interpolating the user posture estimated using the learning model in (processing 4), and is processing of generating the posture information of the entire body of the user by interpolating the posture and position of a body part that are insufficient in the user posture information estimated using the learning model.

By executing these pieces of (Processing 1) to (Processing 5), the three-dimensional posture information of the user 10 can be generated.

As described with reference to FIG. 8, in the user posture information generation processing based on the sensor detection values, the plurality of processing steps such as the processing of generating the motion vectors based on the sensor output values and the processing of inputting the generated motion vector to the learning model to estimate the user posture needs to be sequentially executed, and a predetermined time is required to generate one user posture.

For example, the processing time required to generate one user posture is 100 msec. In this case, as illustrated in FIG. 9, the user terminal can execute the user posture information generation processing based on the sensor detection values only at intervals of 100 msec.

In other words, the user posture information generated by the user terminal (smartphone) 12 is posture information generated on the basis of the sensor detection values 100 msec earlier.

Figure 9:
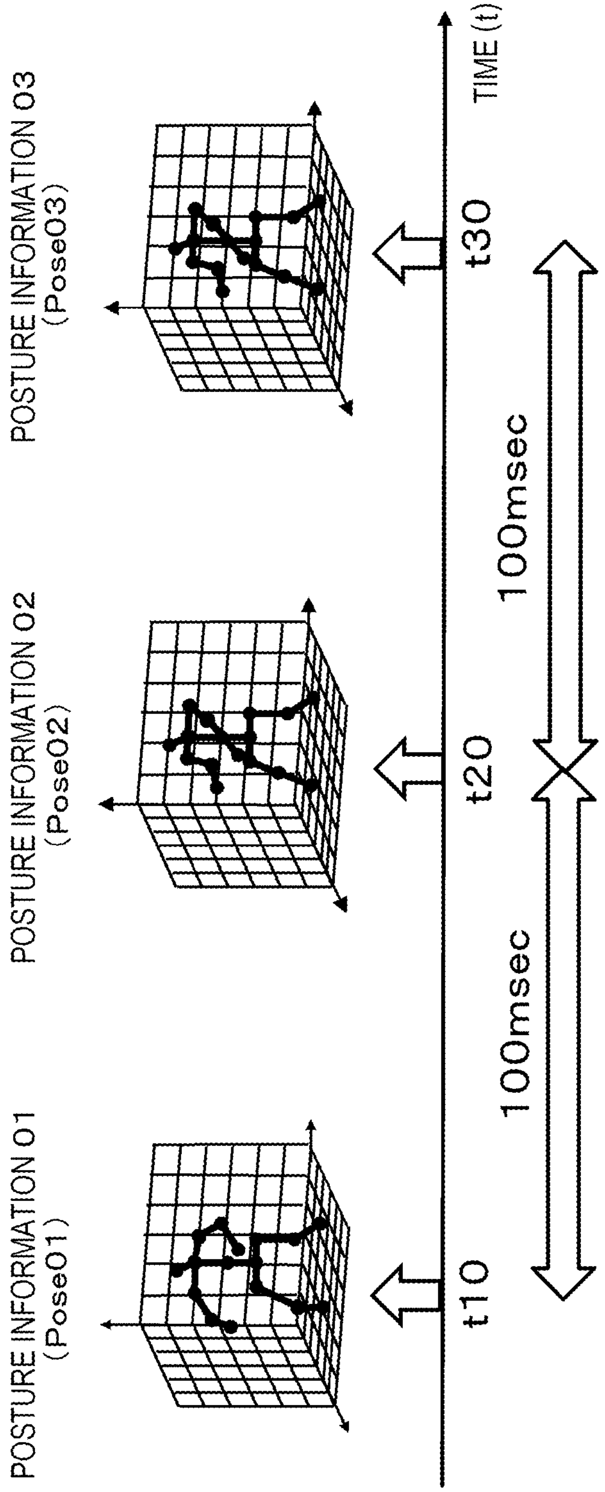
FIG. 9 is a diagram for describing a user posture information generation processing sequence based on the sensor detection values by the user terminal.

As illustrated in FIG. 9, in a case where the user terminal such as the user terminal (smartphone) 12 generates the user posture information based on the sensor detection values at the time (t10), the next generable new user posture information is generated at the time (t20) that is 100 msec after the time (t10). Moreover, the next generable new user posture information is generated at the time (t30) that is 100 msec after the time (t20).

For example, posture information 02 (Pose02) generated at the time (t20) is the posture information generated on the basis of the sensor detection values at the time (t10) that is 100 msec before the time (t20).

Furthermore, posture information 03 (Pose03) generated at the time (t30) is the posture information generated on the basis of the sensor detection values at the time (t20) that is 100 msec before the time (t30).

The user posture information generated by the user terminal such as the user terminal (smartphone) 12 is transmitted to the server 40, and the server 40 generates the three-dimensional image of the avatar, that is, the user posture-reflected avatar three-dimensional image on the basis of the user posture information received from the user terminal.

Moreover, the user posture-reflected avatar three-dimensional image generated by the server 40 is transmitted to the user terminal (smartphone) 12 and drawn in the MR glasses 11.

When the processing time required for the user posture information generation processing in the user terminal such as the user terminal (smartphone) 12 is long, a gap occurs between the actual motion of the user and the motion of the avatar displayed on the MR glasses 11. That is, the motion of the avatar may be delayed from the motion of the user.

A display example of the avatar image in which a delay with respect to the motion of the user has occurred will be described with reference to FIG. 10.

Figure 10:
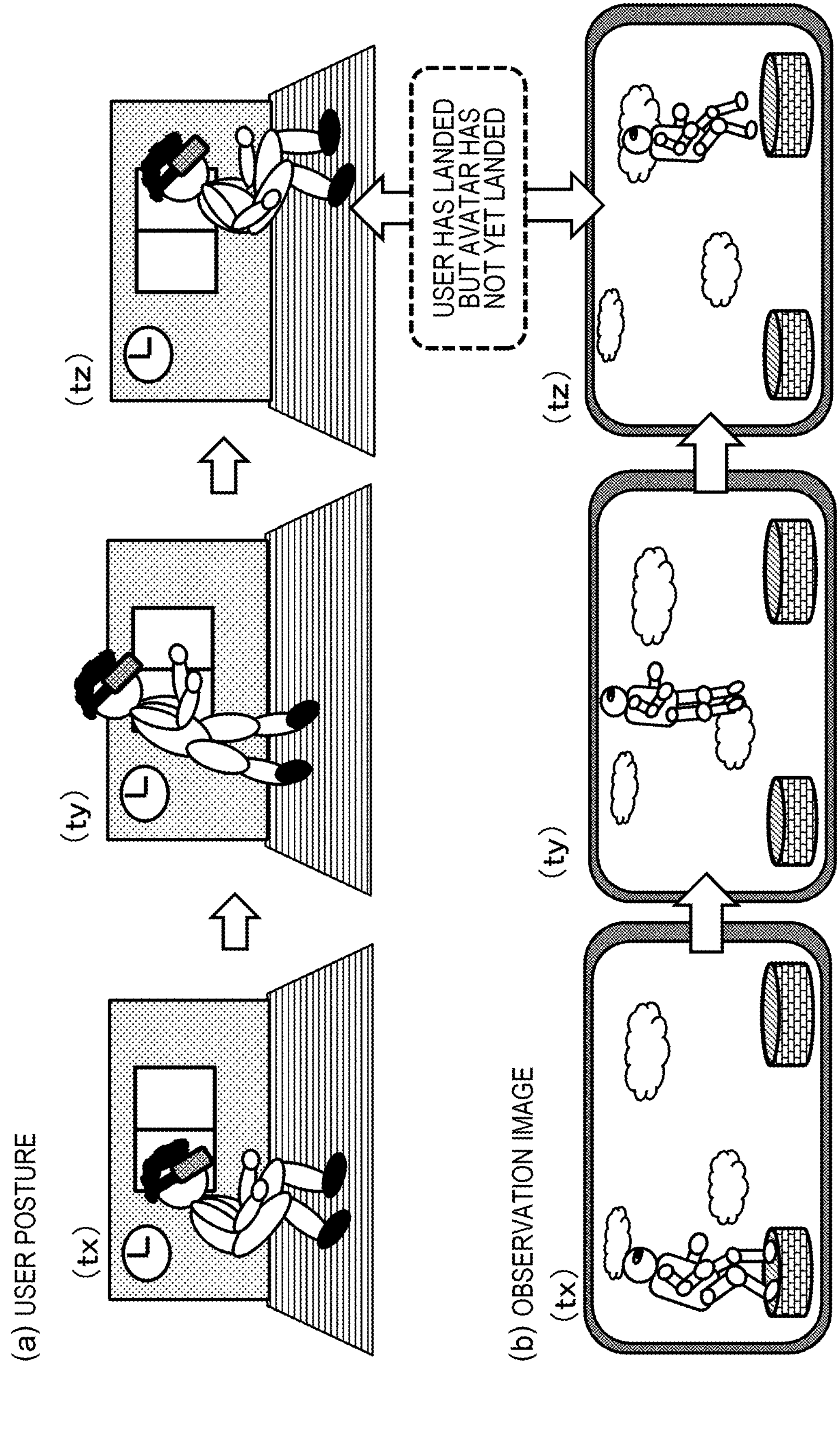
FIG. 10 is a diagram for describing a display example of an avatar image in which a delay with respect to a motion of the user has occurred.

FIG. 10(*a*) is a diagram illustrating a transition of the posture of the user having the sensors attached to the respective parts of the body over time (tx to ty to tz).

The user has started a jump and landed between times tx and tz.

Meanwhile, FIG. 10(*b*) is a diagram illustrating a change over time (tx to ty to tz) of the avatar image generated using the user posture information generated on the basis of the sensors attached to the user.

For example, at the time (tz), the user has landed on the floor, but the avatar on the display image at the same time (tz) has not yet landed.

This is because the avatar image at the time (tz) is an avatar image reflecting the user posture before the time (tz).

That is, the avatar image at the time (tz) is the user posture-reflected avatar image generated on the basis of the user posture before the time (tz), specifically, the user posture generated using sensor detection information immediately before landing.

In such a case, the user observes the avatar image delayed from the actual motion of the user with the MR glasses 11, and feels uncomfortable, and the user may not be able to perform the desired motion or action.

The processing of the present disclosure solves such a problem. That is, the present disclosure realizes the three-dimensional image display processing for the avatar without delay or with less delay with respect to the motion of the user.

2. Specific Example of Processing Executed by Information Processing Device of Present Disclosure Hereinafter, a specific example of the processing executed by the information processing device of the present disclosure will be described.

Figure 11:
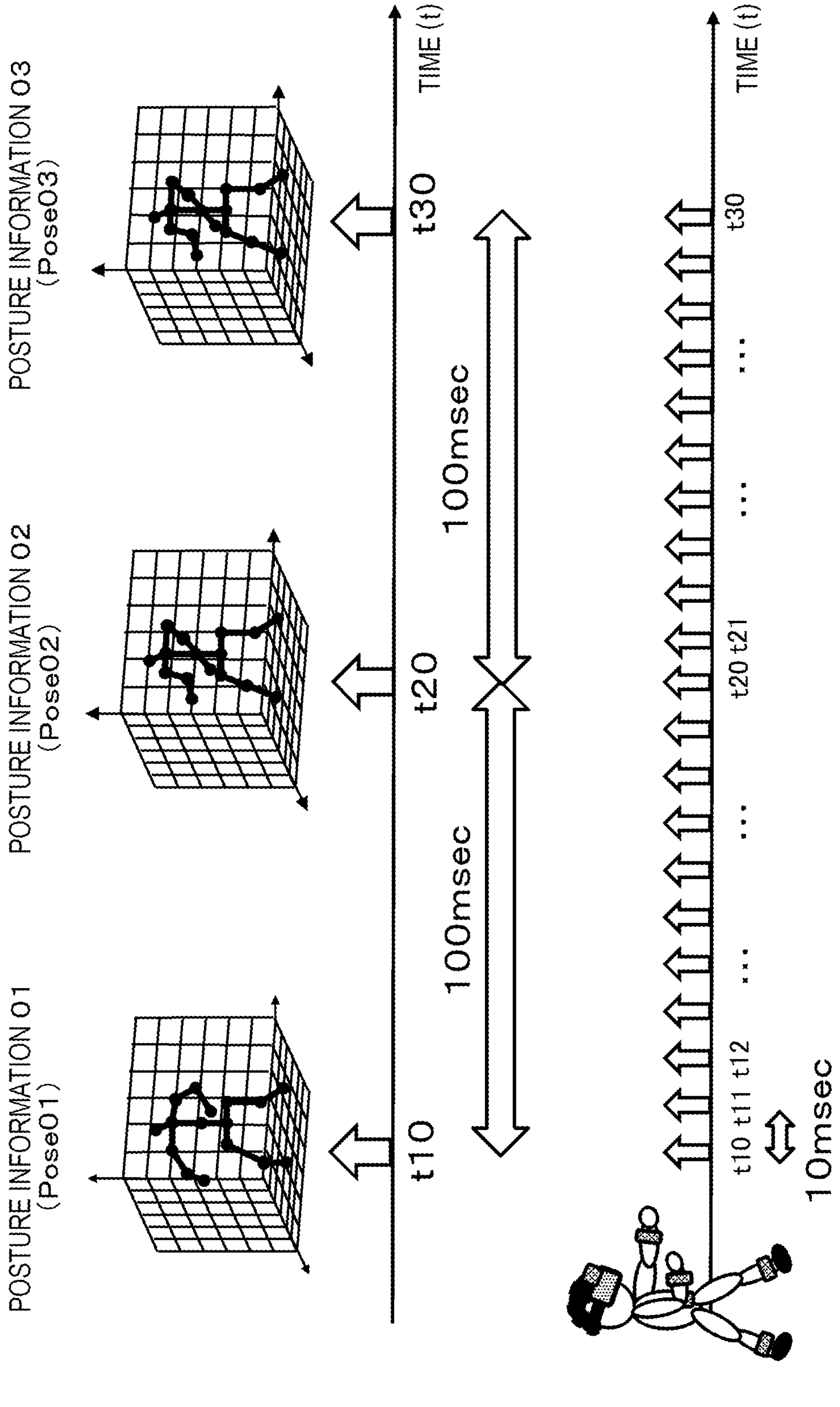
FIG. 11 is a diagram for describing generation timing of the user posture information generated on the basis of the sensor detection values by the user terminal and output timing of the sensor detection values output by the sensors attached to the user.

FIG. 11 is a diagram illustrating generation timing of the user posture information generated on the basis of the sensor detection values by the user terminal such as the smartphone and output timing of the sensor detection values output by the sensors such as the IMUs attached to the user side by side.

The upper row illustrates the generation timing of the user posture information generated on the basis of the sensor detection values by the user terminal such as the smartphone.

As described above with reference to FIG. 9, the user terminal such as the smartphone updates the user posture information at intervals of 100 msec, for example, and transmits the user posture information to the server.

Meanwhile, the motion sensor such as the IMU attached to each part of the user's body can sequentially output the sensor detection value at intervals of 10 msec, for example.

Although a detection value output interval of the sensor, that is, a sampling time varies depending on the sensor, it is possible to output a new sensor detection value at a time interval much shorter than a user posture calculation interval (100 msec) in the upper row.

Here, the description will be given assuming that the motion sensor such as the IMU attached to each part of the user's body has a configuration capable of outputting the new sensor detection value every 10 msec.

A specific example of the processing of the present disclosure will be described with reference to FIG. 12.

Figure 12:
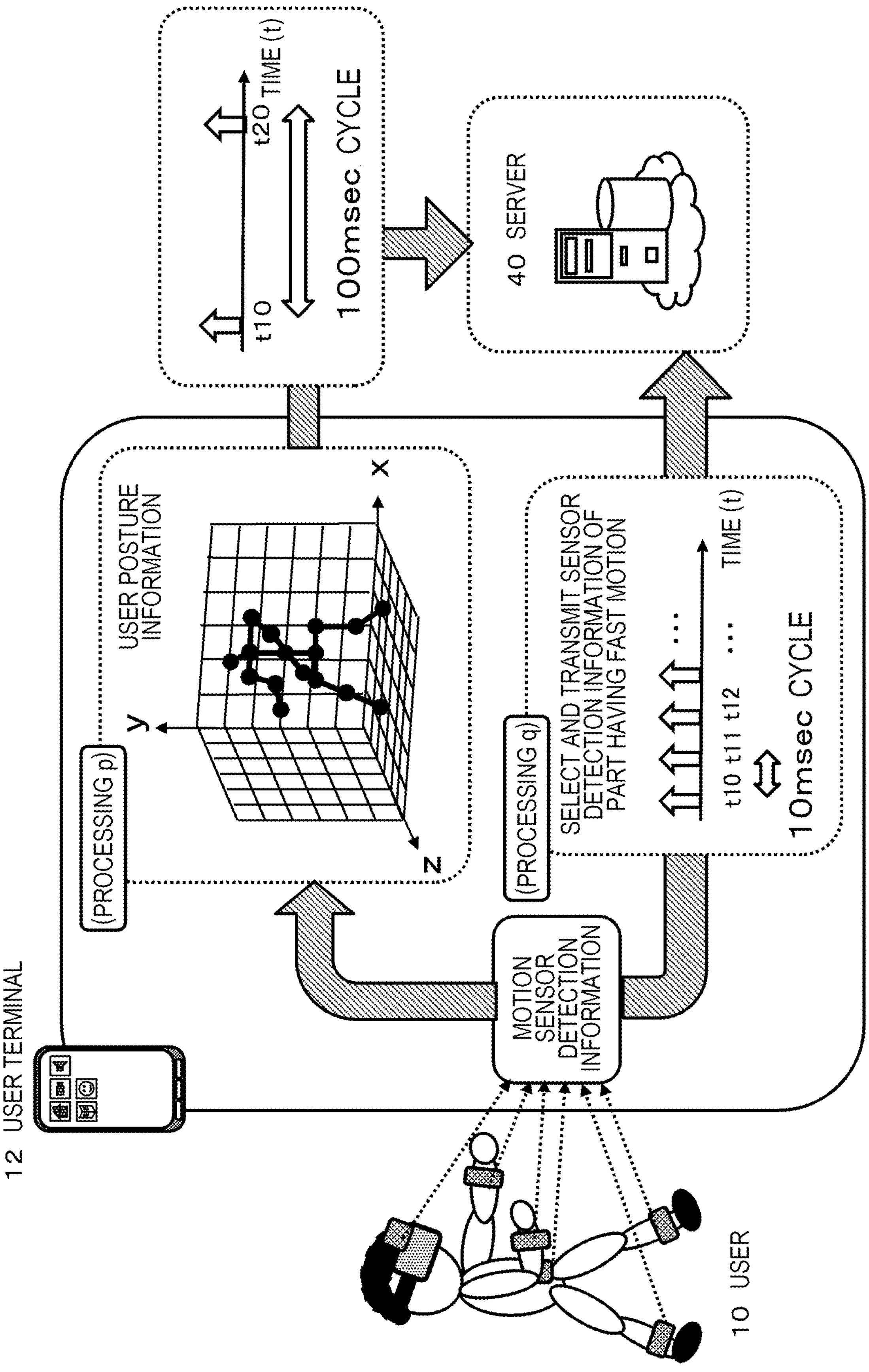
FIG. 12 is a diagram for describing an example of processing performed by the information processing device of the present disclosure.

As illustrated in FIG. 12, the user terminal such as the user terminal (smartphone) 12 executes (processing p) and (processing q) illustrated in FIG. 12 together.

That is, (processing p) the posture information generation processing based on the motion sensors such as the IMUs attached to the respective parts of the user's body and the processing of transmitting the generated posture information to the server 40, and (processing q) the processing of transmitting the sensor detection value of the part having a faster motion to the server 40 as it is from among the sensor detection values of the motion sensors such as the IMUs attached to the respective parts of the user's body.

These pieces of processing p and q are executed together.

The user posture information generation processing and the posture information transmission processing to the server 40 in (processing p) are executed in a cycle of 100 msec. In contrast, the sensor detection information transmission processing to the server 40 in (processing q) is executed in a cycle of 10 msec.

That is, the server 40 can receive the sensor detection value of the part having a fast motion at earlier timing.

The server 40 generates the user posture-reflected avatar three-dimensional image using two types of information: the user posture information received from the user terminal (smartphone) 12 in a cycle of 100 msec; and the sensor detection information received in a cycle of 10 msec.

Details of the user posture-reflected avatar three-dimensional image generation processing using the two types of information executed in the server 40 will be described below.

The sensor detection information to be transmitted to the server 40 in FIG. 12 (processing q) does not include all the detection values of the sensors attached to the respective parts (the head, right arm, left arm, waist, right foot, and left foot) of the body of the user 10, but only the sensor detection values of the parts determined to be moving at a speed equal to or higher than a prescribed threshold.

That is, the sensor detection value transmitted to the server 40 is selected according to the motion of the user. A specific example will be described with reference to FIGS. 13 and 14.

Figure 13:
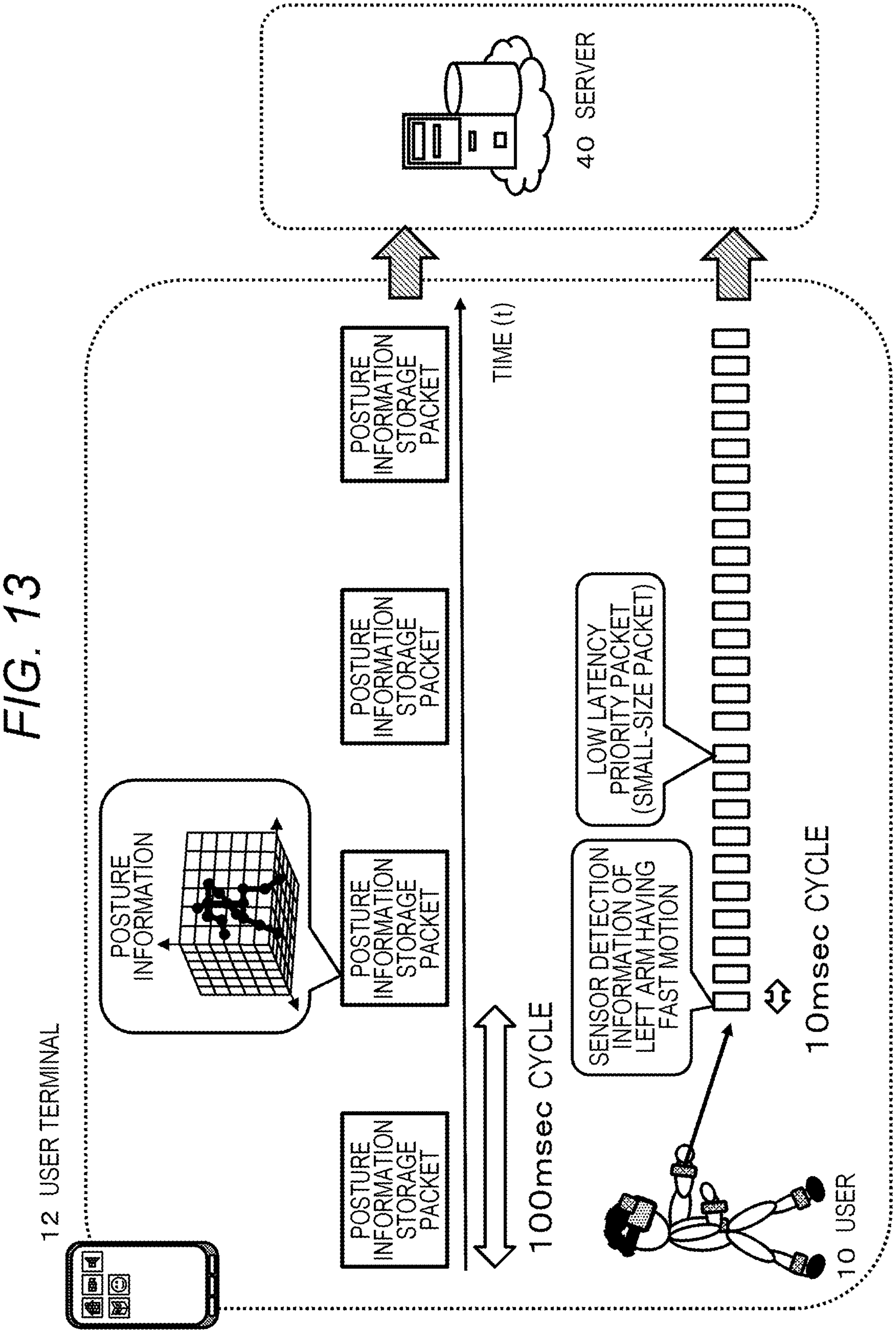
FIG. 13 is a diagram for describing a processing example of selecting the sensor detection value to be transmitted to a server according to the motion of the user.

FIG. 13 illustrates a data transmission processing example in a case where the user 10 executes "punch" letting the left arm protrude forward.

As illustrated in the upper row of FIG. 13, the user terminal (smartphone) 12 executes the user posture information generation processing and the posture information transmission processing to the server 40 in a cycle of 100 msec.

The user terminal (smartphone) 12 generates user posture information storage packets at intervals of 100 msec and transmits the packets to the server 40.

Moreover, as illustrated in the lower row of FIG. 13, the user terminal (smartphone) 12 selectively acquires the sensor detection value of the left arm of the user 10 with a fast motion and transmits the sensor detection value to the server 40. A small-size packet storing the sensor detection value is generated at the same interval as the sampling cycle (10 msec) of the sensor and transmitted to the server 40.

Note that the sensor detection value storage packet is preferably transmitted to the server 40 as a low latency priority packet that is preferentially transmitted according to, for example, quality of service (QoS). By performing the processing according to the Qos, the sensor detection value storage packet is transmitted to the server 40 without delay.

The server 40 generates the user posture-reflected avatar three-dimensional image using two types of information: the user posture information received from the user terminal (smartphone) 12 in a cycle of 100 msec; and the sensor detection information of the left arm with a fast motion of the user 10 received in a cycle of 10 msec.

Figure 14:
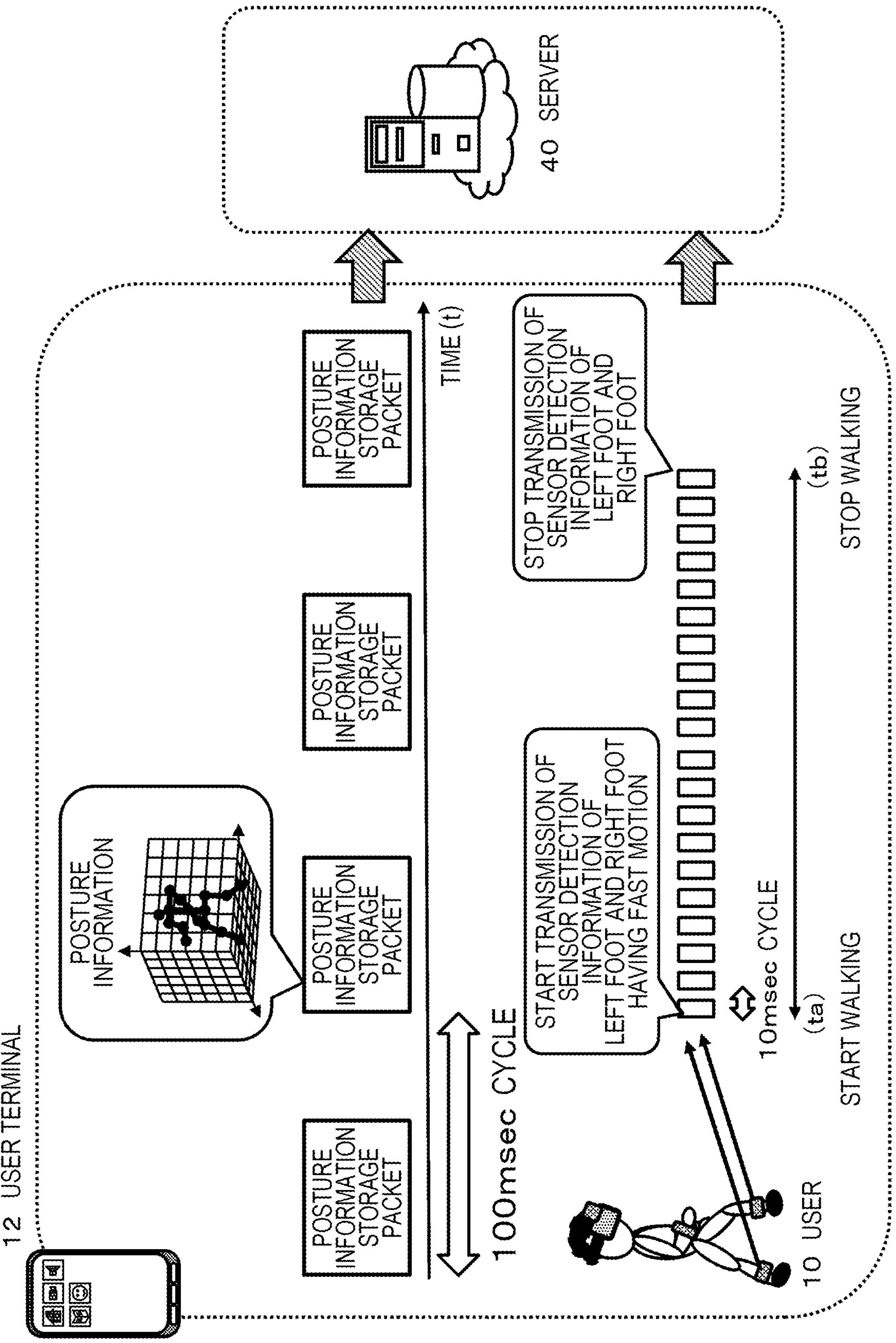
FIG. 14 is a diagram for describing a processing example of selecting the sensor detection value to be transmitted to the server according to the motion of the user.

The example illustrated in FIG. 14 is a diagram for describing transmission start processing and transmission stop processing for the sensor detection values executed by the user terminal (smartphone) 12 in a case where the user 10 starts walking and then stops walking.

As illustrated in the upper row of FIG. 14, the user terminal (smartphone) 12 executes the user posture information generation processing and the posture information transmission processing to the server 40 in a cycle of 100 msec.

The user terminal (smartphone) 12 generates user posture information storage packets at intervals of 100 msec and transmits the packets to the server 40.

Moreover, as illustrated in the lower row of FIG. 14, the user terminal (smartphone) 12 selectively acquires the sensor detection values of the left foot and the right foot of the user 10 with a fast motion only in a walking period (ta to tb) in which the user 10 is walking, and transmits the sensor detection values to the server 40. A small-size packet storing the sensor detection value is generated at the same interval as the sampling cycle (10 msec) of the sensor detection value and transmitted to the server 40.

At the walking start timing (ta) of the user 10, the user terminal (smartphone) 12 starts processing of generating the small-size packet storing the sensor detection values of the left foot and the right foot of the user 10 with a fast motion and starts processing of transmitting the packet to the server 40.

Thereafter, at the walking end timing (tb) of the user 10, the user terminal (smartphone) 12 stops the processing of generating the small-size packet storing the sensor detection values of the left foot and the right foot of the user 10 with a slower motion, and stops the processing of transmitting the packet to the server 40.

The server 40 generates the user posture-reflected avatar three-dimensional image using the user posture information received from the user terminal (smartphone) 12 in a cycle of 100 msec; and the sensor detection information of the right and left feet with a fast motion of the user 10 received in a cycle of 10 msec only in the walking period of the user 10.

Next, the user posture-reflected avatar three-dimensional image generation processing using two types of information executed in the server 40, that is, two types of information of the user posture information and the sensor detection information will be described in detail with reference to FIG. 15.

Figure 15:
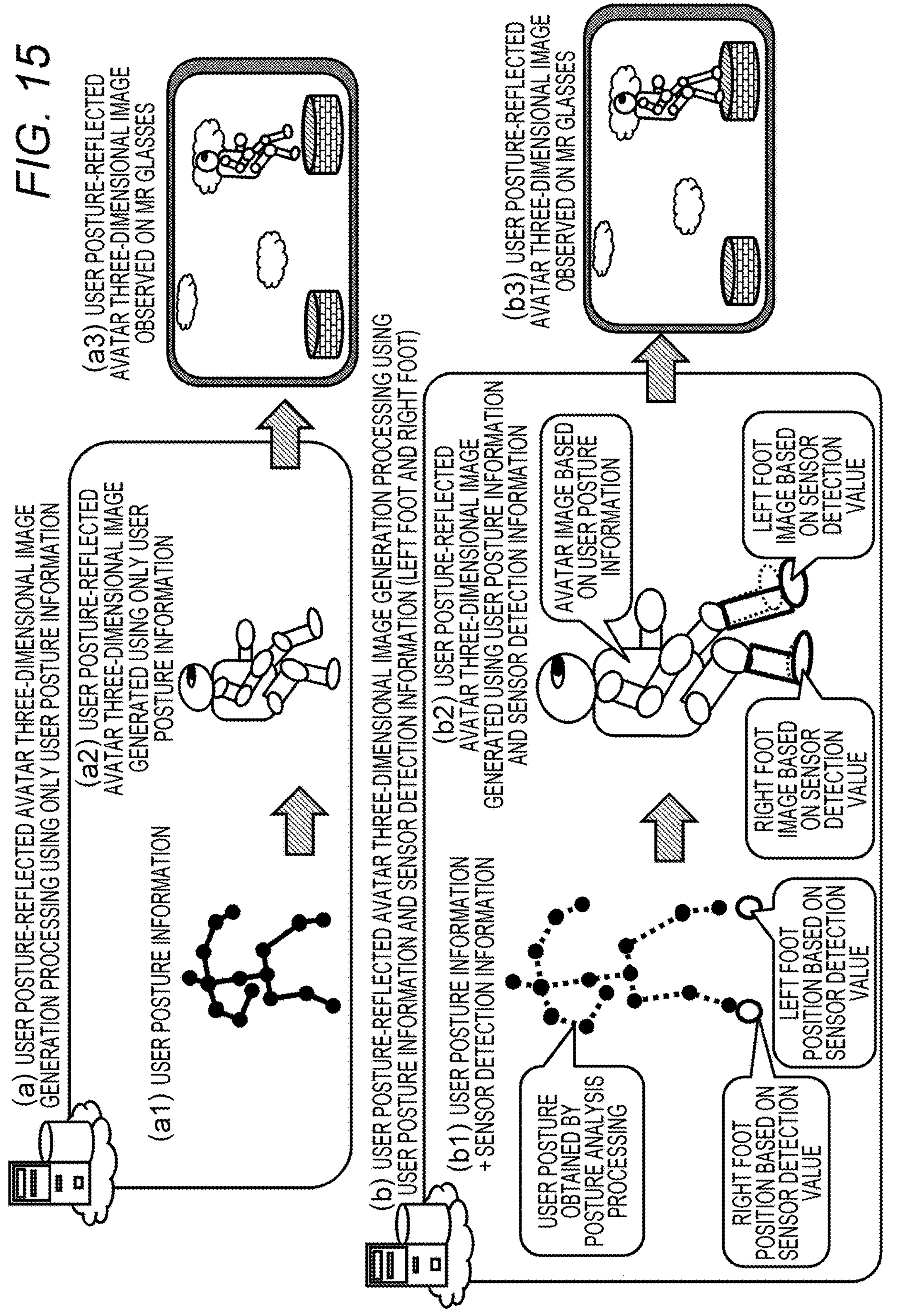
FIG. 15 is a diagram for describing details of user posture-reflected avatar three-dimensional image generation processing using two types of information of user posture information and sensor detection information.

FIG. 15 is a diagram for describing a user posture-reflected avatar three-dimensional image generation processing example in the case of the motion of the user described with reference to FIG. 10 above, that is, the case where the user jumps and lands.

FIG. 15 illustrates the following two user posture-reflected avatar three-dimensional image generation processing examples:

(a) the user posture-reflected avatar three-dimensional image generation processing using only the user posture information; and (b) the user posture-reflected avatar three-dimensional image generation processing using the user posture information and the sensor detection information (left foot and right foot).

(a) is processing similar to that described above with reference to FIG. 8, and is the user posture-reflected avatar three-dimensional image generation processing using only the user posture information.

In this processing, the server 40 generates the user posture-reflected avatar three-dimensional image by using only the user posture information received at intervals of 10 mmsec from the user terminal (smartphone) 12.

That is, the user posture-reflected avatar three-dimensional image as illustrated in FIG. 15(*a*2) is generated using only the (a1) user posture information illustrated in FIG. 15.

As a result, the avatar image displayed in the MR glasses of the user at the timing when the user has landed becomes the avatar image immediately before landing as illustrated in FIG. 15(*a*3).

In contrast, (b) the user posture-reflected avatar three-dimensional image generation processing using the user posture information and the sensor detection information (left foot and right foot) is the user posture-reflected avatar three-dimensional image generation processing using the user posture information and the sensor detection information (left foot and right foot) described with reference to FIGS. 12 to 14.

FIG. 15(*b*1) illustrates the user posture information, and right foot position information and left foot position information based on the sensor detection values.

Data indicated by the black circles and the dotted lines is the user posture information. This user posture information is information similar to the user posture information illustrated in (a1), and is user posture information received from the user terminal (smartphone) 12 at intervals of 100 msec. Moreover, FIG. 15(*b*1) illustrates the right foot position information and the left foot position information based on the sensor detection values indicated by the white circles.

The right foot position information and the left foot position information are the latest right foot position information and left foot position information of the user obtained using the sensor detection information received from the user terminal (smartphone) 12 at intervals of 10 sec.

The server 40 uses these pieces of information, that is, all pieces of information of the user posture information indicated by the black circles and the dotted lines and the right foot position information and the left foot position information based on the sensor detection values indicated by the white circles to generate the user posture-reflected avatar three-dimensional image as illustrated in FIG. 15(*b*2).

The server 40 combines the user posture-reflected avatar three-dimensional image generated using the user posture information indicated by the black circles and the dotted lines with the latest right foot position information and left foot position information of the user obtained using the sensor detection information received at intervals of 10 sec from the user terminal (smartphone) 12 to generate the user posture-reflected avatar three-dimensional image.

That is, the server 40 performs correction to replace a right foot position and a left foot position of the user posture-reflected avatar three-dimensional image generated using the user posture information indicated by the black circles and the dotted lines with the latest right foot position information and left foot position information of the user obtained using the sensor detection information to generate the user posture-reflected avatar three-dimensional image.

As a result, the avatar image displayed in the MR glasses of the user at the timing when the user has landed is displayed as a landed avatar image as illustrated in FIG. 15(*b*3).

That is, the user can observe the landed avatar image at landing timing of the user with the MR glasses.

As described above, the server 40 includes the posture-reflected three-dimensional avatar image generation unit, and the posture-reflected three-dimensional avatar image generation unit of the server 40 executes the image correction processing of reflecting the user part positions estimated on the basis of the sensor detection values on the posture-based avatar image generated on the basis of the user posture information to generate the user posture-reflected three-dimensional avatar image.

Note that the sensor detection values used for the image correction processing by the posture-reflected three-dimensional avatar image generation unit of the server 40 is the sensor detection values newer than the sensor detection values used for the user posture information generation processing.

An avatar image generation and display processing example to which processing of the present disclosure is applied, in other words, an avatar image generation and display processing example using two types of information of the user posture information and the sensor detection information, will be described with reference to FIG. 16.

Figure 16:
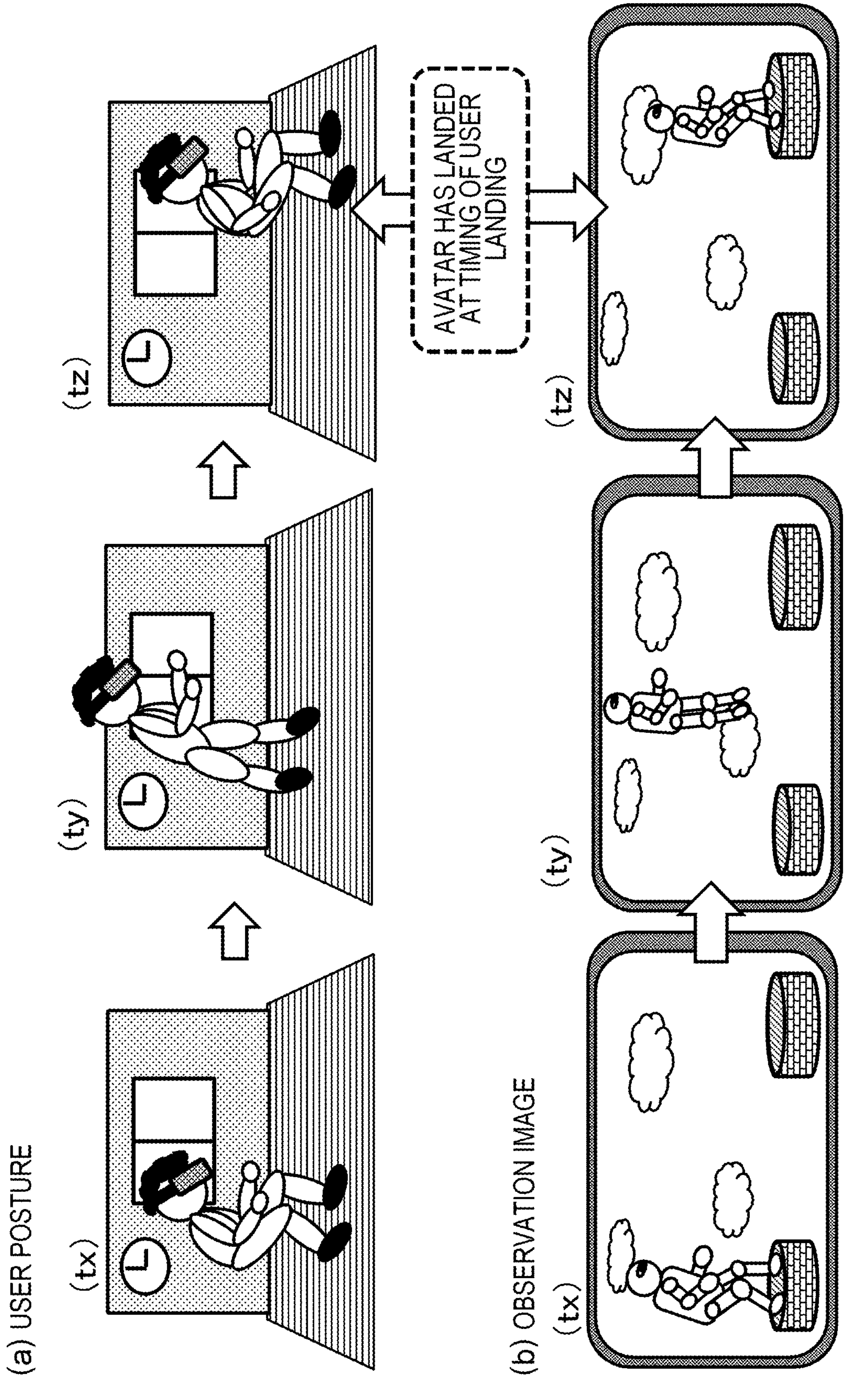
FIG. 16 is a diagram illustrating an avatar image generation and display processing example to which processing of the present disclosure is applied, in other words, an avatar image generation and display processing example using two types of information of user posture information and sensor detection information.

FIG. 16(*a*) is a processing example similar to FIG. 10, and is a diagram illustrating a transition over time (tx to ty to tz) of the posture of the user having the sensors attached to the respective parts of the body.

The user has started a jump and landed between times tx and tz.

Meanwhile, FIG. 16(*b*) is a diagram illustrating a change over time (tx to ty to tz) of the avatar image generated using the latest right foot position information and left foot position information of the user obtained by using the user posture information received at intervals of 100 sec from the user terminal (smartphone) 12 on the basis of the sensors attached to the user and the sensor detection information received at intervals of 10 sec from the user terminal (smartphone) 12.

At the time (tz), the user is landing on the floor. The avatar on the display image at the same time (tz) is also landing.

The avatar image at the time (tz) is an avatar image generated by composition processing using the right foot position information and the left foot position information of the user based on the user posture about 100 msec before the time (tz) and the sensor detection values at substantially the same time as the time (tz).

As a result, the server 40 can generate the landed avatar image at substantially the same time (tz) as the landing timing of the user, and can display the landed avatar image on the MR glasses of the user.

With such processing, the user can observe the avatar image with little delay with respect to the actual motion of the user with the MR glasses 11, and can perform a desired motion or action without feeling uncomfortable.

3. Processing Sequence of Processing of Present Disclosure

Next, a processing sequence of the processing of the present disclosure will be described.

As described above, the processing of the present disclosure enables processing of displaying the avatar image with a reduced delay with respect to the motion of the user on the display unit such as the MR glasses.

Hereinafter, a processing sequence of this processing will be described.

Note that, as described above with reference to FIGS. 12 to 14, the user terminal does not transmit all the detection values of the sensors attached to the plurality of parts of the user's body to the server, but selects only the sensor detection value of the part having a fast motion and transmits the selected sensor detection value to the server.

For example, only the detection value of the sensor attached to a body part moving at a speed equal to or higher than a prescribed moving speed is selected and transmitted to the server.

The processing of selecting the sensor detection value to be transmitted to the server can be executed by either the user terminal or the server.

Hereinafter, the following two types of processing examples will be sequentially described.

(Processing Example 1) A processing example in which the user terminal selects the sensor detection value to be transmitted (Processing Example 2) A processing example in which the server selects the sensor detection value to be transmitted

3-1. (Processing Example 1) Processing Sequence of Processing in Which User Terminal Selects Sensor Detection Value to be Transmitted First, as (Processing Example 1), a sequence of a processing example in which the user terminal selects the sensor detection value to be transmitted will be described with reference to FIG. 17 and subsequent drawings.

Figure 17:
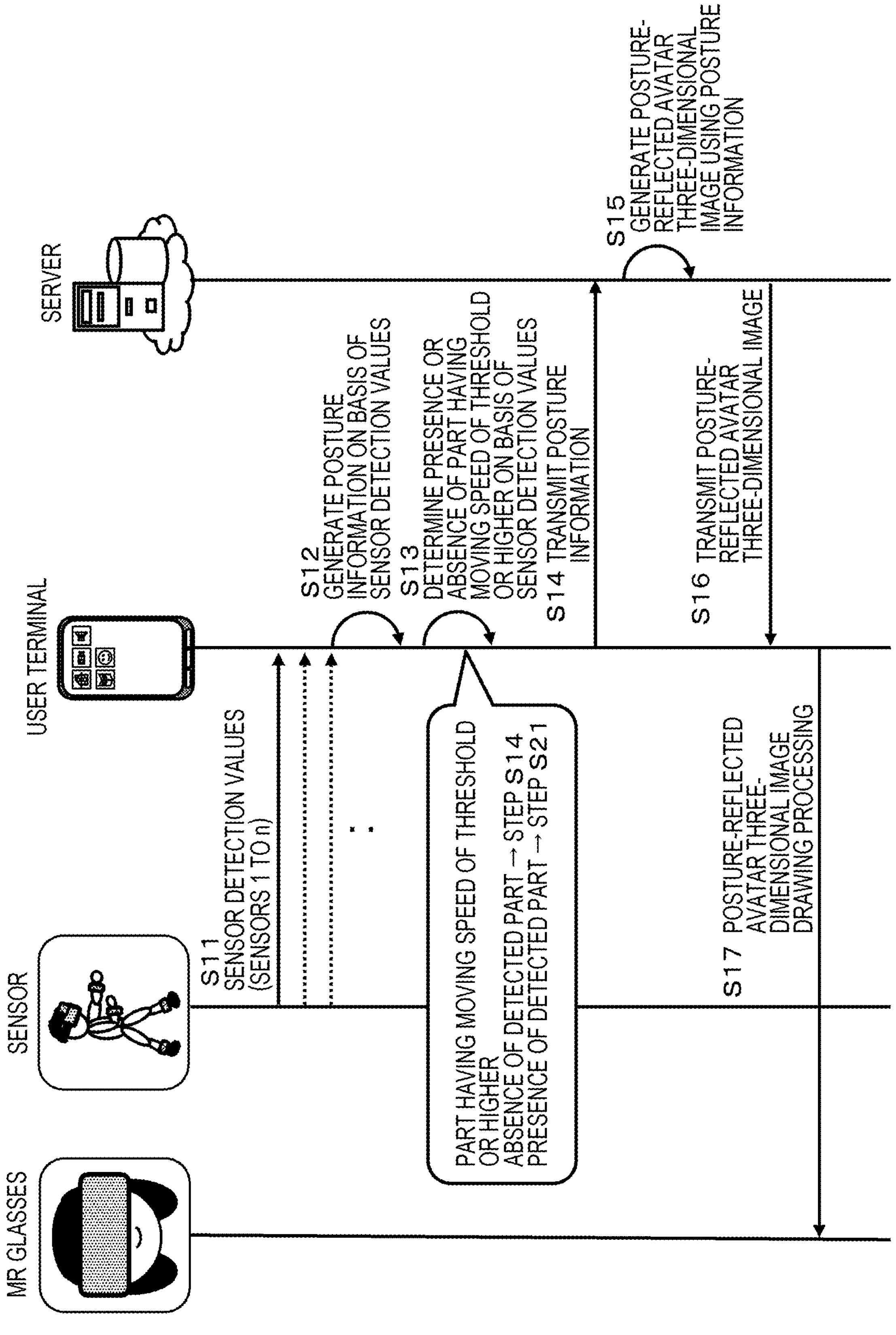
FIG. 17 is a sequence diagram for describing a sequence of a processing example in which the user terminal selects the sensor detection value to be transmitted.
Figure 18:
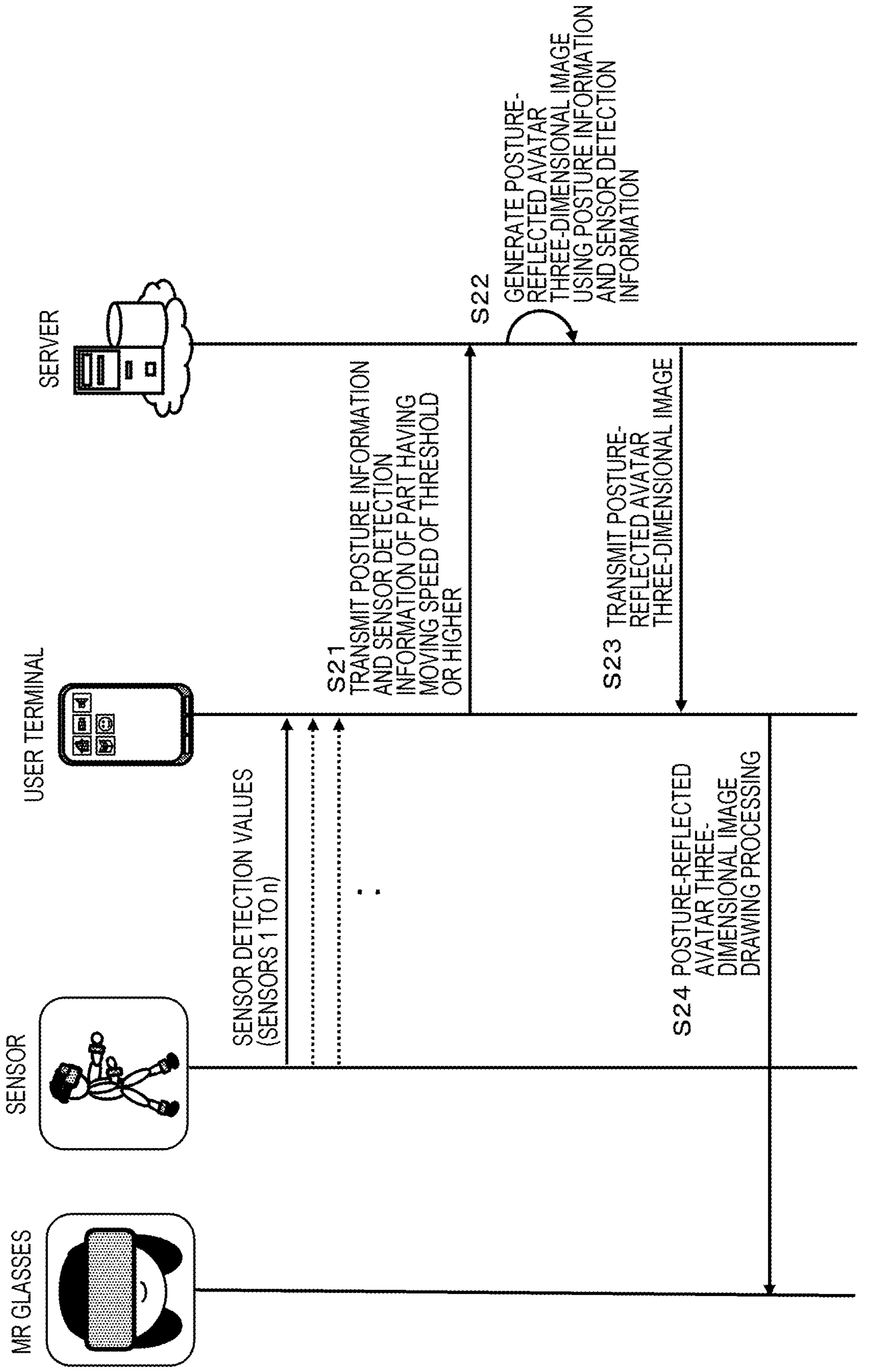
FIG. 18 is a sequence diagram for describing a sequence of a processing example in which the user terminal selects the sensor detection value to be transmitted.

FIGS. 17 and 18 are sequence diagrams illustrating a communication sequence executed between elements constituting the information processing system of the present disclosure in a case where the user terminal performs the processing of selecting the sensor detection value to be transmitted.

FIGS. 17 and 18 illustrate the MR glasses, the sensors, the user terminal, and the server from the left.

Hereinafter, processing of each step illustrated in the sequence diagrams in FIGS. 17 and 18 will be sequentially described.

(Step S11)

step S11 is processing of transmitting the sensor detection values from the sensors to the user terminal.

As described above, the user has the motion sensors such as the IMUs attached to the parts of the body (the head, right arm, left arm, waist, right foot, and left foot), and the sensor detection values are transmitted from these sensors to the user terminal in a constant cycle, for example, a cycle of 10 msec.

Note that the processing of transmitting the sensor detection values to the user terminal in step S11 is continuously executed.

(Step S12)

The user terminal that has received the sensor detection values from the sensors executes the user posture information generation processing based on the received sensors detection value in step S12.

The user posture information generation processing is the processing described above with reference to FIG. 8, and the following respective pieces of processing are sequentially executed to generate the user posture information.

(Processing 1) Sensor detection value input processing (Processing 2) Noise removal processing (Processing 3) Motion vector group generation processing (Processing 4) Posture estimation processing (learning model application posture estimation processing)

(Processing 5) Connection portion angle setting vector generation processing

These respective pieces of processing (Processing 1) to (Processing 5) are sequentially executed to generate "posture information" indicating the three-dimensional posture of the user.

Note that, as described above, the user posture information generation processing is executed in a cycle of 100 msec, for example.

(Step S13)

Moreover, the user terminal executes processing in step S13 as processing in parallel with the user posture information generation processing in step S12 described above.

That is, in step S13, the user terminal determines the presence or absence of a part having a moving speed equal to or higher than a prescribed threshold on the basis of the sensor detection values input from the respective sensors.

In a case where the part having a moving speed equal to or higher than a prescribed threshold is not detected in the determination processing of step S13, the processing proceeds to step S14.

On the other hand, in a case where the part having a moving speed equal to or higher than a prescribed threshold is detected, the processing proceeds to step S21.

(Step S14)

In the case where the part having a moving speed equal to or higher than a prescribed threshold is not detected in step S13, the user terminal transmits the user posture information generated in step S12 to the Server in step S14.

(Steps S15 and S16)

In step S15, the server that has received the user posture information from the user terminal generates the avatar three-dimensional image reflecting the user posture information, and transmits the user posture-reflected avatar three-dimensional image generated in step S16 to the user terminal.

(Step S17)

The user terminal that has received the user posture-reflected avatar three-dimensional image from the server draws the user posture-reflected avatar three-dimensional image on the display unit of the MR glasses in step S17.

The user posture-reflected avatar three-dimensional image displayed on the MR glasses by the processing in steps S14 to S17 is an avatar image having a posture delayed from the current posture of the user by approximately 100 msec.

These pieces of processing correspond to the processing described above with reference to FIG. 15(*a*), for example.

(Step S21)

On the other hand, in the case where the part having a moving speed equal to or higher than a prescribed threshold is detected in step S13, the user terminal transmits the sensor detection value of the part having a moving speed equal to or higher than a prescribed threshold together with the user posture information generated in step S12 to the server in step S21.

As described above with reference to FIGS. 12 to 14, the user terminal selectively acquires the sensor detection value of the part of the user with the fast motion and transmits the sensor detection value to the server. For example, the small-size packet storing the sensor detection value is generated at the same interval as the sampling cycle (10 msec) of the sensor and transmitted to the server.

Note that the sensor detection value storage packet is preferably transmitted to the server as a low latency priority packet that is preferentially transmitted according to, for example, quality of service (Qos). By performing the processing according to the Qos, the sensor detection value storage packet is transmitted to the server without delay.

(Steps S22 and S23)

The server that has received the user posture information and the sensor detection value of the part of the user having a fast motion from the user terminal generates the user posture-reflected avatar three-dimensional image using the two types of information of the user posture information and the sensor detection values received from the user terminal in step S22, and transmits the user posture-reflected avatar three-dimensional image generated in step S23 to the user terminal.

This processing corresponds to the processing described above with reference to FIG. 15(*b*).

The server uses all pieces of information of the user posture information indicated by the black circles and the dotted lines in FIG. 15(*b*1) and the user part position information (right foot position information and left foot position information) based on the sensor detection values indicated by the white circles to generate and transmit the user posture-reflected avatar three-dimensional image as illustrated in FIG. 15(*b*2) to the user terminal.

(Step S24)

The user terminal that has received the user posture-reflected avatar three-dimensional image generated using both the user posture and the sensor detection values from the server draws the user posture-reflected avatar three-dimensional image on the display unit of the MR glasses in step S24.

The user posture-reflected avatar three-dimensional image displayed on the MR glasses by the processing in steps S21 to S24 is an avatar image having a posture with almost no delay from the current posture of the user.

As a result of these pieces of processing, the user becomes able to observe the avatar image having a posture with an extremely small delay from the current posture of the user, using the MR glasses, as illustrated in FIG. 15(*b*3) described above, for example.

The sequences described with reference to FIGS. 17 and 18 are sequences in which the user terminal performs the processing of selecting the sensor detection value to be transmitted to the server.

A specific example of the processing of selecting the sensor detection value to be transmitted to the server in the user terminal will be described with reference to FIGS. 19 and 20.

Figure 19:
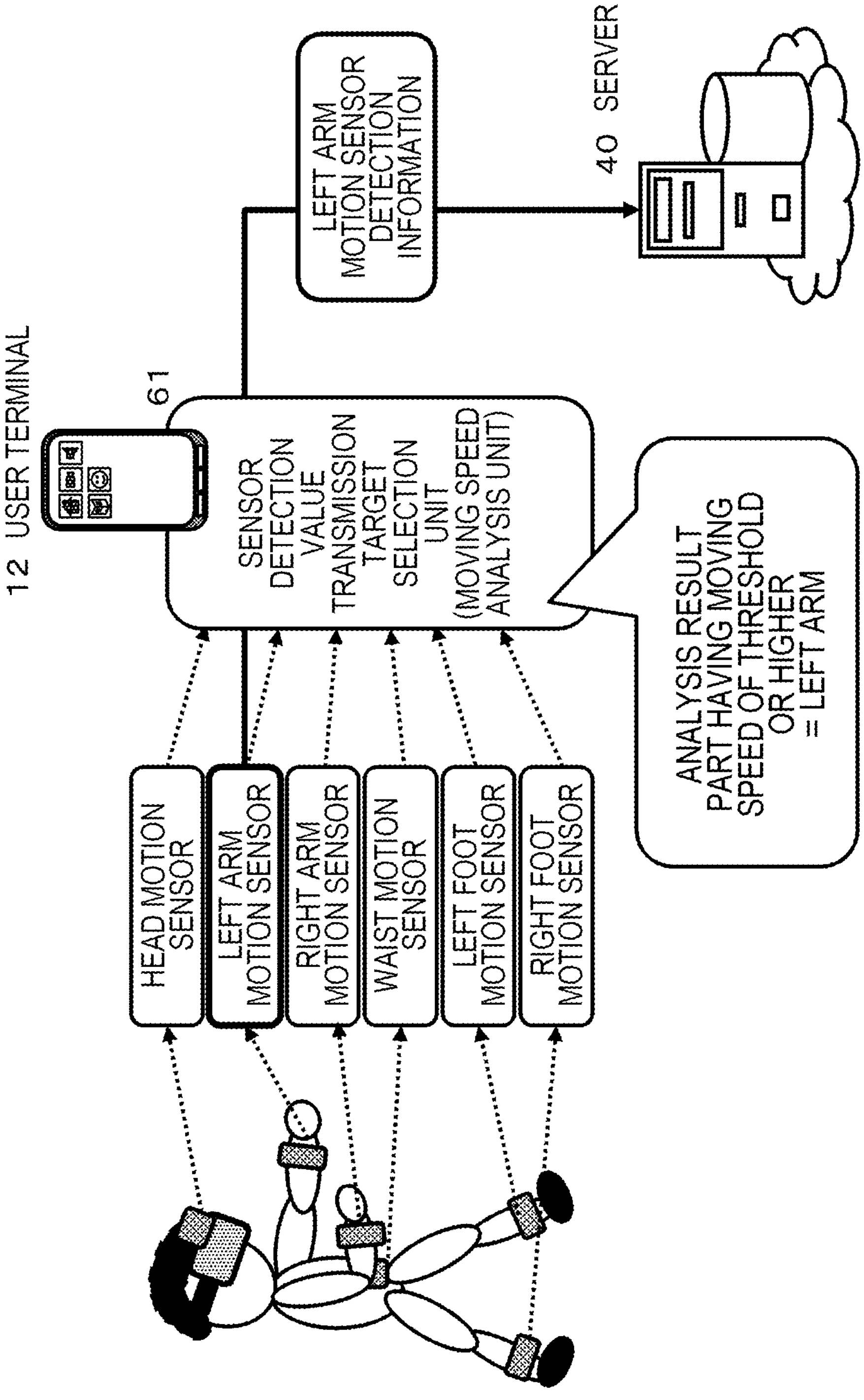
FIG. 19 is a diagram for describing a specific example of processing of selecting the sensor detection value to be transmitted to the server by the user terminal.

As illustrated in FIG. 19, the user terminal 12 includes a sensor detection value transmission target selection unit (moving speed analysis unit) 61.

The sensor detection value transmission target selection unit (moving speed analysis unit) 61 of the user terminal 12 inputs the detection values of the motion sensors such as the IMUs attached to the respective parts (the head, right arm, left arm, waist, right foot, and left foot) of the user's body and calculates the moving speed of each part.

Moreover, the calculated moving speed of each part is compared with the prescribed threshold, and the part having a moving speed equal to or higher than the prescribed threshold is detected.

The example illustrated in FIG. 19 is an example in which it is determined that the change in the detection value of the left arm motion sensor attached to the left arm is large and the motion speed of the left arm is equal to or higher than the prescribed threshold.

In this case, the user terminal generates a transmission packet obtained by storing the detection value of the left arm motion sensor in the packet and transmits the transmission packet to the server.

Figure 20:
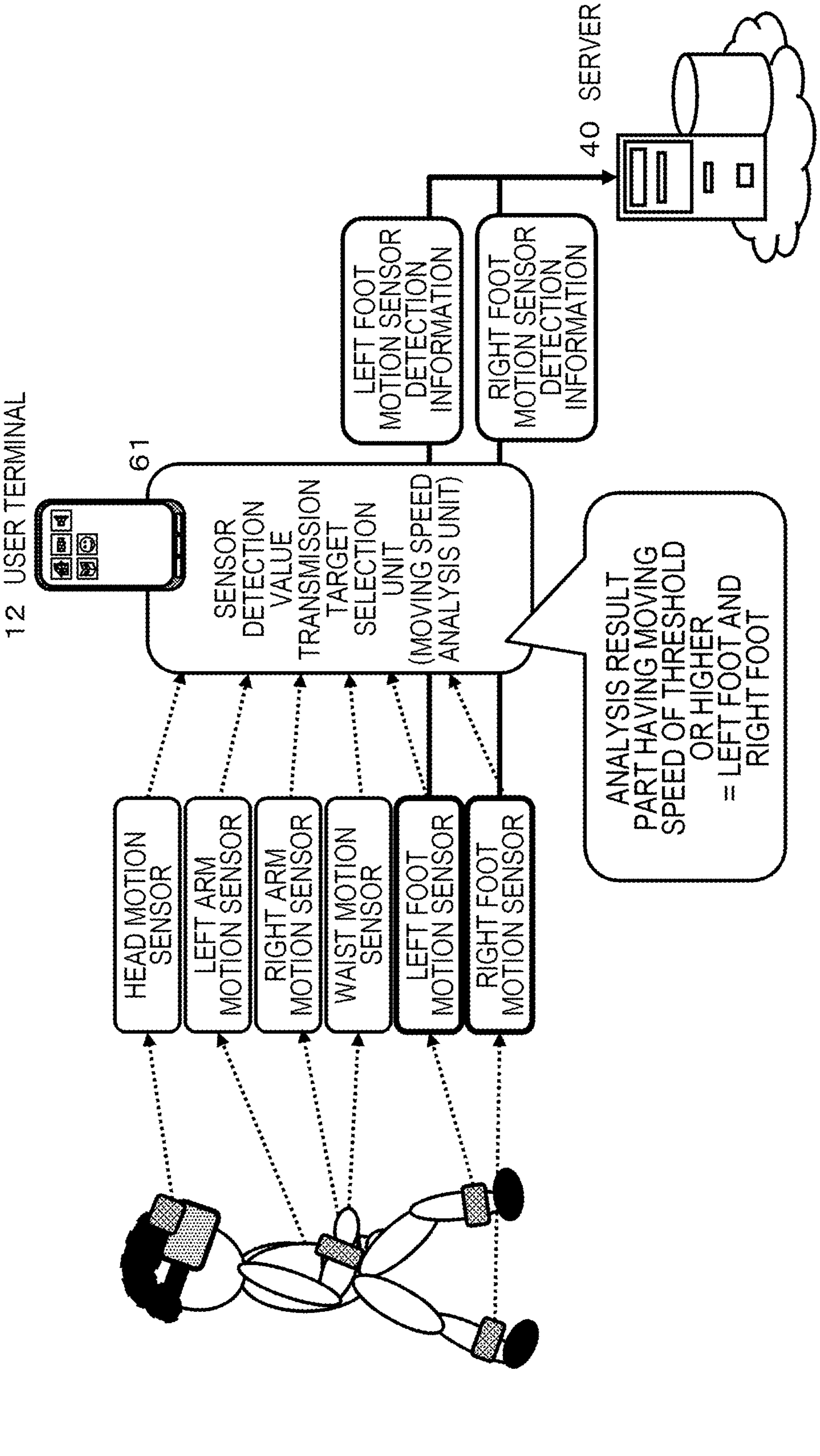
FIG. 20 is a diagram for describing a specific example of processing of selecting the sensor detection value to be transmitted to the server by the user terminal.

The example illustrated in FIG. 20 is an example in which the sensor detection value transmission target selection unit (moving speed analysis unit) 61 of the user terminal 12 determines that the change in the detection values of the motion sensors attached to the left foot and the right foot is large and the motion speeds of the left foot and the right foot are equal to or higher than the prescribed threshold.

In this case, the user terminal generates the transmission packet obtained by storing the detection values of the motion sensors of the left foot and the right foot in the packet and transmits the transmission packet to the server.

The server generates the user posture-reflected avatar three-dimensional image by combining the posture information received from the user terminal and the sensor detection values of the parts having a fast motion, and transmits the user posture-reflected avatar three-dimensional image to the user terminal.

With the processing, it is possible to display the avatar image with an extremely small delay from the current posture of the user on the MR glasses, and the user can observe the MR image without feeling uncomfortable.

Next, a sequence of processing executed by the user terminal in the processing of (Process Example 1), that is, a sequence of processing executed by the user terminal in the case of performing Process Example 1 in which the user terminal selects the sensor detection value to be transmitted will be described with reference to the flowchart illustrated in FIG. 21.

Figure 21:
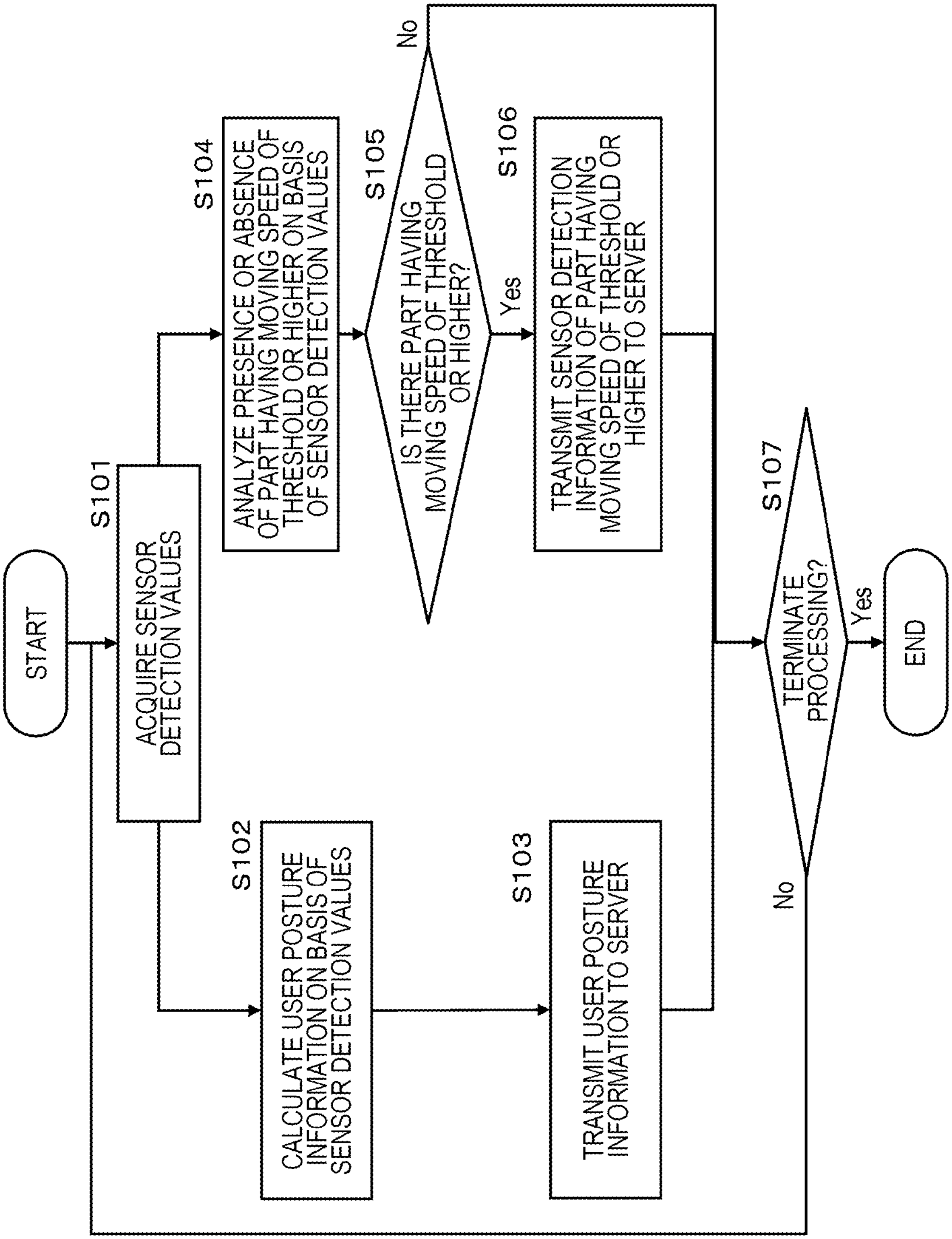
FIG. 21 is a diagram illustrating a flowchart for describing a sequence of processing executed by the user terminal in a case where the user terminal selects the sensor detection value to be transmitted.

Note that the processing according to the flow illustrated in FIG. 21 can be executed according to a program stored in a storage unit of the user terminal.

Hereinafter, processing of each step of the flow illustrated in FIG. 21 will be sequentially described.

(Step S101)

First, the user terminal acquires the sensor detection values from the sensors in step S101.

As described above, the motion sensors such as the IMUs are attached to the respective parts of the body (the head, right arm, left arm, waist, right foot, and left foot), and the user terminal inputs the sensor detection values from these sensors in a constant cycle, for example, a cycle of 10 msec.

(Step S102)

The processing of steps S102 and S103 and the processing of steps S104 to S106 are pieces of processing executed in parallel in the user terminal.

In step S102, the user terminal generates the user posture information using the sensor detection values acquired from the wearing sensors of the respective parts of the user.

The user posture information generation processing is the processing described above with reference to FIG. 8, and the following respective pieces of processing are sequentially executed to generate the user posture information.

(Processing 1) Sensor detection value input processing (Processing 2) Noise removal processing (Processing 3) Motion vector group generation processing (Processing 4) Posture estimation processing (learning model application posture estimation processing)

(Processing 5) Connection portion angle setting vector generation processing

These respective pieces of processing (Processing 1) to (Processing 5) are sequentially executed to generate "posture information" indicating the three-dimensional posture of the user.

Note that, as described above, the user posture information generation processing is executed in a cycle of 100 msec, for example.

(Step S103)

When the user posture information generation processing is completed in step S102, the user terminal transmits the generated user posture information to the server in step S103.

The user terminal sequentially transmits the packets storing the user posture information to the Server at intervals of 100 msec.

(Step S104)

In addition to the user posture information generation and transmission processing in steps S102 and S103, the user terminal executes processing in steps S104 to S106.

In step S104, the user terminal analyzes the sensor detection values acquired from the sensors attached to the respective parts of the user, and determines the presence or absence of the part having a moving speed equal to or higher than a prescribed threshold.

(Step S105)

step S105 is a branching step. In step S104, in the case where the part having a moving speed equal to or higher than a prescribed threshold is detected, the processing proceeds to step S106, and in the case where the part is not detected, the processing proceeds to step S107.

(Step S106)

In the case where the part having a moving speed equal to or higher than a prescribed threshold is detected in step S105, the processing of step S106 is executed.

In this case, in step S106, the user terminal transmits the sensor detection value of the part having a moving speed equal to or higher than a prescribed threshold to the server.

As described above with reference to FIGS. 12 to 14, the user terminal selectively acquires the sensor detection value of the part of the user with the fast motion and transmits the sensor detection value to the server. For example, the small-size packet storing the sensor detection value is generated at the same interval as the sampling cycle (10 msec) of the sensor and transmitted to the server.

(Step S107)

step S107 is a processing termination determination step in the user terminal. In a case where the avatar image output processing for the MR glasses is terminated, the processing is terminated. In a case where the processing is continued, the processing returns to step S101, and the processing of steps S101 to S106 is repeated.

The user terminal executes the processing according to the flow illustrated in FIG. 21, the user becomes able to observe the avatar image having a posture with an extremely small delay from the current posture of the user, using the MR glasses, as illustrated in FIG. 15(*b*3) described above, for example.

(3-2. (Processing Example 2) Processing Sequence of Processing in Which Server Selects Sensor Detection Value to be Transmitted)

Next, as (Processing Example 2), a processing sequence of the processing in which the server selects the sensor detection value to be transmitted will be described with reference to FIG. 22 and subsequent drawings.

Figure 22:
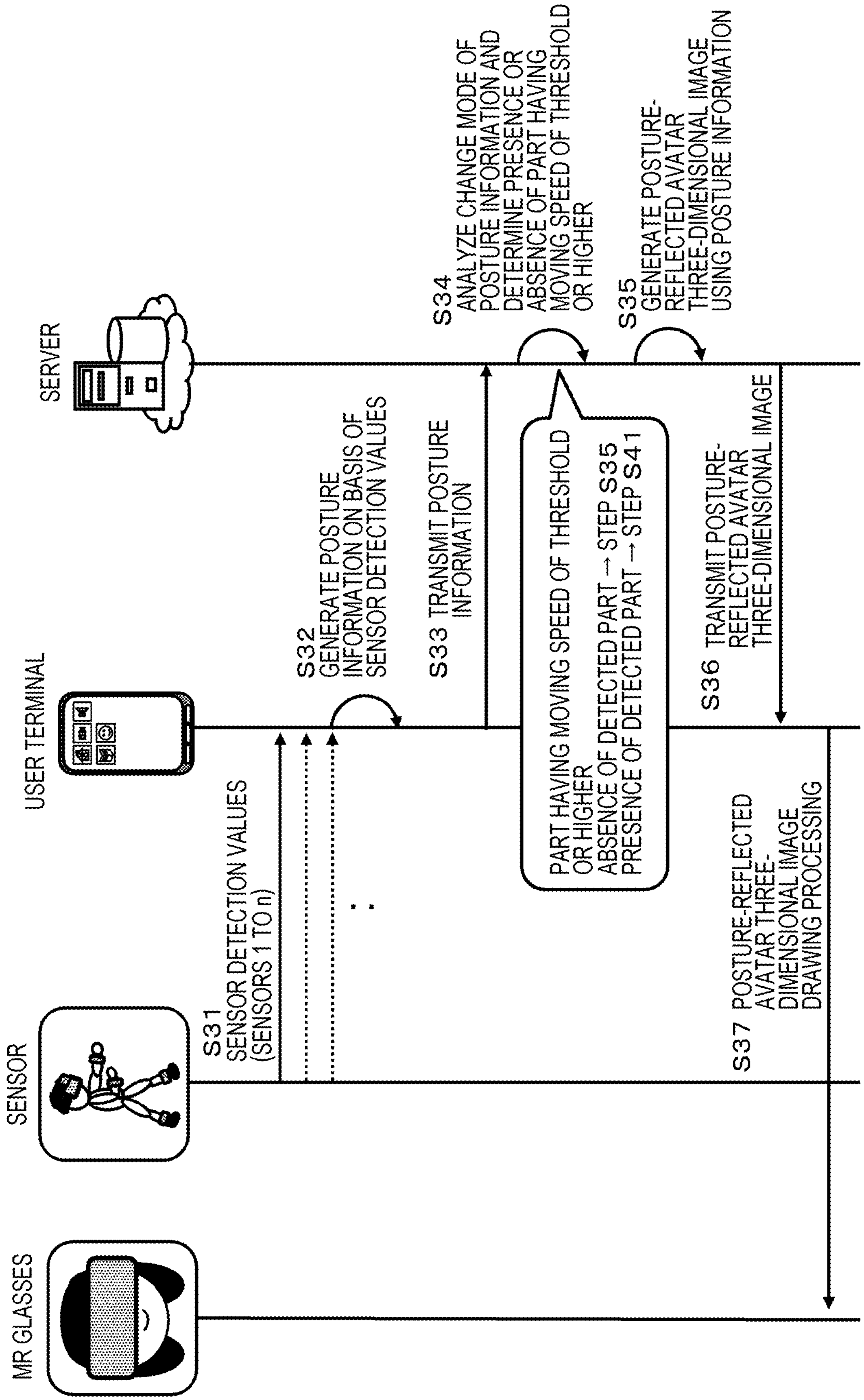
FIG. 22 is a sequence diagram for describing a sequence of processing in which the server selects the sensor detection value to be transmitted.
Figure 23:
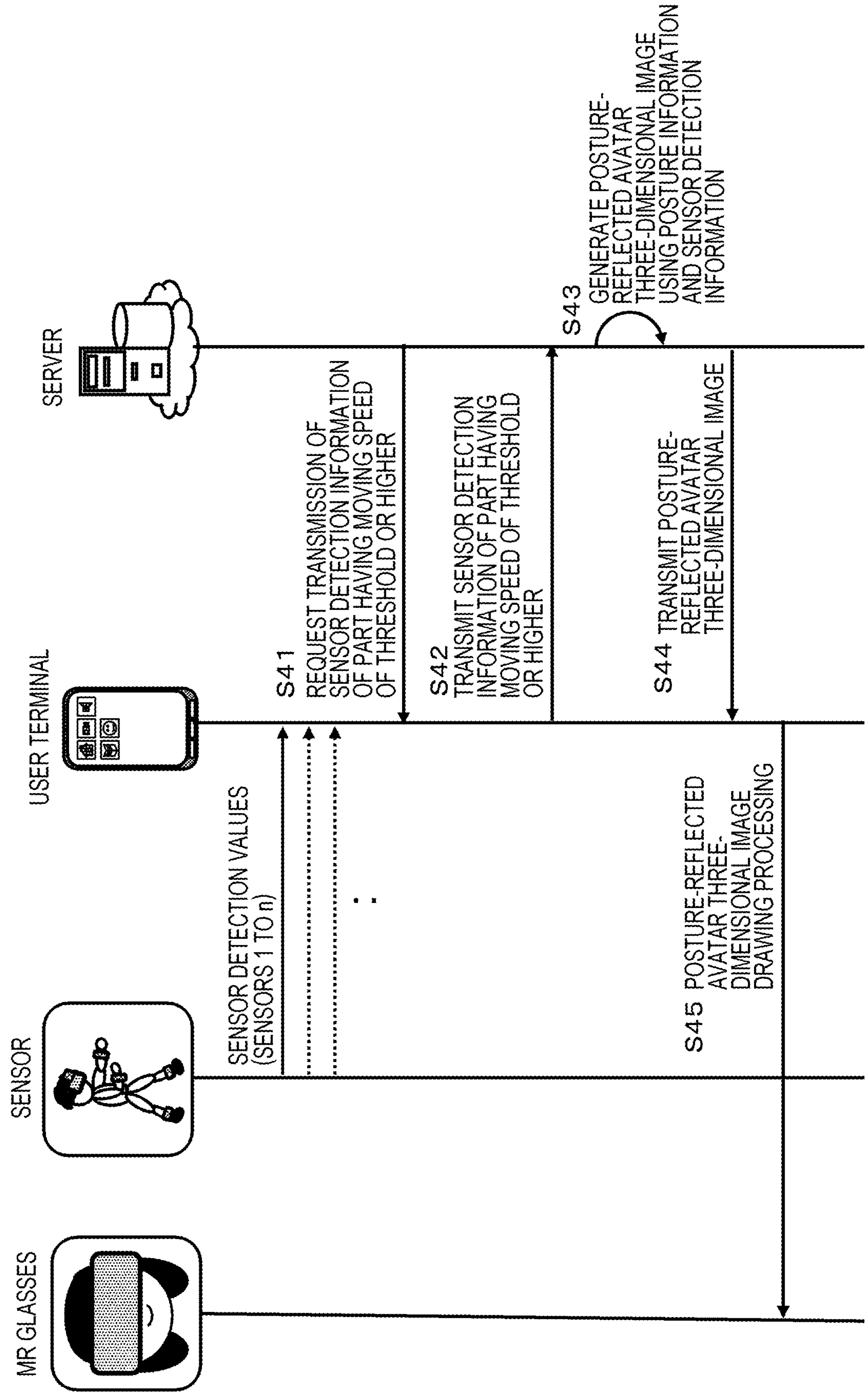
FIG. 23 is a sequence diagram for describing a sequence of processing in which the server selects the sensor detection value to be transmitted.

FIGS. 22 and 23 are sequence diagrams illustrating a communication sequence executed between elements constituting the information processing system of the present disclosure in a case where the server performs the processing of selecting the sensor detection value to be transmitted.

FIGS. 22 and 23 illustrate the MR glasses, the sensors, the user terminal, and the server from the left.

Hereinafter, processing of each step illustrated in the sequence diagrams in FIGS. 22 and 23 will be sequentially described.

(Step S31)

step S31 is processing of transmitting the sensor detection values from the sensors to the user terminal.

As described above, the user has the motion sensors such as the IMUs attached to the parts of the body (the head, right arm, left arm, waist, right foot, and left foot), and the sensor detection values are transmitted from these sensors to the user terminal in a constant cycle, for example, a cycle of 10 msec.

Note that the processing of transmitting the sensor detection values to the user terminal in step S31 is continuously executed.

(Step S32)

The user terminal that has received the sensor detection values from the sensors executes the user posture information generation processing based on the received sensors detection value in step S32.

The user posture information generation processing is the processing described above with reference to FIG. 8, and the respective pieces of processing of (Processing 1) to (Processing 5) illustrated in FIG. 8 are sequentially executed to generate the "posture information" indicating the three-dimensional posture of the user.

Note that, as described above, the user posture information generation processing is executed in a cycle of 100 msec, for example.

(Step S33)

Next, in step S33, the user terminal transmits the user posture information generated in step S32 to the server.

(Step S34)

In step S34, the server that has received the user posture information from the user terminal determines the presence or absence of the part having a moving speed equal to or higher than a prescribed threshold on the basis of the user posture information.

The server determines the presence or absence of the part having a moving speed equal to or higher than a prescribed threshold on the basis of the time-series user posture information input from the user terminal in a cycle of 100 msec, for example.

In the case where the part having a moving speed equal to or higher than a prescribed threshold is not detected in the determination processing of step S34, the processing proceeds to step S35.

On the other hand, in the case where the part having a moving speed equal to or higher than a prescribed threshold is detected, the processing proceeds to step S41.

(Steps S35 and S36)

In the case where the part having a moving speed equal to or higher than a prescribed threshold is not detected in step S34, the server generates the avatar three-dimensional image reflecting the user posture information in step S35, and transmits the user posture-reflected avatar three-dimensional image generated in step S36 to the user terminal.

(Step S37)

The user terminal that has received the user posture-reflected avatar three-dimensional image from the server draws the user posture-reflected avatar three-dimensional image on the display unit of the MR glasses in step S37.

The user posture-reflected avatar three-dimensional image displayed on the MR glasses by the processing in steps S35 to S37 is an avatar image having a posture delayed from the current posture of the user by approximately 100 msec.

These pieces of processing correspond to the processing described above with reference to FIG. 15(*a*), for example.

(Step S41)

On the other hand, in the case where the server detects the part having a moving speed equal to or higher than a prescribed threshold in step S34, the server requests the user terminal to transmit the sensor detection value of the part having a moving speed equal to or higher than a prescribed threshold in step S41.

Specifically, for example, in a case where it is determined that the moving speed of the left arm is equal to or higher than the threshold, a request for transmitting the sensor detection value of the left arm is made.

Furthermore, in a case where it is determined that the moving speeds of the left foot and the right foot are equal to or higher than the threshold, a request for transmitting the sensor detection values of the left foot and the right foot is made.

(Step S42)

The user terminal that has received the sensor detection value transmission request of the specific part from the server transmits the sensor detection value of the specific part designated from the server to the server in step S42.

For example, the user terminal generates the small-size packet storing the sensor detection value at the same interval as the sampling cycle (10 msec) of the sensor and transmits the packet to the server 40.

(Steps S43 and S44)

In step S43, the server that has received the sensor detection value of the specific part from the user terminal generates the user posture-reflected avatar three-dimensional image using the two types of information of the user posture information and the sensor detection values received from the user terminal, and transmits the user posture-reflected avatar three-dimensional image generated in step S44 to the user terminal.

This processing corresponds to the processing described above with reference to FIG. 15(*b*).

The server uses all pieces of information of the user posture information indicated by the black circles and the dotted lines in FIG. 15(*b*1) and the user part position information (right foot position information and left foot position information) based on the sensor detection values indicated by the white circles to generate and transmit the user posture-reflected avatar three-dimensional image as illustrated in FIG. 15(*b*2) to the user terminal.

(Step S45)

The user terminal that has received the user posture-reflected avatar three-dimensional image generated using both the user posture and the sensor detection values from the server draws the user posture-reflected avatar three-dimensional image on the display unit of the MR glasses in step S45.

The user posture-reflected avatar three-dimensional image displayed on the MR glasses by the processing in steps S41 to S45 is an avatar image having a posture with almost no delay from the current posture of the user.

As a result of these pieces of processing, the user becomes able to observe the avatar image having a posture with an extremely small delay from the current posture of the user, using the MR glasses, as illustrated in FIG. 15(*b*3) described above, for example.

4. Embodiment in Which Sampling Cycle of Sensor Attached to User is Changed According to Moving Speed of Each Part Next, an embodiment in which the sampling cycle of the sensor attached to the user is changed according to the moving speed of each part will be described.

As described above with reference to FIG. 11 and the like, the motion sensors attached to the respective parts of the user's body output the sensor detection values in a cycle of 10 msec, for example.

However, on the other hand, the posture information generation processing in the user terminal is merely executed in a cycle of 100 msec.

Therefore, in the case where the user terminal generates only the user posture information and transmits the user posture information to the server, the sensor detection values used for generating the user posture information are the sensor detection values of the cycle of 100 msec, and most of the sensor detection values output in the cycle of 10 msec are not used.

Power is consumed in the acquisition and transmission processing of the sensor detection values by the sensors, and as a result, wasteful power consumption occurs.

The embodiment described below is an embodiment for reducing this power consumption by the sensors.

Specifically, the sensor detection value is acquired in a high cycle (for example, 10 msec cycle) only for the sensor of the part selected as a transmission target to the server, and the sensor detection values are acquired in a low cycle (for example, 50 to 100 msec cycle) for the other sensors, thereby reducing the power consumption by the sensors.

A processing sequence in a case of performing this embodiment will be described with reference to the sequence diagrams illustrated in FIGS. 24 and 25.

Figure 24:
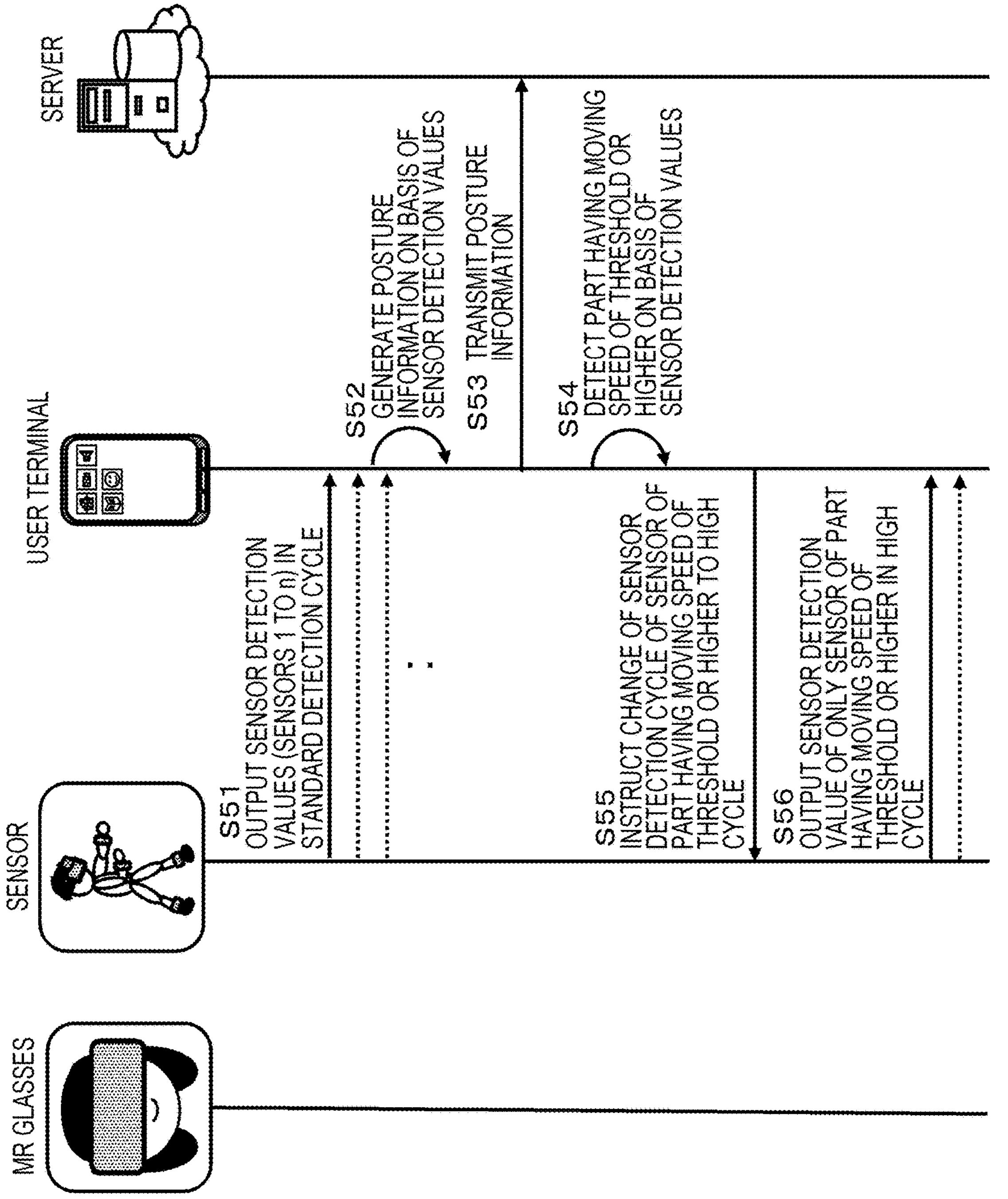
FIG. 24 is a sequence diagram for describing a sequence of processing of changing a sampling cycle of the sensor attached to the user according to a moving speed of each part.
Figure 25:
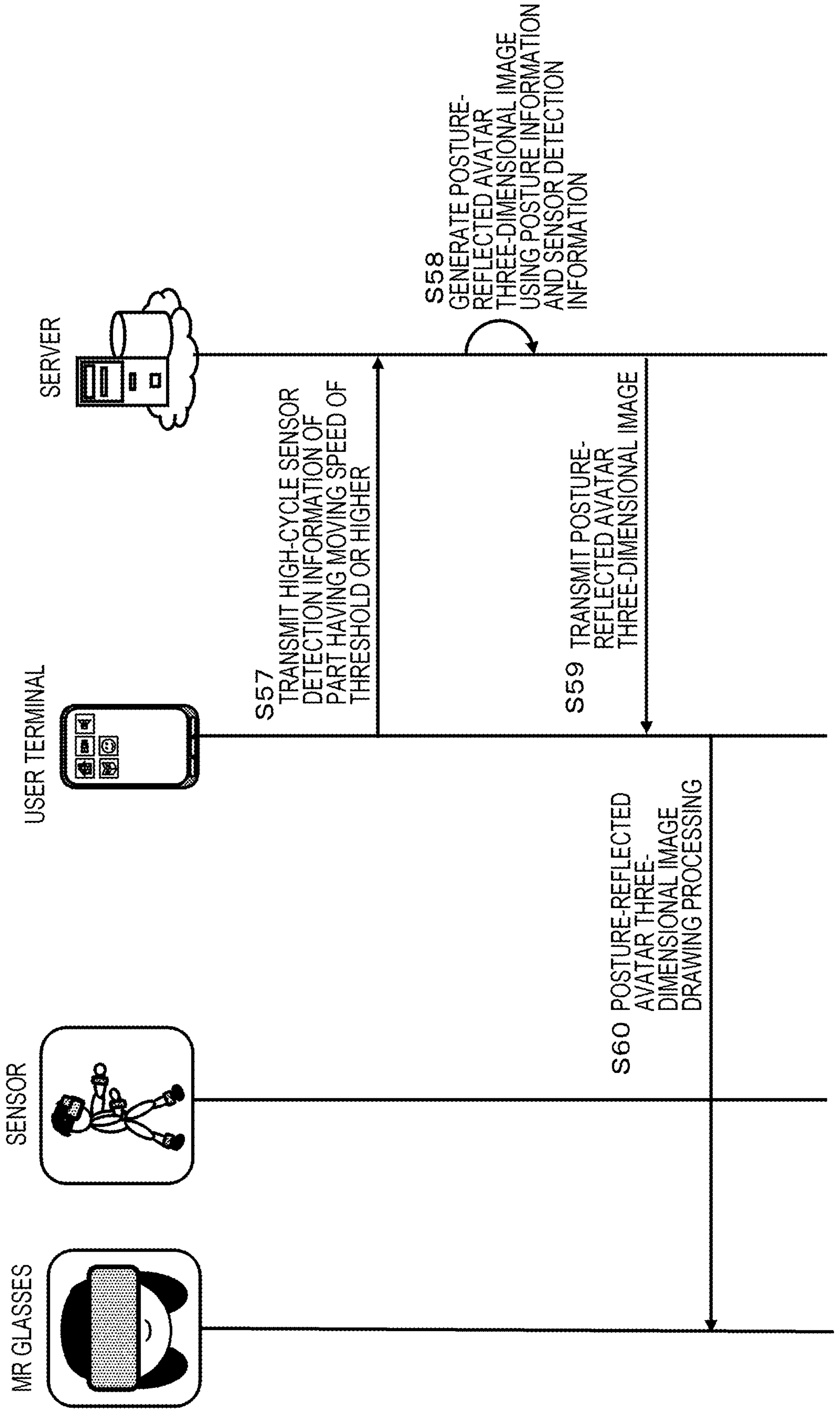
FIG. 25 is a sequence diagram for describing a sequence of processing of changing the sampling cycle of the sensor attached to the user according to the moving speed of each part.

FIGS. 24 and 25 illustrate the MR glasses, the sensors, the user terminal, and the server from the left.

Hereinafter, processing of each step illustrated in the sequence diagrams in FIGS. 24 and 25 will be sequentially described.

(Step S51)

step S51 is processing of transmitting the sensor detection values from the sensors to the user terminal.

As described above, the motion sensors such as the IMUs of the respective parts of the body (the head, right arm, left arm, waist, right foot, and left foot) are attached to the user.

In the present processing example, the sampling cycle of the sensor at the normal time is set to a standard cycle, for example, a low cycle of 50 msec.

In step S51, the sensor detection value is transmitted from each of the motion sensors attached to the respective parts (the head, right arm, left arm, waist, right foot, and left foot) of the user's body to the user terminal in a low cycle (for example, a cycle of 50 msec).

Note that the processing of transmitting the sensor detection values to the user terminal in step S51 is continuously executed.

(Steps S52 and S53)

The user terminal that has received the sensor detection values from the sensors executes the user posture information generation processing based on the received sensors detection value in step S52 and transmits the generated user posture information to the Server in step S53.

The user posture information generation processing is the processing described above with reference to FIG. 8, and the respective pieces of processing of (Processing 1) to (Processing 5) illustrated in FIG. 8 are sequentially executed to generate the "posture information" indicating the three-dimensional posture of the user.

Note that, as described above, the user posture information generation processing is executed in a cycle of 100 msec, for example.

(Step S54)

Moreover, the user terminal executes processing in step S54 as processing in parallel with the user posture information generation processing in step S52 described above.

That is, in step S54, the user terminal detects the part having a moving speed equal to or higher than a prescribed threshold on the basis of the sensor detection values input from the respective sensors.

Note that, here, description will be given on the assumption that the part having a moving speed equal to or higher than a prescribed threshold has been detected.

(Step S55)

In step S55, the user terminal outputs a sampling cycle change instruction to change a sensor detection cycle to a high cycle, for example, a cycle of 10 msec, to the sensor of the part having a moving speed equal to or higher than a prescribed threshold.

(Step S56)

In step S55, the sensor that has received the instruction to change the sampling cycle from the user terminal, that is, the sensor of the part having the moving speed equal to or higher than the prescribed threshold starts processing of changing the sensor detection cycle to the high cycle, for example, the cycle of 10 msec, and outputting the sensor detection value acquired in the high cycle to the user terminal in step S56.

(Step S57)

In step S57, the user terminal transmits, to the server, the high-cycle sensor detection value received from the sensor of the part having the moving speed equal to or higher than the prescribed threshold in step S56.

For example, the user terminal generates the small-size packet storing the sensor detection value at the same interval as the high-cycle sampling cycle (10 msec) of the sensor and transmits the packet to the server.

(Steps S58 and S59)

The server that has received the user posture information and the sensor detection value of the part of the user having a fast motion from the user terminal generates the user posture-reflected avatar three-dimensional image using the two types of information of the user posture information and the sensor detection values received from the user terminal in step S58, and transmits the user posture-reflected avatar three-dimensional image generated in step S59 to the user terminal.

This processing corresponds to the processing described above with reference to FIG. 15(*b*).

The server uses all pieces of information of the user posture information indicated by the black circles and the dotted lines in FIG. 15(*b*1) and the user part position information (right foot position information and left foot position information) based on the sensor detection values indicated by the white circles to generate and transmit the user posture-reflected avatar three-dimensional image as illustrated in FIG. 15(*b*2) to the user terminal.

(Step S60)

The user terminal that has received the user posture-reflected avatar three-dimensional image generated using both the user posture and the sensor detection values from the server draws the user posture-reflected avatar three-dimensional image on the display unit of the MR glasses in step S60.

By the processing according to this processing sequence, only the sensor detection value of the part of the user with a fast motion is acquired in the high cycle, and the sensor detection values of the other parts with a slow motion are acquired in a constant cycle, and the power consumption of the sensors can be reduced.

5. Example of User Posture-Reflected Avatar Image Display Processing by Communication Processing Between User Terminals Without Using Server Next, a user posture-reflected avatar image display processing example by communication processing between the user terminals without using the server will be described.

In the above-described embodiment, a processing example has been described in which the user posture information is transmitted from the user terminal to the server, the user posture-reflected avatar three-dimensional image is generated on the server side, and the generated user posture-reflected avatar three-dimensional image is transmitted to the user terminal.

As described above, an embodiment is not limited to the processing example in which the server generates the user posture-reflected avatar three-dimensional image, and a processing example in which the user terminal generates the user posture-reflected avatar three-dimensional image is also possible.

Figure 26:
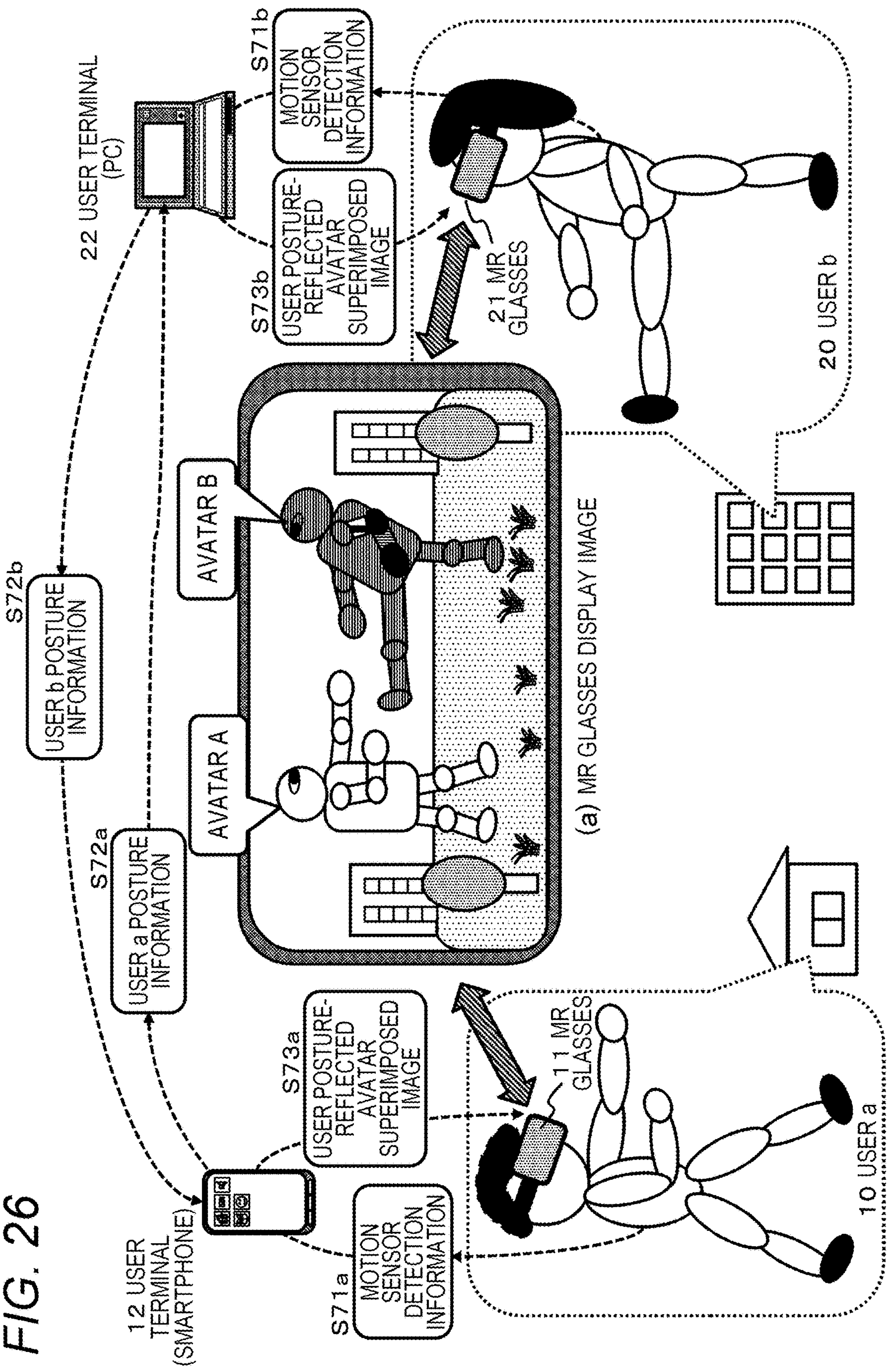
FIG. 26 is a diagram for describing a processing example of executing communication between user terminals without using a server, generating an MR image including a user posture-reflected avatar three-dimensional image of each user in the user terminal, and displaying the MR image on MR glasses of each user.

FIG. 26 is a diagram for describing a processing example of executing communication between user terminals of two users without using a server, generating an MR image including a user posture-reflected avatar three-dimensional image of each user in the user terminal, and displaying the MR image on MR glasses of each user.

FIG. 26 illustrates a user a, 10 and a user b, 20 at distant places.

Each of the user a, 10 and the user b, 20 wears MR glasses.

The user a, 10 wears MR glasses 11, and the user b, 20 wears MR glasses 21.

A mixed reality (MR) image as illustrated in the center of FIG. 26 is displayed on the MR glasses 11 and 21 worn by the respective users a and b.

It is an MR image in which an avatar, which is a virtual self character of each user, is superimposed and displayed on a real object image of a real landscape that exists.

An avatar A in the MR image corresponds to the virtual self character of the user a, 10, and an avatar B corresponds to the virtual self character of the user b, 20.

Note that the images displayed on the MR glasses 11 and 21 are three-dimensional images, and both the background image and the avatar image are displayed as three-dimensional images.

The two users a and b have motion sensors attached to a plurality of parts of the bodies such as the heads, arms, and feet, and move the avatars A and B in the MR image similarly to motions of the users a and b, using detection information of these sensors.

Processing steps executed to move the avatars A and B in the MR images similarly to the motions of the users a and b are processing of steps S71*a* and S71*b* and S72*a* and S72*b* illustrated in FIG. 26.

These series of processing will be described.

(Step S71*a* and Step S71*b*)

First, as illustrated in step S71*a* of FIG. 26, sensor detection values of the motion sensors attached to the head, arm, foot, and the like of the user a, 10 are transmitted to a user terminal (smartphone) 12 near the user a, 10.

The user terminal (smartphone) 12 analyzes the sensor detection values of the motion sensors attached to the head, arm, foot, and the like of the user a, 10, and generates three-dimensional posture information of the user a, 10.

Meanwhile, as illustrated in step S71*b* of FIG. 1, sensor detection values of the motion sensors attached to the head, arm, foot, and the like of the user b, 20 are transmitted to a user terminal (PC) 22 near the user b, 20.

The user terminal (PC) 22 analyzes the sensor detection values of the motion sensors attached to the head, arm, foot, and the like of the user b, 20, and generates three-dimensional posture information of the user b, 20.

Note that processing of transmitting the sensor detection value from the sensor to the user terminal (smartphone) 12 or the user terminal (PC) 22 is executed using proximity communication such as Bluetooth (registered trademark) communication.

(Step S72*a* and Step S72*b*)

The three-dimensional posture information of the user a, 10 generated on the basis of the sensor detection value by the user terminal (smartphone) 12 is transmitted from the user terminal (smartphone) 12 to the other user terminal (PC) 22 in step S72*a*.

Meanwhile, the three-dimensional posture information of the user b, 20 generated on the basis of the sensor detection value by the user terminal (PC) 22 is also transmitted from the user terminal (PC) 22 to the user terminal (smartphone) 12 in step S72*b*.

(Step S73*a*)

In step S73*a*, the user terminal (smartphone) 12 executes the following processing:

(a) processing of generating the three-dimensional image of the avatar B having a posture similar to the three-dimensional posture of the user b, 20 on the basis of the three-dimensional posture information of the user b, 20 received from the user terminal (PC) 22;

(b) processing of generating the three-dimensional image of the avatar A having a posture similar to the three-dimensional posture of the user a, 10 on the basis of the three-dimensional posture information of the user a, 10 generated by the user terminal (smartphone) 12; and (c) processing of outputting the MR image including the generated three-dimensional images of the avatars A and B to the MR glasses 11 worn by the user a, 10.

(Step S73*b*)

Meanwhile, in step S73*b*, the user terminal (PC) 22 executes the following processing:

(a) processing of generating the three-dimensional image of the avatar A having a posture similar to the three-dimensional posture of the user a, 10 on the basis of the three-dimensional posture information of the user a, 10 received from the user terminal (smartphone) 22;

(b) processing of generating the three-dimensional image of the avatar B having a posture similar to the three-dimensional posture of the user b, 20 on the basis of the three-dimensional posture information of the user b, 20 generated by the user terminal (PC) 22; and (c) Processing of outputting the MR image including the generated three-dimensional images of the avatars A and B to the MR glasses 21 worn by the user b, 20.

By repeatedly executing the series of processing, it becomes possible to move the avatars A and B in the MR image similarly to the motions of the users a and b, and the users a and b at distant positions can enjoy the feeling as if they were fighting in one and the same place.

Note that the example illustrated in FIG. 26 is a processing example in which the avatars of respective two users are displayed and used on one MR image using two user terminals possessed by the two users without using the server, but processing in which one user displays and uses one avatar corresponding to the user on the MR image using one user terminal is also possible.

A processing example in which one avatar of one user is displayed and used on the MR image using one user terminal of the one user will be described with reference to FIG. 27.

Figure 27:
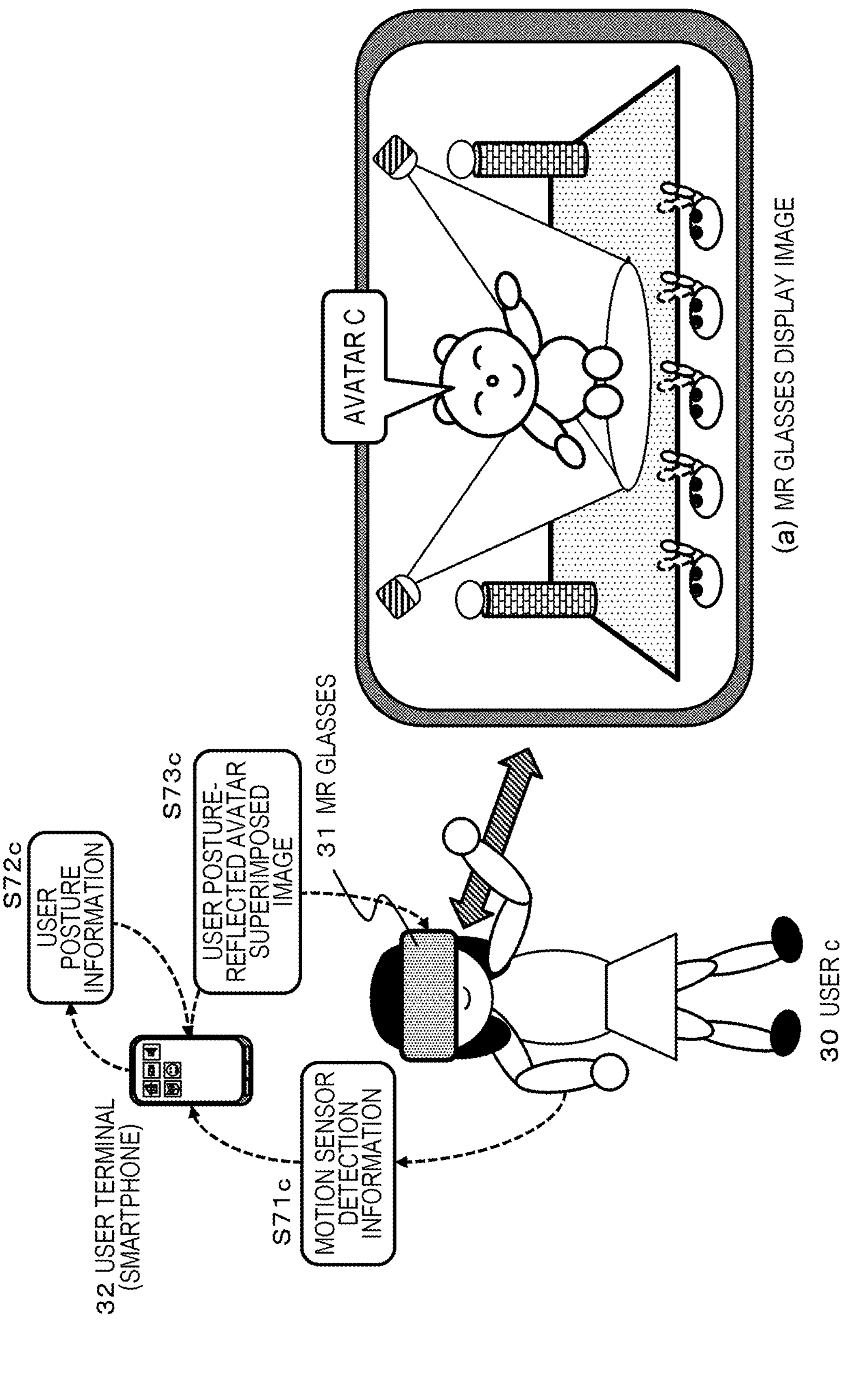
FIG. 27 is a diagram for describing a processing example in which one user uses one user terminal to display and use one avatar of the user on an MR image.

The user c, 30 illustrated in FIG. 27 wears the MR glasses 31.

A mixed reality (MR) image as illustrated in the center of FIG. 27 is displayed on the MR glasses 31 worn by the user c, 30.

It is an MR image in which the avatar C, which is a virtual self character of the user c, 30, is superimposed and displayed on a real object image of a real stage that exists.

The image displayed on the MR glasses 31 is a three-dimensional image, and both the background image and the avatar image are displayed as three-dimensional images.

The user c, 30 has a plurality of motion sensors attached to the head, the arm, the foot, and the like, and the avatar C in the MR image moves similarly to the motion of the user c, 30, using detection information of these sensors.

Processing steps for describing processing executed to move the avatar C in the MR image in accordance with the motion of the user c, 30 are processing of steps S71*c* to S73*c* illustrated in FIG. 27.

These series of processing will be described.

(Step S71*c*)

As illustrated in step S71*c* of FIG. 27, the sensor detection values of the motion sensors attached to the head, arm, foot, and the like of the user c, 30 are transmitted to the user terminal (smartphone) 32 near the user c, 30.

The user terminal (smartphone) 32 analyzes the sensor detection values of the motion sensors attached to the head, arm, foot, and the like of the user c, 30, and generates three-dimensional posture information of the user c, 30.

(Step S72*c*)

In step S72*c*, the user terminal (smartphone) 32 generates the three-dimensional image of the avatar C having a similar posture to the three-dimensional posture of the user c, 30 by using the three-dimensional posture information of the user c, 30 generated on the basis of the sensor detection values.

(Step S73*c*)

Next, in step S73*c*, the user terminal (smartphone) 32 transmits the MR image including the generated three-dimensional image of the avatar C to the MR glasses 31 worn by the user c, 30 and displays the MR image.

By repeatedly executing the series of processing, it becomes possible to move the avatar C in the MR image similarly to the motion of the user c, and the user c, 30 can enjoy the feeling as if the user c, 30 were dancing or singing on the actual stage.

Figure 28:
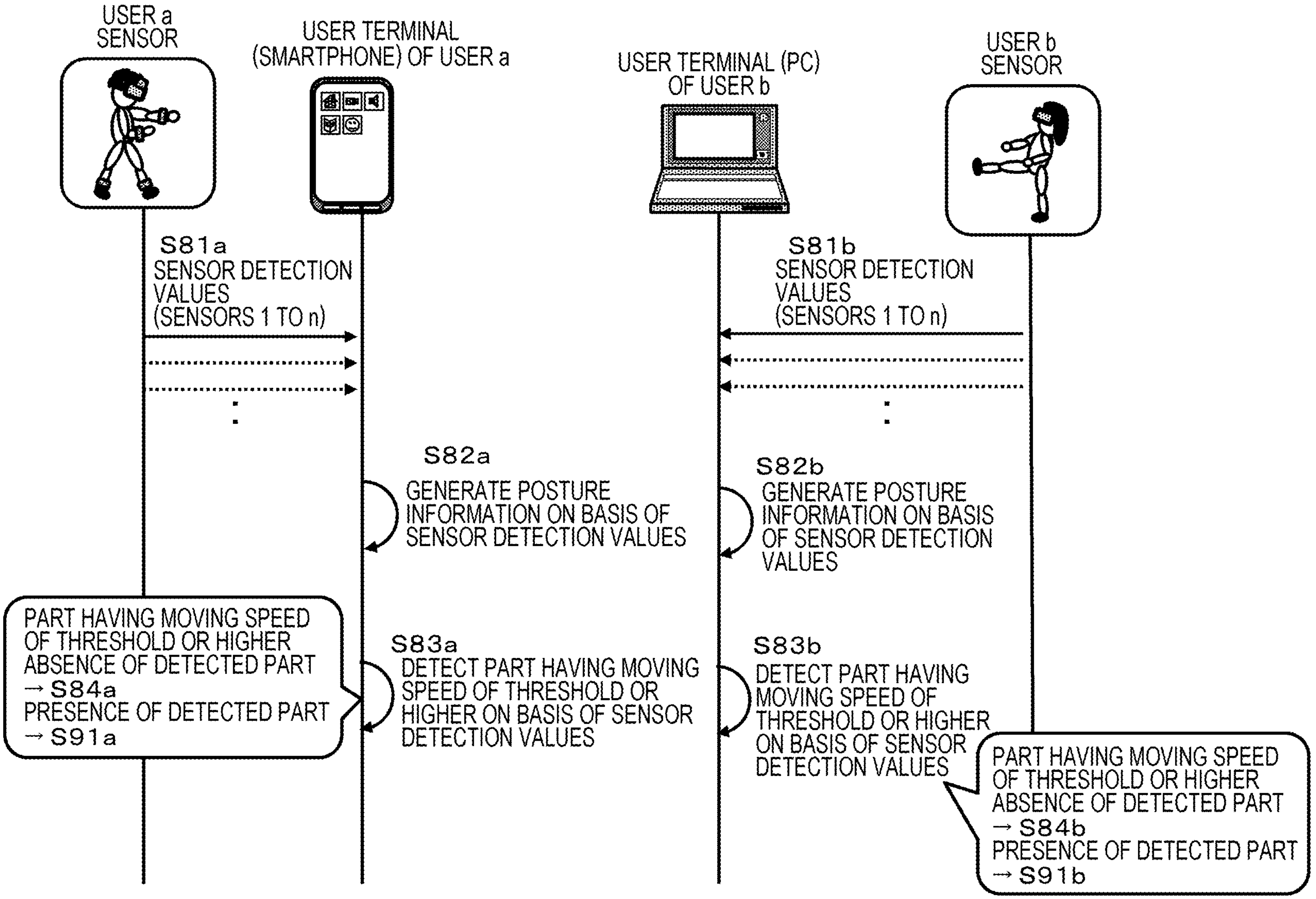
FIG. 28 is a sequence diagram for describing a sequence of a processing example of generating a posture-reflected avatar three-dimensional image of the user by processing of two user terminals and displaying the posture-reflected avatar three-dimensional image on the MR glasses.

Next, a sequence of a processing example of generating the posture-reflected avatar three-dimensional image of the user by the processing described with reference to FIG. 26, that is, the processing of the two user terminals without using the server and displaying the posture-reflected avatar three-dimensional image on the MR glasses will be described with reference to FIG. 28 and subsequent drawings.

Figure 29:
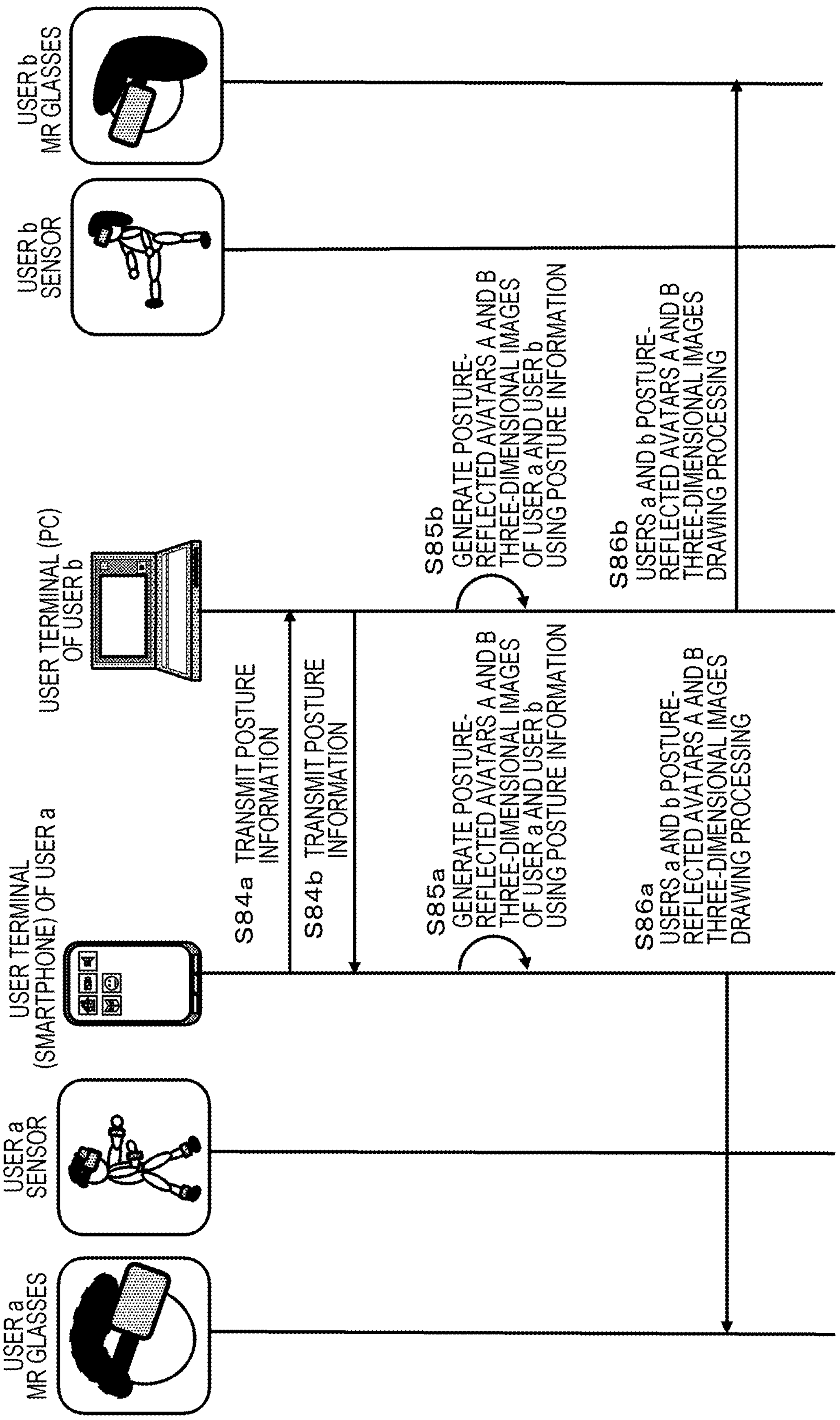
FIG. 29 is a sequence diagram for describing a sequence of a processing example of generating a posture-reflected avatar three-dimensional image of the user by processing of two user terminals and displaying the posture-reflected avatar three-dimensional image on the MR glasses.
Figure 30:
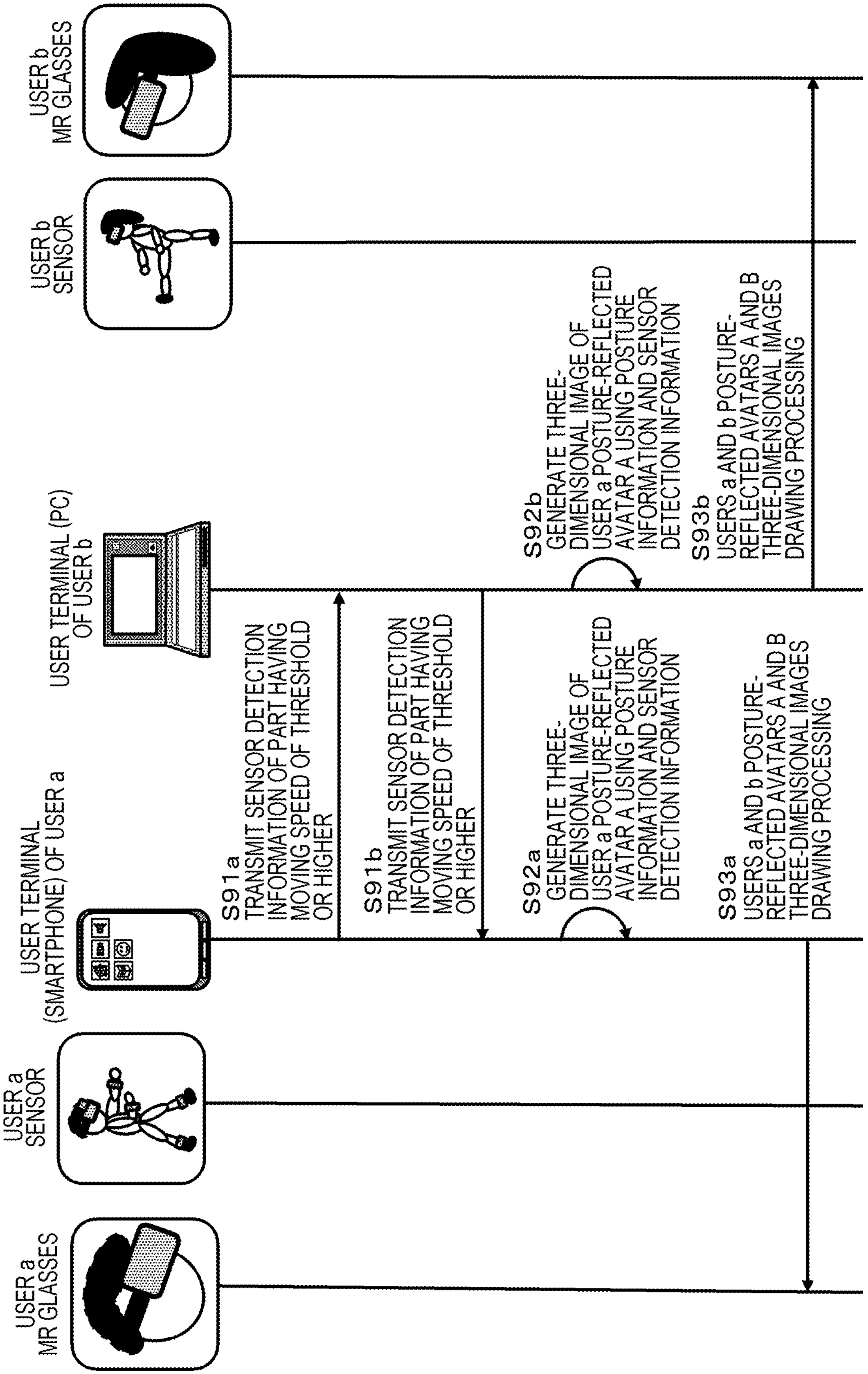
FIG. 30 is a sequence diagram for describing a sequence of a processing example of generating a posture-reflected avatar three-dimensional image of the user by processing of two user terminals and displaying the posture-reflected avatar three-dimensional image on the MR glasses.

Hereinafter, processing of each step illustrated in the sequence diagrams in FIGS. 28 to 30 will be sequentially described.

(Steps S81*a* and S81*b*)

steps S81*a* and S81*b* are processing in which the respective user terminals (smartphone and PC) of the users a and b receive inputs the sensor detection values from the sensors.

The users a and b have the motion sensors such as the IMUs attached to the respective parts of the bodies (the heads, right arms, left arms, waists, right feet, and left feet), and the sensor detection values are transmitted from these sensors to the respective user terminals in a constant cycle, for example, a cycle of 10 msec.

Note that the processing of transmitting the sensor detection values to the user terminals in steps S81*a* and S81*b* is continuously executed.

(Steps S82*a* and S82*b*)

In steps S82*a* and S82*b*, the respective user terminals (smartphone and PC) of the users a and b having received the sensor detection values from the sensors execute the user posture information generation processing based on the received sensor detection values.

Note that, as described above, the user posture information generation processing is executed in a cycle of 100 msec, for example.

(Steps S83*a* and 83*b*)

The respective user terminals (smartphone and PC) of the users a and b further execute the processing of steps S82*a* and S82*b* as processing parallel to the user posture information generation processing in steps S83*a* and S83*b*.

That is, in steps S83*a* and 83*b*, the respective user terminals (smartphone and PC) of the users a and b determine the presence or absence of the part having a moving speed equal to or higher than a prescribed threshold on the basis of the sensor detection values input from the respective sensors.

In the case where the part having a moving speed equal to or higher than a prescribed threshold is not detected in the determination processing of steps S83*a* and S83*b*, the processing proceeds to step S84*a* and S84*b*.

On the other hand, in the case where the part having a moving speed equal to or higher than a prescribed threshold is detected, the processing proceeds to steps S91a and S91b.

(Steps S84a and S84b)

In the case where the part having a moving speed equal to or higher than a prescribed threshold is not detected in steps S83a and S83b, in steps S84a and S84b, the respective user terminals (smartphone and PC) of the users a and b transmit the user posture information generated in steps S82a and S82b to the user terminals of the communication partners.

(Steps S85a and S85b)

In step S85a or S85b, the user terminal that has received the user posture information of the communication partner-side user from the communication partner-side user terminal generates the avatar three-dimensional image reflecting the communication partner-side user posture information.

Moreover, the user terminal generates the avatar three-dimensional image reflecting the user posture information of the user in parallel.

(Steps S86a and S86b)

In step S86a or S86b, the user terminal (smartphone or PC) of each of the users a and b draws the avatar three-dimensional image reflecting its own user posture information and the avatar three-dimensional image reflecting the communication partner-side user posture information generated in step S85a or S85b on the display unit of the MR glasses.

Note that the user posture-reflected avatar three-dimensional image displayed on the MR glasses by the processing in steps S84a and S84b to S86a and S86b is an avatar image having a posture delayed from the current postures of the users by approximately 100 msec.

These pieces of processing correspond to the processing described above with reference to FIG. 15(a), for example.

(Steps S91a and S91b)

On the other hand, in the case where the respective user terminals (smartphone and PC) of the users a and b detect the part having a moving speed equal to or higher than a prescribed threshold in steps S83a and S83b, in steps S91a and S91b, the respective user terminals (smartphone and PC) of the users a and b transmit the sensor detection value of the part having the moving speed equal to or higher than the threshold to the user terminals of the communication partners together with the user posture information generated in steps S82a and S82b.

As described above with reference to FIGS. 12 to 14, each user terminal selectively acquires the sensor detection value of the part of the user with the fast motion and transmits the sensor detection value to the user terminal of the communication partner. For example, the small-size packet storing the sensor detection value is generated at the same interval as the sampling cycle (10 msec) of the sensor and transmitted to the user terminal of the communication partner.

Note that the sensor detection value storage packet is preferably transmitted to the user terminal of the communication partner as a low latency priority packet that is preferentially transmitted according to, for example, quality of service (Qos). By performing the processing according to the Qos, the sensor detection value storage packet is transmitted to the user terminal of the communication partner without delay.

(Steps S92a and S92b)

In step S92a or S92b, one user terminal that has received, from the user terminal of the communication partner, the user posture information and the sensor detection value of the part of the user with the fast motion generates the user posture-reflected avatar three-dimensional image of the communication partner-side user using the two types of information of the user posture information and the sensor detection value received from the user terminal.

Moreover, the one user terminal generates the avatar three-dimensional image using the two types of information of the user posture information and the sensor detection value of the user in parallel.

This processing corresponds to the processing described above with reference to FIG. 15(b).

The server uses all pieces of information of the user posture information indicated by the black circles and the dotted lines in FIG. 15(b1) and the user part position information (right foot position information and left foot position information) based on the sensor detection values indicated by the white circles to generate the user posture-reflected avatar three-dimensional image as illustrated in FIG. 15(b2).

(Steps S93a and S93b)

In step S93a or S93b, the user terminal (smartphone or PC) of each of the users a and b draws the avatar three-dimensional image using its own user posture information and the sensor detection value and the avatar three-dimensional image using the communication partner-side user posture information and the sensor detection value generated in steps S92a and S92b on the display unit of the MR glasses.

The user posture-reflected avatar three-dimensional image displayed on the MR glasses by the processing in steps S91a and S91b to S93a and S93b is an avatar image having a posture with almost no delay from the current posture of the user.

As a result of these pieces of processing, the user becomes able to observe the avatar image having a posture with an extremely small delay from the current posture of the user, using the MR glasses, as illustrated in FIG. 15(b3) described above, for example.

6. Control Processing Example of Hand Tracking and Hand Gesture Analysis Processing Next, a control processing example of hand tracking and hand gesture analysis processing will be described.

As described in the above-described embodiment, the posture information of the user can be acquired by analyzing the detection values of the sensors attached to the respective parts of the user's body.

That is, as described above with reference to FIG. 8, the posture of the user can be estimated by sequentially executing the following respective pieces of processing.

(Processing 1) Sensor detection value input processing (Processing 2) Noise removal processing (Processing 3) Motion vector group generation processing (Processing 4) Posture estimation processing (learning model application posture estimation processing)

(Processing 5) Connection portion angle setting vector generation processing

These respective pieces of processing (Processing 1) to (Processing 5) are sequentially executed and "posture information" indicating the three-dimensional posture of the user can be generated.

Figure 31:
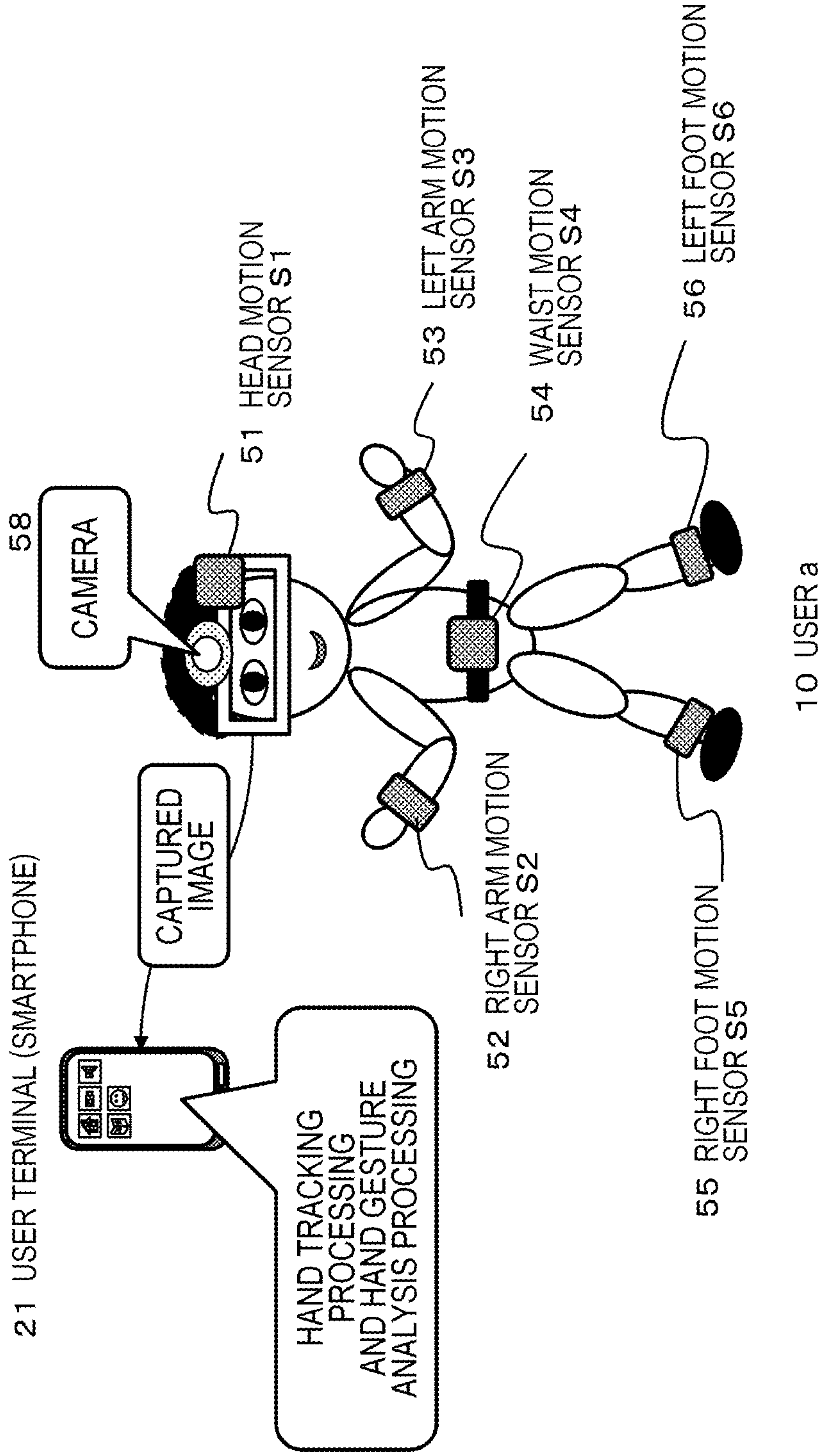
FIG. 31 is a diagram for describing a configuration in which a captured image of a camera is transmitted to the user terminal, and hand tracking processing and hand gesture analysis processing are executed in the user terminal.

Furthermore, for example, as illustrated in FIG. 31, the motion of a hand of the user can be analyzed by analyzing a camera-captured image using a camera 58 attached to the head of the user.

As illustrated in FIG. 31, a captured image of the camera 58 is transmitted to the user terminal 21, and hand tracking processing and hand gesture analysis processing are executed in the user terminal 21.

However, the hand tracking processing and the hand gesture analysis processing can be executed only in a case where the user's hand exists in the image capture region of the camera 58, and cannot be executed in a case where the user's hand does not exist in the image capture region of the camera 58.

Figure 32:
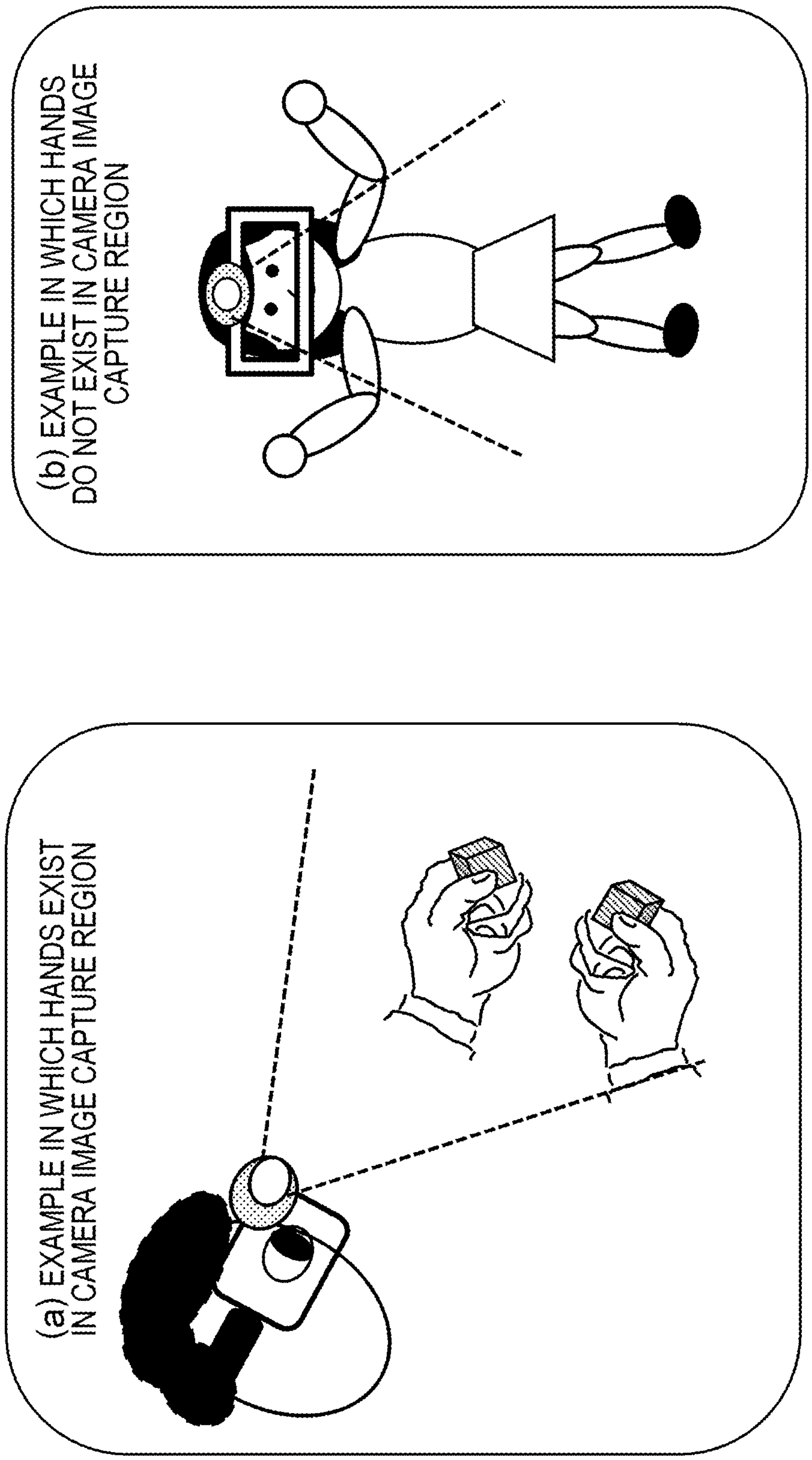
FIG. 32 is diagrams illustrating a relationship between an image capture region of a camera and positions of hands.

Specifically, for example, as illustrated in FIG. 32(*a*), in a case where the user's hands are in the image capture region of the camera 58, the hand tracking processing and the hand gesture analysis processing can be executed. However, as illustrated in FIG. 32(*b*), the processing cannot be executed in a case where the user's hands are not in the image capture region of the camera 58.

As illustrated in FIG. 32(*b*), if image capture processing by the camera 58, and the hand tracking processing and the hand gesture analysis processing by the user terminal are continuously executed in the case where the user's hands are not in the image capture region of the camera 58, wasteful power consumption may occur, a wasteful processing load in the user terminal may occur, and a delay may occur in other necessary processing.

As a method for solving this problem, it is effective to have a configuration in which the image capture processing by the camera 58 and the hand tracking processing and the hand gesture analysis processing in the user terminal are executed only in the case where the user's hand is within the image capture region of the camera.

Specifically, the user terminal determines whether or not the user's hands are within the image capture region of the camera on the basis of the user posture information generated on the basis of the sensor detection values, and controls execution and stop of the image capture processing by the camera 58 and the hand tracking processing and the hand gesture analysis processing in the user terminal using a determination result.

A processing sequence in the case where the user terminal executes the above processing will be described with reference to a flowchart illustrated in FIG. 33.

Figure 33:
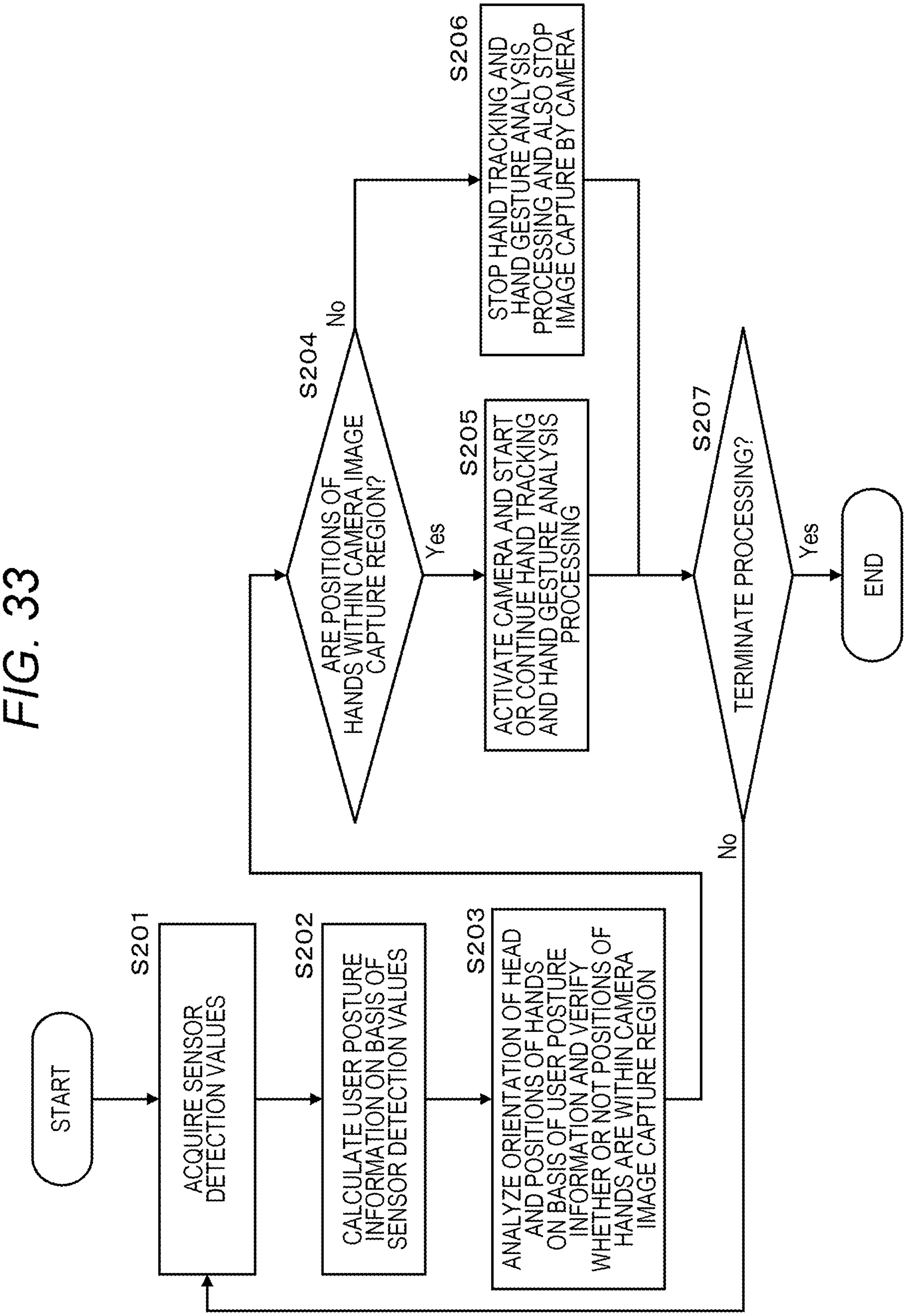
FIG. 33 is a diagram illustrating a flowchart for describing processing of controlling execution and stop of image capture processing and hand tracking processing according to whether or not a user's hand is within the image capture region of the camera.

Note that the processing according to the flow illustrated in FIG. 33 can be executed according to a program stored in the storage unit of the user terminal.

Hereinafter, processing of each step of the flow illustrated in FIG. 33 will be sequentially described.

(Step S201)

First, the user terminal acquires the sensor detection values from the sensors in step S201.

As described above, the motion sensors such as the IMUs are attached to the respective parts of the body (the head, right arm, left arm, waist, right foot, and left foot), and the user terminal inputs the sensor detection values from these sensors in a constant cycle, for example, a cycle of 10 msec.

(Step S202)

In step S202, the user terminal generates the user posture information using the sensor detection values acquired from the wearing sensors of the respective parts of the user.

The user posture information generation processing is the processing described above with reference to FIG. 8, and the following respective pieces of processing are sequentially executed to generate the user posture information.

(Processing 1) Sensor Detection Value Input processing (Processing 2) Noise removal processing (Processing 3) Motion vector group generation processing (Processing 4) Posture estimation processing (learning model application posture estimation processing)

(Processing 5) Connection portion angle setting vector generation processing

These respective pieces of processing (Processing 1) to (Processing 5) are sequentially executed to generate "posture information" indicating the three-dimensional posture of the user.

(Step S203)

When the user posture information generation processing is completed in step S202, next, in step S203, the user terminal analyzes an orientation of the head on which the camera is attached and positions of the hands from the user posture information, and verifies whether or not the positions of the hands are within an image capture range of the camera.

(Step S204)

step S204 is a branching step. In the verification processing in step S203, in a case where it is determined that the positions of the hands are within the image capture range of the camera, the processing proceeds to step S205, or in a case where it is determined that the positions of the hands are not within the image capture range of the camera, the processing proceeds to step S206.

(Step S205)

In step S204, in the case where it is determined that the positions of the hands are within the image capture range of the camera, the processing proceeds to step S205.

In this case, in step S205, the user terminal activates the camera and starts or continues the hand tracking and hand gesture analysis processing.

(Step S206)

On the other hand, in step S204, in the case where it is determined that the positions of the hands are not within the image capture range of the camera, the processing proceeds to step S206.

In this case, in step S206, the user terminal stops the hand tracking and hand gesture analysis processing and also stops the image capturing by the camera.

Note that, in a case where the captured image by the camera is used for other purposes, for example, for environment analysis processing around the user, such as SLAM processing, the image capturing by the camera may be continuously executed.

(Step S207)

In step S207, it is determined to terminate the processing. In a case of terminating the processing, the flow is terminated. In a case of continuing the processing, the processing returns to step S201, and the processing of step S201 and subsequent steps is repeated.

By executing such processing, it is possible to reduce the power consumption of the camera and the user terminal and further reduce the processing load in the user terminal. Furthermore, it is possible to perform efficient data processing without causing a delay in necessary processing to be executed by the user terminal.

7. Other Embodiments

Next, other embodiments will be described.

The above-described embodiment is an embodiment in which the processing of analyzing the posture of the user and the position of each part of the user's body is performed using the detection information of the motion sensors such as the IMUs attached to the respective parts of the user's body.

The processing of analyzing the posture of the user and the position of each part of the user's body can be performed using other devices without using the motion sensor such as the IMU.

For example, it is possible to perform the processing of analyzing the posture of the user and the position of each part of the user's body by using a captured image of the entire body or each part of the user's body using a camera.

The posture analysis processing using the camera-captured image can be performed at a higher speed than the user posture analysis processing using the detection information of the motion sensor such as the IMU.

However, a predetermined data processing time is also required for the posture information generation processing using the camera-captured image, and it is faster to directly acquire the position of each part of the user's body from the camera-captured image.

Therefore, in the case of performing the processing of calculating the user posture information using the camera-captured image and the processing of acquiring the position of the part of the user's body using the camera-captured image, these pieces of processing are executed in parallel, similarly to the above-described embodiment using the sensors, so that it is possible to perform the avatar image generation and output processing with less delay.

That is, it is a configuration to acquire and use the position of the part of the body with a fast motion from the camera-captured image with respect to the posture information calculated using the camera-captured image.

Moreover, for example, processing of changing an image capture frame rate of the camera according to the motion of the user's body is also possible.

For example, processing of lowering the image capture frame rate of the camera in a case where the user is substantially stationary, and raising the image capture frame rate in a case where the user is vigorously moving is performed.

By performing such frame rate control, it is possible to generate and output an avatar image with a further reduced delay with respect to the motion of the user.

Furthermore, it is also possible to reduce the power consumption by reducing the image capture frame rate of the camera in the case where the user is substantially stationary.

8. Configuration Example of Information Processing Device

Next, a configuration example of the information processing device such as the user terminal, the MR glasses, and the server used for the processing of the present disclosure will be described.

Figure 34:
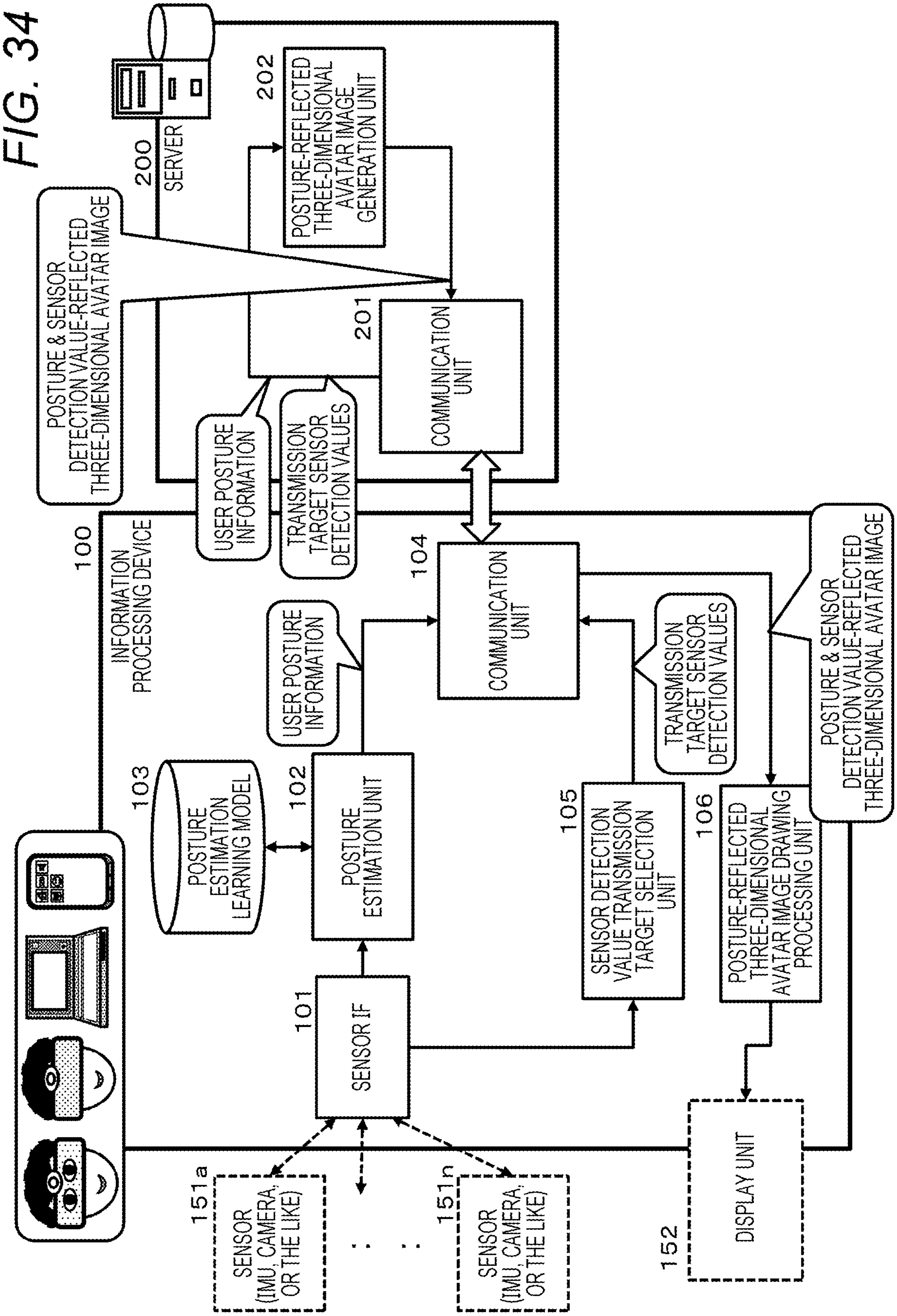
FIG. 34 is a diagram illustrating a configuration example of an information processing device such as a user terminal, MR glasses, or a server.

FIG. 34 is a diagram illustrating a configuration example of the information processing device such as the user terminal, the MR glasses, the server, and the like.

Note that a configuration example of an information processing device 100 corresponding to the user terminal is illustrated on the left side of FIG. 34, and a configuration example of a server 200 is illustrated on the right side.

The information processing device 100 corresponding to the user terminal illustrated on the left side has a configuration of a single user terminal such as a smartphone or a PC, for example. However, the information processing device 100 may be, for example, MR glasses having the functions of the smartphone or the PC (functions such as data processing and communication).

First, the configuration of the information processing device 100 corresponding to the left user terminal will be described.

The information processing device 100 includes a sensor IF 101, a posture estimation unit 102, a posture estimation learning model 103, a communication unit 104, a sensor detection value transmission target selection unit 105, and a posture-reflected three-dimensional avatar image drawing processing unit 106.

The sensor IF 101 is an IF corresponding to sensors (motion sensors) 151 such as the IMUs attached to the respective parts (the head, right arm, left arm, waist, right foot, left foot, and the like) of the user's body, and executes data transmission and reception with these sensors 151. For example, the sensor IF 101 is an IF that performs proximity communication such as Bluetooth (registered trademark) communication.

The posture estimation unit 102 executes processing of estimating the posture of the user by inputting the detection values of the sensors attached to the respective parts (the head, right arm, left arm, waist, right foot, left foot, and the like) of the user's body input via the sensor IF101.

The posture estimation unit 102 estimates the user posture by applying the posture estimation learning model 103 generated in advance.

The user posture information generation processing executed in the posture estimation unit 102 is the processing described above with reference to FIG. 8, and the following respective pieces of processing are sequentially executed to generate the user posture information.

(Processing 1) Sensor detection value input processing
(Processing 2) Noise removal processing
(Processing 3) Motion vector group generation processing
(Processing 4) Posture estimation processing (learning model application posture estimation processing)
(Processing 5) Connection portion angle setting vector generation processing The posture estimation unit 102 can sequentially execute these respective pieces of processing (Processing 1) to (Processing 5) to generate "posture information" indicating the three-dimensional posture of the user.

The posture estimation learning model 103 is a learning model generated in advance using a large number of sample data, for example, correspondence data between a large number of different motion vector groups and user postures, and is, for example, a learning model that receives an input of the motion vector corresponding to each part of the user's body and outputs the user posture.

The communication unit 104 executes communication with the server 200.

For example, the user posture information generated by the posture estimation unit 102 of the information processing device 100 is transmitted to the server 200.

The sensor detection value transmission target selection unit 105 executes the processing of selecting the sensor detection values to be transmitted to the server 200.

As described above, the sensor detection information to be transmitted to the server 200 does not include all the detection values of the sensors attached to the respective parts (the head, right arm, left arm, waist, right foot, and left foot) of the user's body, but only the sensor detection values of the parts determined to be moving at a speed equal to or higher than a prescribed threshold.

The sensor detection value transmission target selection unit 105 analyzes the detection values of the sensors attached to the respective parts (the head, right arm, left arm, waist, right foot, and left foot) of the user's body, selects the part moving at a speed equal to or higher than a prescribed threshold, and sets the sensor detection value of the selected part as the sensor detection value to be transmitted to the server 200.

The sensor detection value of the part moving at a speed equal to or higher than a prescribed threshold is transmitted to the server 200 via the communication unit 104.

Note that processing of selecting the sensor detection values to be transmitted to the server 200 includes the processing example executed on the user terminal side (the processing described with reference to FIGS. 17 to 21) and the processing example executed on the server side (the processing described with reference to FIGS. 22 to 25).

The configuration diagram illustrated in FIG. 34 is a configuration diagram corresponding to the processing example in which the processing of selecting the sensor detection values to be transmitted to the server 200 is executed on the user terminal side (the processing described with reference to FIGS. 17 to 21).

A configuration diagram corresponding to the processing example in which the processing of selecting the sensor detection values to be transmitted to the server 200 is executed on the server side (the processing described with reference to FIGS. 22 to 25) will be described below with reference to FIG. 35.

The posture-reflected three-dimensional avatar image drawing processing unit 106 executes processing of inputting the user posture-reflected avatar three-dimensional image generated by the server 200 using the posture information and the sensor detection values from the server 200 via the communication unit 104 and drawing the user posture-reflected avatar three-dimensional image on a display unit 152 of the MR glasses.

Next, a Configuration of the Server 200 Will Be described.

As illustrated in the diagram, the server 200 includes a communication unit 201 and a posture-reflected three-dimensional avatar image generation unit 202.

The server 200 inputs the user posture information, or the user posture information and the sensor detection values from the information processing device 100 such as the user terminal via the communication unit 201.

The posture-reflected three-dimensional avatar image generation unit 202 generates the user posture-reflected avatar three-dimensional image by using the user posture information input from the information processing device 100 such as the user terminal or the two pieces of information of the user posture information and the sensor detection values, and transmits the user posture-reflected avatar three-dimensional image to the information processing device 100 via the communication unit 201.

The user posture-reflected avatar three-dimensional image received by the information processing device 100 from the server 200 is drawn on the display unit 152 of the MR glasses by the posture-reflected three-dimensional avatar image drawing processing unit 106 of the information processing device 100.

Next, a configuration diagram corresponding to the processing example in which the processing of selecting the sensor detection values to be transmitted to the server 200 is executed on the server side (the processing described with reference to FIGS. 22 to 25) will be described below with reference to FIG. 35.

The configuration of the information processing device 100 corresponding to the left user terminal on the left side of FIG. 35 will be described.

The information processing device 100 includes the sensor IF 101, the posture estimation unit 102, the posture estimation learning model 103, the communication unit 104, the sensor detection value transmission target selection unit 105, and the posture-reflected three-dimensional avatar image drawing processing unit 106.

Processing executed by the configurations other than the sensor detection value transmission target selection unit 105 is similar to the processing described with reference to FIG. 34, and thus description thereof is omitted.

Figure 35:
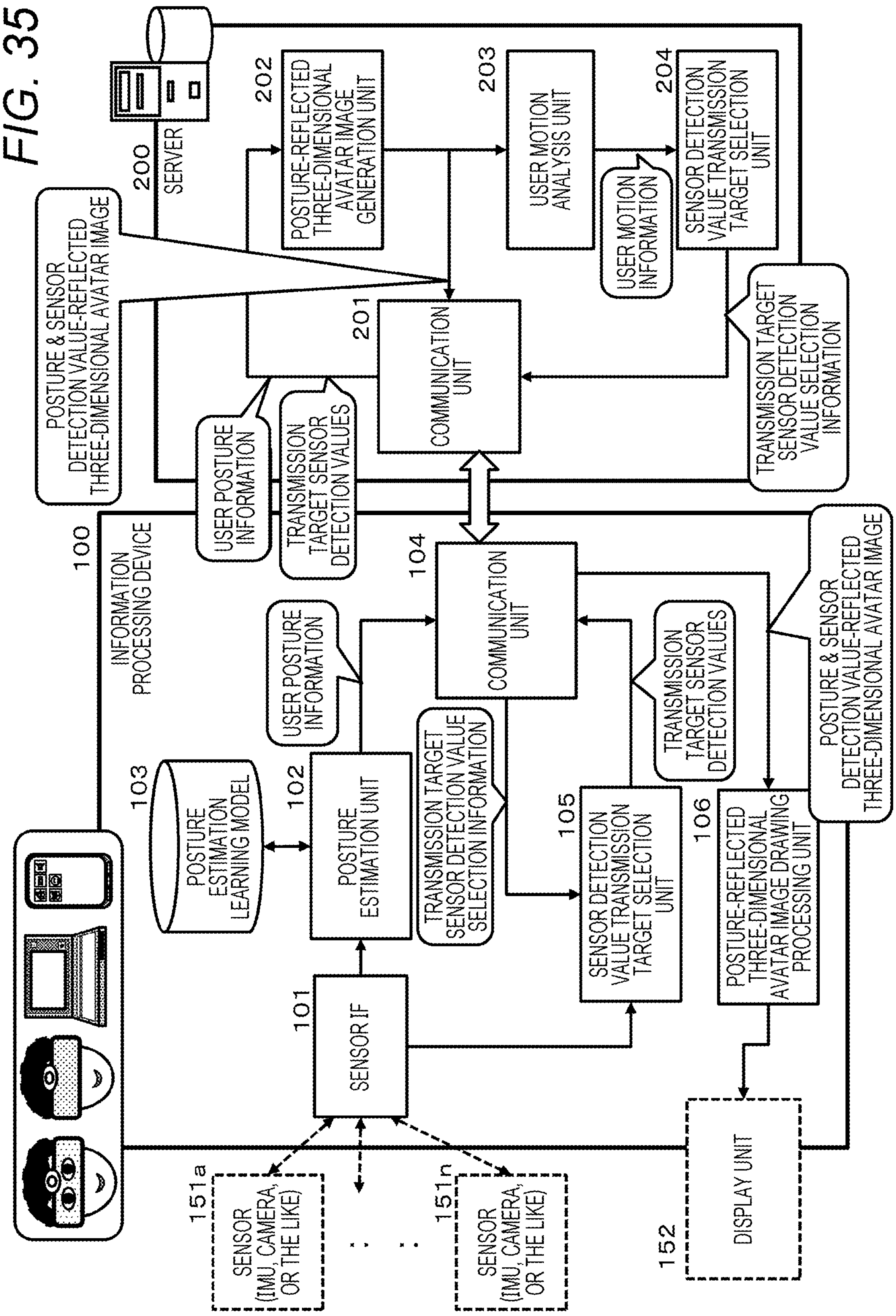
FIG. 35 is a diagram illustrating a configuration example of an information processing device such as a user terminal, MR glasses, or a server.

The sensor detection value transmission target selection unit 105 in the configuration illustrated in FIG. 35 inputs transmission target sensor detection value information determined by the server from the server 200 via the communication unit 104, selectively acquires the sensor detection values to be transmitted to the server 200 according to the input information, and transmits the sensor detection values to the server 200 via the communication unit 1104.

Next, a configuration of the server 200 will be described.

As illustrated in the diagram, the server 200 includes a user motion analysis unit 203 and a sensor detection value transmission target selection unit 204 in addition to the communication unit 201 and the posture-reflected three-dimensional avatar image generation unit 202.

The server 200 inputs the user posture information, or the user posture information and the sensor detection values from the information processing device 100 such as the user terminal via the communication unit 201.

The posture-reflected three-dimensional avatar image generation unit 202 generates the user posture-reflected avatar three-dimensional image by using the user posture information input from the information processing device 100 such as the user terminal or the two pieces of information of the user posture information and the sensor detection values, and transmits the user posture-reflected avatar three-dimensional image to the information processing device 100 via the communication unit 201.

These pieces of processing are similar to the processing described above with reference to FIG. 34.

The user motion analysis unit 203 inputs the user posture information from the information processing device such as the user terminal via the communication unit 201, analyzes time-series data of the input user posture information, detects a user part (a part such as the left hand) where a positional change is severe, and estimates the moving speed of the part.

The sensor detection value transmission target selection unit 204 compares an analysis result of the user motion analysis unit 203, that is, the estimated moving speed of the user part (the part such as the left hand) where the posture change is severe with a prescribed threshold, and determines the sensor detection value of the user part having the moving speed equal to or higher than the threshold as a transmission target sensor detection value.

This determination information is transmitted to the information processing device 100 such as the user terminal via the communication unit 201.

The sensor detection value transmission target selection unit 105 of the information processing device 100 such as the user terminal inputs the transmission target sensor detection value information determined by the server from the server 200 via the communication unit 104, selectively acquires the sensor detection values to be transmitted to the server 200 according to the input information, and transmits the sensor detection values to the server 200 via the communication unit 1104.

Next, a configuration example of the information processing device such as the user terminal in the case of not using the server described with reference to FIGS. 26 and 27 will be described.

Figure 36:
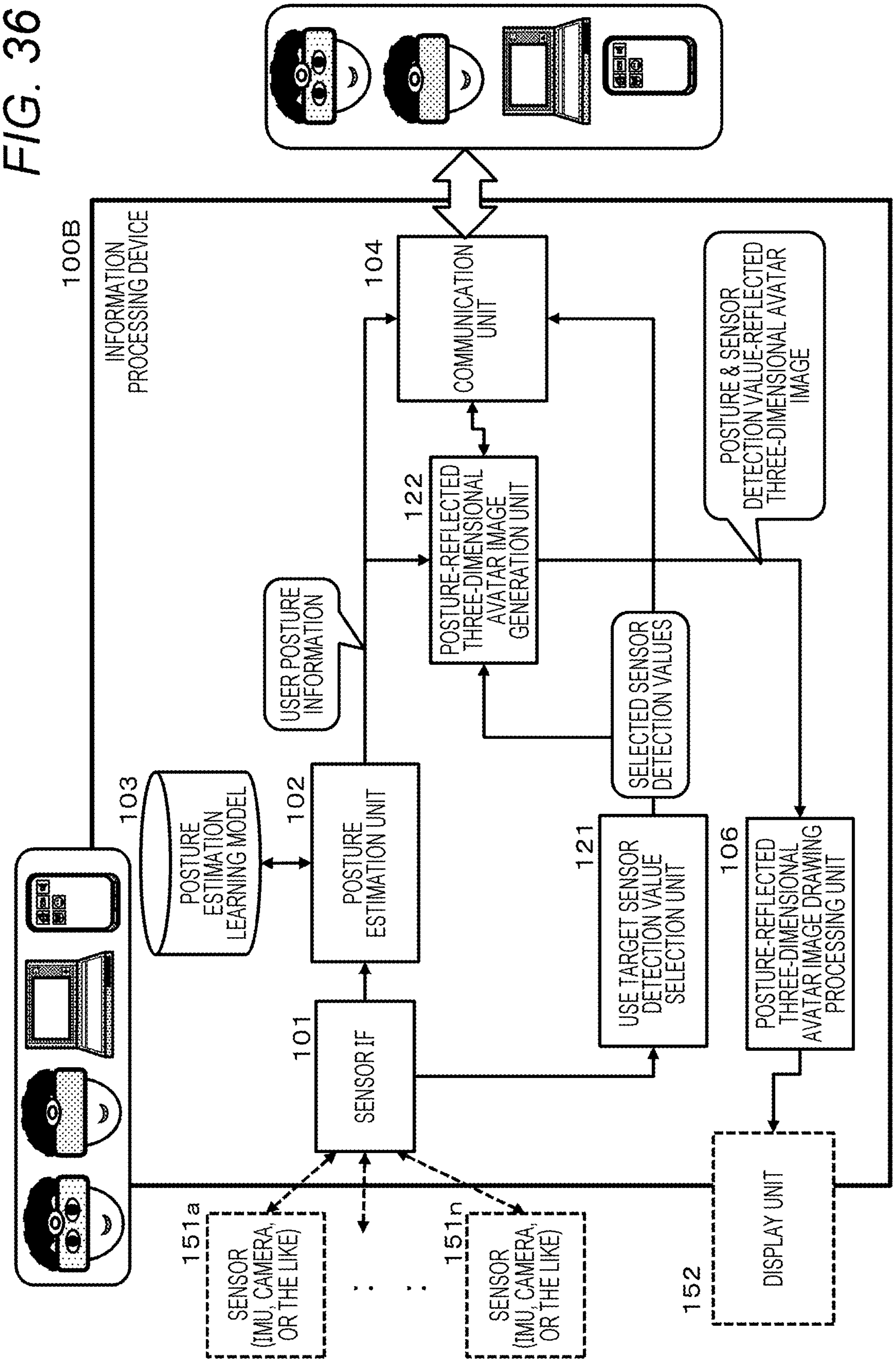
FIG. 36 is a diagram illustrating a configuration example of an information processing device such as a user terminal, MR glasses, or a server.

FIG. 36 is a diagram illustrating a configuration example of an information processing device 100B in a case where the avatar image reflecting the posture of the user is generated only by the user terminal without using the server.

The information processing device 100B such as a user terminal includes the sensor IF 101, the posture estimation unit 102, the posture estimation learning model 103, the communication unit 104, the posture-reflected three-dimensional avatar image generation unit 106, a use target sensor detection value selection unit 121, and a posture-reflected three-dimensional avatar image generation unit 122.

The sensor IF 101 is an IF corresponding to the sensors (motion sensors) 151 such as the IMUs attached to the respective parts (the head, right arm, left arm, waist, right foot, left foot, and the like) of the user's body, and executes data transmission and reception with these sensors 151. For example, the sensor IF 101 is an IF that performs proximity communication such as Bluetooth (registered trademark) communication.

The posture estimation unit 102 executes processing of estimating the posture of the user by inputting the detection values of the sensors attached to the respective parts (the head, right arm, left arm, waist, right foot, left foot, and the like) of the user's body input via the sensor IF101.

The posture estimation unit 102 estimates the user posture by applying the posture estimation learning model 103 generated in advance.

The user posture information generation processing executed in the posture estimation unit 102 is the processing described above with reference to FIG. 8, and the respective pieces of processing of (Processing 1) to (Processing 5) illustrated in FIG. 8 are sequentially executed to generate the "posture information" indicating the three-dimensional posture of the user.

The posture estimation learning model 103 is a learning model generated in advance using a large number of sample data, for example, correspondence data between a large number of different motion vector groups and user postures, and is, for example, a learning model that receives an input of the motion vector corresponding to each part of the user's body and outputs the user posture.

The communication unit 104 executes, for example, communication with another user terminal to be a communication partner.

The communication unit 104 transmits, for example, the user posture information generated by the posture estimation unit 102 of the information processing device 100 and the sensor detection values to the another user terminal as a communication partner.

The use target sensor detection value selection unit 121 executes processing of selecting the sensor detection values to be used for the user posture-reflected three-dimensional avatar image.

The use target sensor detection value selection unit 121 analyzes the detection values of the sensors attached to the respective parts (the head, right arm, left arm, waist, right foot, and left foot) of the user's body, selects the part moving at a speed equal to or higher than a prescribed threshold, and selects the sensor detection value of the selected part as the sensor detection value to be used for the user posture-reflected three-dimensional avatar image.

The sensor detection value of the part moving at a speed equal to or higher than a prescribed threshold is output to the posture-reflected three-dimensional avatar image generation unit 122.

The posture-reflected three-dimensional avatar image generation unit 122 generates the user posture-reflected avatar three-dimensional image by using the user posture information generated by the posture estimation unit 102 or the user posture information and the sensor detection values of the part moving at a speed equal to or higher than a prescribed threshold input from the use target sensor detection value selection unit 121.

The generated user posture-reflected avatar three-dimensional image is output to the posture-reflected three-dimensional avatar image drawing processing unit 106.

The posture-reflected three-dimensional avatar image drawing processing unit 106 executes the processing of inputting the user posture-reflected avatar three-dimensional image generated by the posture-reflected three-dimensional avatar image generation unit 122 using the posture information and the sensor detection values, and drawing the user posture-reflected avatar three-dimensional image on the display unit 152 of the MR glasses.

9. Hardware Configuration Example of Information Processing Device

Next, a hardware configuration example of the information processing device constituting a user terminal, MR glasses, a server, or the like that executes processing according to the above-described embodiments will be described with reference to FIG. 37.

Figure 37:
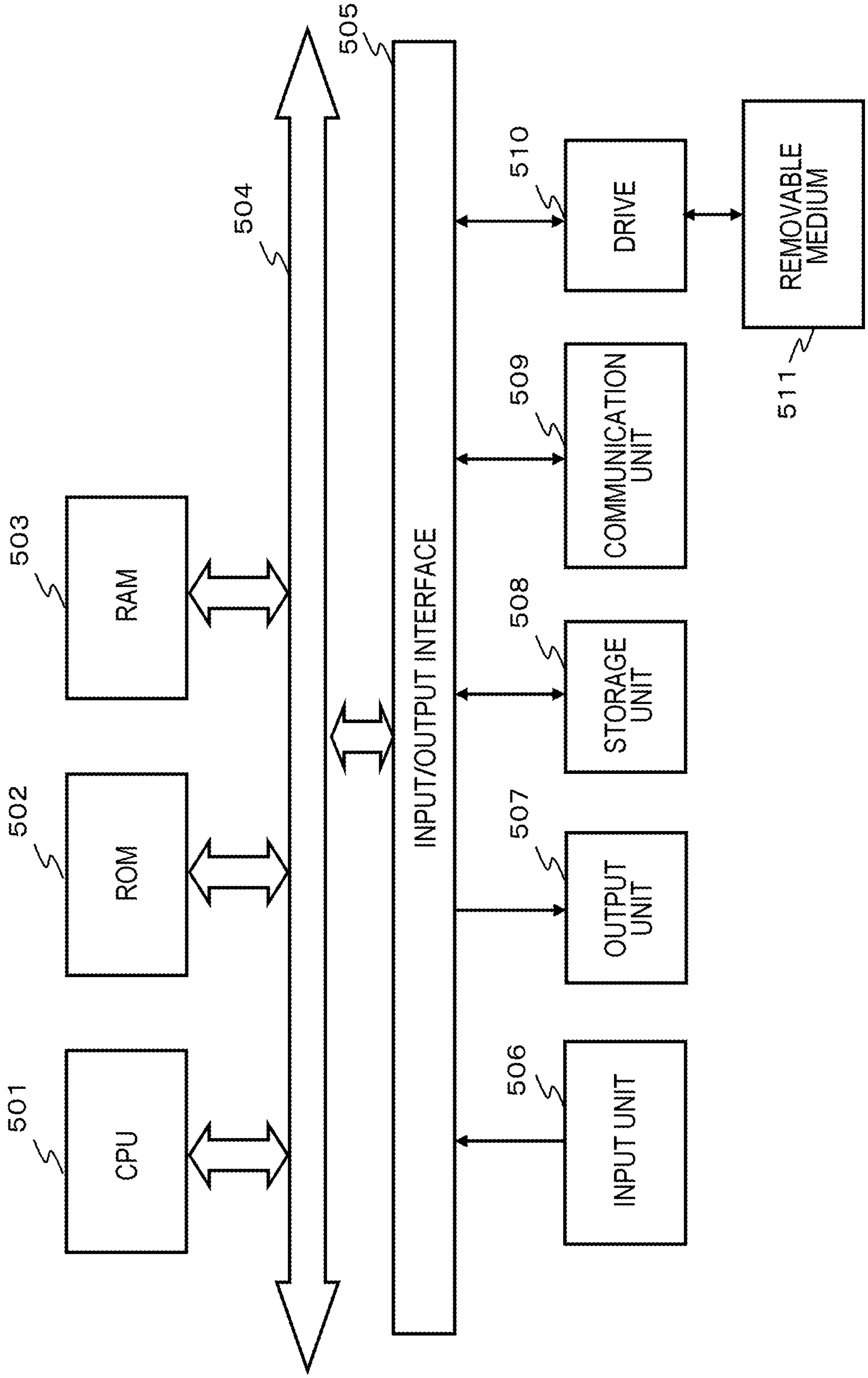
FIG. 37 is a diagram for explaining a hardware configuration example of the information processing device according to the present disclosure.

Hardware illustrated in FIG. 37 is an example of a hardware configuration of the information processing device of the present disclosure, for example, an information processing device constituting a user terminal such as a PC or a smartphone, MR glasses, a server, or the like.

The hardware configuration illustrated in FIG. 37 will be described.

A central processing unit (CPU) 501 functions as a data processing unit that executes various processes according to a program stored in a read only memory (ROM) 502 or a storage unit 508. For example, processes according to the sequence described in the above-described embodiments are executed. A random access memory (RAM) 503 stores a program executed by the CPU 501, data, and the like. The CPU 501, the ROM 502, and the RAM 503 are mutually connected by a bus 504.

The CPU 501 is connected to an input/output interface 505 via the bus 504, and an input unit 506 including various sensors, a camera, a switch, a keyboard, a mouse, a microphone, and the like, and an output unit 507 including a display, a speaker, and the like are connected to the input/output interface 505.

The storage unit 508 connected to the input/output interface 505 includes, for example, a hard disk, and the like and stores programs executed by the CPU 501 and various data. A communication unit 509 functions as a data communication transmitting/receiving unit via a network such as the Internet or a local area network, and communicates with an external device.

A drive 510 connected to the input/output interface 505 drives a removable medium 511 such as a magnetic disk, an optical disk, a magneto-optical disk, or a semiconductor memory such as a memory card to record or read data.

10. Summary of Configuration of Present Disclosure

As described above, the embodiments of the present disclosure have been described in detail with reference to particular embodiments. However, it is obvious that those skilled in the art can modify or substitute the embodiments without departing from the gist of the present disclosure. That is, the present invention has been disclosed in the form of exemplification, and should not be interpreted in a limited manner. In order to determine the gist of the present disclosure, the claims should be considered.

Note that the technology disclosed herein can have the following configurations.

(1) An information processing device including:

a posture estimation unit configured to estimate a user posture by inputting sensor detection values of motion sensors attached to a plurality of parts of a body of a user; and a sensor detection value selection unit configured to selectively acquire a sensor detection value of a part having a motion faster than a prescribed threshold, in which the user posture estimated by the posture estimation unit and the sensor detection value selected by the sensor detection value selection unit are output to an external device or a posture-reflected three-dimensional avatar image generation unit in the information processing device, and a user posture-reflected three-dimensional avatar image generated by the posture-reflected three-dimensional avatar image generation unit using the user posture and the sensor detection value is output to a display unit.

(2) The information processing device according to (1), in which the user posture-reflected three-dimensional avatar image generated by the posture-reflected three-dimensional avatar image generation unit is an image generated using each piece of data (a) and (b) below:

(a) the user posture estimated by the posture estimation unit; and (b) a sensor detection value newer than the sensor detection value used by the posture estimation unit to generate the user posture.

(3) The information processing device according to (1) or (2), in which the user posture-reflected three-dimensional avatar image generated by the posture-reflected three-dimensional avatar image generation unit is an avatar image generated by image correction processing of reflecting, in an avatar image generated on the basis of the user posture estimated by the posture estimation unit, a user part position estimated on the basis of the sensor detection value selected by the sensor detection value selection unit.

(4) The information processing device according to any one of (1) to (3), in which the sensor detection value selection unit selectively acquires the sensor detection value of a part having a motion faster than a prescribed threshold according to designation information from the external device.

(5) The information processing device according to any one of (1) to (4), in which the sensor detection value selection unit analyzes the sensor detection values of the motion sensors, and selectively acquires the sensor detection value of a part having a motion faster than a prescribed threshold.

(6) The information processing device according to any one of (1) to (5), further including:

an avatar image drawing processing unit configured to draw, on the display unit, the user posture-reflected three-dimensional avatar image generated using the user posture and the sensor detection value.

(7) The information processing device according to any one of (1) to (6), in which the posture-reflected three-dimensional avatar image generation unit is a data processing unit of a server capable of communicating with the information processing device, and the information processing device further includes:

a communication unit configured to execute processing of transmitting the user posture estimated by the posture estimation unit and the sensor detection value selected by the sensor detection value selection unit to the server, and processing of receiving the user posture-reflected three-dimensional avatar image generated by the server from the server.

(8) The information processing device according to any one of (1) to (7), in which the posture-reflected three-dimensional avatar image generation unit is a data processing unit in the information processing device, and the information processing device inputs the user posture estimated by the posture estimation unit and the sensor detection value selected by the sensor detection value selection unit to the posture-reflected three-dimensional avatar image generation unit in the information processing device, and outputs the user posture-reflected three-dimensional avatar image generated by the posture-reflected three-dimensional avatar image generation unit using the user posture and the sensor detection value to the display unit.

(9) The information processing device according to any one of (1) to (8), in which the posture estimation unit estimates the user posture using a learning model generated in advance.

(10) The information processing device according to any one of (1) to (9), in which the display unit is a display unit of mixed reality (MR) glasses.

(11) The information processing device according to any one of (1) to (10), in which the information processing device further executes processing of changing a sampling cycle of a sensor attached to the user according to a moving speed of each part.

(12) The information processing device according to any one of (1) to (11), in which the information processing device performs control to set a sampling cycle of a sensor that outputs the sensor detection value of a part having a motion faster than the prescribed threshold to a high cycle, and set a sampling cycle of a sensor that outputs the sensor detection value of a part having a motion speed less than the prescribed threshold to a low cycle.

(13) An information processing device including:

a posture-reflected three-dimensional avatar image generation unit configured to generate a user posture-reflected three-dimensional avatar image by using a user posture estimated on the basis of a sensor detection value of a motion sensor attached to a user's body part and the sensor detection value of the motion sensor, in which the posture-reflected three-dimensional avatar image generation unit executes image correction processing of reflecting a user part position estimated on the basis of the sensor detection value for a posture-based avatar image generated on the basis of the user posture to generate the user posture-reflected three-dimensional avatar image.

(14) The information processing device according to (13), in which the sensor detection value used for the image correction processing by the posture-reflected three-dimensional avatar image generation unit is a sensor detection value newer than the sensor detection value used for estimation processing for the user posture.

(15) An information processing device system including: a user terminal and a server, in which the user terminal includes:

a posture estimation unit configured to estimate a user posture by inputting sensor detection values of motion sensors attached to a plurality of parts of a body of a user;

a sensor detection value selection unit configured to selectively acquire a sensor detection value of a part having a motion faster than a prescribed threshold; and a communication unit configured to transmit the user posture estimated by the posture estimation unit and the sensor detection value selected by the sensor detection value selection unit to the server, the server generates a user posture-reflected three-dimensional avatar image by using the user posture and the sensor detection value received from the user terminal, and transmits the generated user posture-reflected three-dimensional avatar image to the user terminal, and the user terminal outputs the user posture-reflected three-dimensional avatar image received from the server to a display unit.

(16) The information processing system according to (15), in which the server generates the user posture-reflected three-dimensional avatar image using each piece of data (a) and (b) below:

(a) the user posture estimated by the posture estimation unit of the user terminal; and (b) a sensor detection value newer than the sensor detection value used by the posture estimation unit of the user terminal to generate the user posture.

(17) The information processing system according to (15) or (16), in which the user posture-reflected three-dimensional avatar image generated by the server is an avatar image generated by image correction processing of reflecting, in an avatar image generated on the basis of the user posture estimated by the posture estimation unit of the user terminal, a user part position estimated on the basis of the sensor detection value selected by the sensor detection value selection unit of the user terminal.

(18) An information processing method executed in an information processing device, the information processing method executing:

by a posture estimation unit, a posture estimation step of estimating a user posture by inputting sensor detection values of motion sensors attached to a plurality of parts of a user's body;

by a sensor detection value selection unit, a sensor detection value selection step of selectively acquiring a sensor detection value of a part having a motion faster than a prescribed threshold;

a step of outputting the user posture estimated by the posture estimation unit and the sensor detection value selected by the sensor detection value selection unit to an external device or a posture-reflected three-dimensional avatar image generation unit in the information processing device; and a step of outputting, to a display unit, a user posture-reflected three-dimensional avatar image generated by the posture-reflected three-dimensional avatar image generation unit using the user posture and the sensor detection value.

(19) An information processing method executed in an information processing device, the information processing method including:

executing, by a posture-reflected three-dimensional avatar image generation unit, posture-reflected three-dimensional avatar image generation processing of generating a user posture-reflected three-dimensional avatar image by using a user posture estimated on the basis of a sensor detection value of a motion sensor attached to a user's body part and the sensor detection value of the motion sensor; and executing, by the posture-reflected three-dimensional avatar image generation unit, image correction processing of reflecting a user part position estimated on the basis of the sensor detection value for a posture-based avatar image generated on the basis of the user posture to generate the user posture-reflected three-dimensional avatar image.

A series of processing tasks described herein may be executed by hardware, software, or a composite configuration of both. In a case where processing is executed by software, it is possible to install a program in which a processing sequence is recorded, on a memory in a computer incorporated in dedicated hardware and execute the program, or it is possible to install and execute the program on a general-purpose personal computer that is capable of executing various types of processing. For example, the program can be recorded in advance in a recording medium. In addition to being installed in a computer from the recording medium, a program can be received via a network such as a local area network (LAN) or the Internet and installed in a recording medium such as an internal hard disk or the like.

Note that the various processes described herein may be executed not only in a chronological order in accordance with the description, but may also be executed in parallel or individually depending on processing capability of a device configured to execute the processing or depending on the necessity. Furthermore, a system herein described is a logical set configuration of a plurality of devices, and is not limited to a system in which devices of respective configurations are in the same housing.

INDUSTRIAL APPLICABILITY

As described above, according to a configuration of an embodiment of the present disclosure, a device and a method for generating and displaying a user posture-reflected three-dimensional avatar image with less delay with respect to a user motion are implemented.

Specifically, for example, a user terminal inputs a detection value of a motion sensor attached to a body of a user and a user posture is estimated, and further, the sensor detection value of a part having a fast motion is selected and transmitted to a server. The server generates a user posture-reflected three-dimensional avatar image using the user posture and the sensor detection values and transmits the user posture-reflected three-dimensional avatar image to the user terminal. The user terminal outputs the received user posture-reflected three-dimensional avatar image to a display unit. The server performs, for an avatar image based on the user posture, image correction of reflecting a user part position estimated on the basis of a newer sensor detection value to generate a user posture-reflected three-dimensional avatar image.

According to the present configuration, a device and a method for generating and displaying a user posture-reflected three-dimensional avatar image with less delay with respect to a user motion are implemented.

REFERENCE SIGNS LIST

10, 20, 30 User
11, 21, 31 MR glasses
12, 22, 32 User terminal
33 Transmissive MR glasses
34 Camera
40 Server
51 to 56 Sensor (motion sensor)
58 Camera
61 Sensor detection value transmission target selection unit (moving speed analysis unit)
100 Information processing device
101 Sensor IF
102 Posture estimation unit
103 Posture estimation learning model
104 Communication unit
105 Sensor detection value transmission target selection unit
106 Posture-reflected three-dimensional avatar image drawing processing unit
121 Use target sensor detection value selection unit
122 Posture-reflected three-dimensional avatar image generation unit
152 Display unit
200 Server
201 Communication unit
202 Posture-reflected three-dimensional avatar image generation unit
203 User motion analysis unit
204 Sensor detection value transmission target selection unit
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing device comprising:

a posture estimation unit configured to estimate a user posture by inputting sensor detection values of motion sensors attached to a plurality of parts of a body of a user; and a sensor detection value selection unit configured to selectively acquire a sensor detection value of a part having a motion faster than a prescribed threshold, wherein the user posture estimated by the posture estimation unit and the sensor detection value selected by the sensor detection value selection unit to an external device or a posture-reflected three-dimensional avatar image generation unit in the information processing device, and a user posture-reflected three-dimensional avatar image generated by the posture-reflected three-dimensional avatar image generation unit using the user posture and the sensor detection value is output to a display unit.

2. The information processing device according to claim 1, wherein the user posture-reflected three-dimensional avatar image generated by the posture-reflected three-dimensional avatar image generation unit is an image generated using each piece of data (a) and (b) below:

(a) the user posture estimated by the posture estimation unit; and (b) a sensor detection value newer than the sensor detection value used by the posture estimation unit to generate the user posture.

3. The information processing device according to claim 1, wherein the user posture-reflected three-dimensional avatar image generated by the posture-reflected three-dimensional avatar image generation unit is an avatar image generated by image correction processing of reflecting, in an avatar image generated on a basis of the user posture estimated by the posture estimation unit, a user part position estimated on a basis of the sensor detection value selected by the sensor detection value selection unit.

4. The information processing device according to claim 1, wherein the sensor detection value selection unit selectively acquires the sensor detection value of a part having a motion faster than a prescribed threshold according to designation information from the external device.

5. The information processing device according to claim 1, wherein the sensor detection value selection unit analyzes the sensor detection values of the motion sensors, and selectively acquires the sensor detection value of a part having a motion faster than a prescribed threshold.

6. The information processing device according to claim 1, further comprising:

an avatar image drawing processing unit configured to draw, on the display unit, the user posture-reflected three-dimensional avatar image generated using the user posture and the sensor detection value.

7. The information processing device according to claim 1, wherein the posture-reflected three-dimensional avatar image generation unit is a data processing unit of a server capable of communicating with the information processing device, and the information processing device further includes:

a communication unit configured to execute processing of transmitting the user posture estimated by the posture estimation unit and the sensor detection value selected by the sensor detection value selection unit to the server, and processing of receiving the user posture-reflected three-dimensional avatar image generated by the server from the server.

8. The information processing device according to claim 1, wherein the posture-reflected three-dimensional avatar image generation unit is a data processing unit in the information processing device, and the information processing device inputs the user posture estimated by the posture estimation unit and the sensor detection value selected by the sensor detection value selection unit to the posture-reflected three-dimensional avatar image generation unit in the information processing device, and outputs the user posture-reflected three-dimensional avatar image generated by the posture-reflected three-dimensional avatar image generation unit using the user posture and the sensor detection value to the display unit.

9. The information processing device according to claim 1, wherein the posture estimation unit estimates the user posture using a learning model generated in advance.

10. The information processing device according to claim 1, wherein the display unit is a display unit of mixed reality (MR) glasses.

11. The information processing device according to claim 1, wherein the information processing device further executes processing of changing a sampling cycle of a sensor attached to the user according to a moving speed of each part.

12. The information processing device according to claim 1, wherein the information processing device performs control to set a sampling cycle of a sensor that outputs the sensor detection value of a part having a motion faster than the prescribed threshold to a high cycle, and set a sampling cycle of a sensor that outputs the sensor detection value of a part having a motion speed less than the prescribed threshold to a low cycle.

13. An information processing device comprising:

a posture-reflected three-dimensional avatar image generation unit configured to generate a user posture-reflected three-dimensional avatar image by using a user posture estimated on a basis of a sensor detection value of a motion sensor attached to a user's body part and the sensor detection value of the motion sensor, wherein the posture-reflected three-dimensional avatar image generation unit executes image correction processing of reflecting a user part position estimated on a basis of the sensor detection value for a posture-based avatar image generated on a basis of the user posture to generate the user posture-reflected three-dimensional avatar image.

14. The information processing device according to claim 13, wherein the sensor detection value used for the image correction processing by the posture-reflected three-dimensional avatar image generation unit is a sensor detection value newer than the sensor detection value used for estimation processing for the user posture.

15. An information processing device system comprising:

a user terminal and a server, wherein the user terminal includes:

a posture estimation unit configured to estimate a user posture by inputting sensor detection values of motion sensors attached to a plurality of parts of a body of a user;

a sensor detection value selection unit configured to selectively acquire a sensor detection value of a part having a motion faster than a prescribed threshold; and a communication unit configured to transmit the user posture estimated by the posture estimation unit and the sensor detection value selected by the sensor detection value selection unit to the server, the server generates a user posture-reflected three-dimensional avatar image by using the user posture and the sensor detection value received from the user terminal, and transmits the generated user posture-reflected three-dimensional avatar image to the user terminal, and the user terminal outputs the user posture-reflected three-dimensional avatar image received from the server to a display unit.

16. The information processing system according to claim 15, wherein the server generates the user posture-reflected three-dimensional avatar image using each piece of data (a) and (b) below:

(a) the user posture estimated by the posture estimation unit of the user terminal; and (b) a sensor detection value newer than the sensor detection value used by the posture estimation unit of the user terminal to generate the user posture.

17. The information processing system according to claim 15, wherein the user posture-reflected three-dimensional avatar image generated by the server is an avatar image generated by image correction processing of reflecting, in an avatar image generated on a basis of the user posture estimated by the posture estimation unit of the user terminal, a user part position estimated on a basis of the sensor detection value selected by the sensor detection value selection unit of the user terminal.

18. An information processing method executed in an information processing device, the information processing method executing:

by a posture estimation unit, a posture estimation step of estimating a user posture by inputting sensor detection values of motion sensors attached to a plurality of parts of a user's body;

by a sensor detection value selection unit, a sensor detection value selection step of selectively acquiring a sensor detection value of a part having a motion faster than a prescribed threshold;

a step of outputting the user posture estimated by the posture estimation unit and the sensor detection value selected by the sensor detection value selection unit to an external device or a posture-reflected three-dimensional avatar image generation unit in the information processing device; and a step of outputting, to a display unit, a user posture-reflected three-dimensional avatar image generated by the posture-reflected three-dimensional avatar image generation unit using the user posture and the sensor detection value.

19. An information processing method executed in an information processing device, the information processing method comprising:

executing, by a posture-reflected three-dimensional avatar image generation unit, posture-reflected three-dimensional avatar image generation processing of generating a user posture-reflected three-dimensional avatar image by using a user posture estimated on a basis of a sensor detection value of a motion sensor attached to a user's body part and the sensor detection value of the motion sensor; and executing, by the posture-reflected three-dimensional avatar image generation unit, image correction processing of reflecting a user part position estimated on a basis of the sensor detection value for a posture-based avatar image generated on a basis of the user posture to generate the user posture-reflected three-dimensional avatar image.

* * * * *